US012645392B2

(12) United States Patent
Daga et al.

(10) Patent No.: US 12,645,392 B2
(45) Date of Patent: *Jun. 2, 2026

(54) DATA MANAGEMENT SYSTEM AND METHOD OF CONTROLLING

(71) Applicant: Samsung Electronics Co., Ltd., Suwon-si (KR)

(72) Inventors: Vinod Kumar Daga, Cupertino, CA (US); Angel Aviles, San Jose, CA (US); Venkata Bhanu Prakash Gollapudi, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,524

(22) Filed: Sep. 19, 2024

(65) Prior Publication Data

US 2025/0013381 A1     Jan. 9, 2025

Related U.S. Application Data

(63) Continuation of application No. 17/790,419, filed as application No. PCT/IB2021/000065 on Feb. 2, 2021, now Pat. No. 12,147,699.

(60) Provisional application No. 62/970,158, filed on Feb. 4, 2020, provisional application No. 62/969,623, filed on Feb. 3, 2020, provisional application No. 62/969,650, filed on Feb. 3, 2020.

(51) Int. Cl.
*G06F 3/06* (2006.01)
*G06F 13/16* (2006.01)

(52) U.S. Cl.
CPC .......... *G06F 3/0655* (2013.01); *G06F 3/0604* (2013.01); *G06F 3/0611* (2013.01); *G06F 3/0619* (2013.01); *G06F 3/0635* (2013.01); *G06F 3/0652* (2013.01); *G06F 3/067* (2013.01); *G06F 3/0679* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 5,931,954 A | 8/1999 | Hoshina et al. | |
| 9,715,465 B2 | 7/2017 | Kim | |

(Continued)

FOREIGN PATENT DOCUMENTS

| | | |
|---|---|---|
| CN | 107787489 A | 3/2018 |
| WO | 2015/048140 A1 | 4/2015 |

(Continued)

OTHER PUBLICATIONS

US Final Office Action dated Jan. 17, 2025, issued in U.S. Appl. No. 17/790,463 (22 pages).

(Continued)

*Primary Examiner* — Brian R Peugh
(74) *Attorney, Agent, or Firm* — Womble Bond Dickinson (US) LLP

(57) ABSTRACT

Provided is a method of data storage in a data storage system, the method including identifying object headers respectively corresponding to object data, storing the object data at one side of an allocated data chunk, and storing the object headers at another side of the allocated data chunk.

20 Claims, 23 Drawing Sheets

(56) References Cited

U.S. PATENT DOCUMENTS

| | | |
|---|---|---|
| 9,824,092 B2 | 11/2017 | Shamis et al. |
| 9,916,269 B1 | 3/2018 | Machulsky |
| 10,019,181 B2 | 7/2018 | Singh et al. |
| 10,108,349 B2 | 10/2018 | Marinescu et al. |
| 10,114,582 B1 | 10/2018 | Rao et al. |
| 10,282,103 B1 | 5/2019 | Stone et al. |
| 10,691,486 B2 | 6/2020 | Gauffriau et al. |
| 10,831,684 B1 | 11/2020 | Kamran et al. |
| 11,048,430 B2 | 6/2021 | Thoppil et al. |
| 11,467,998 B1 | 10/2022 | Izenberg |
| 11,556,391 B2 | 1/2023 | Creed et al. |
| 11,579,799 B2 | 2/2023 | Ish et al. |
| 11,681,625 B2 | 6/2023 | Cornett et al. |
| 11,734,204 B2 | 8/2023 | Cao et al. |
| 2008/0177811 A1 | 7/2008 | Cannon et al. |
| 2009/0307249 A1 | 12/2009 | Koifman et al. |
| 2011/0145516 A1* | 6/2011 | Adl-Tabatabai .... G06F 11/3471 |
| | | 711/E12.001 |
| 2013/0086311 A1 | 4/2013 | Huang et al. |
| 2014/0331001 A1 | 11/2014 | Liu et al. |
| 2016/0055171 A1 | 2/2016 | Araki et al. |
| 2016/0117119 A1 | 4/2016 | Kim |
| 2016/0188224 A1 | 6/2016 | Yin et al. |
| 2016/0216903 A1 | 7/2016 | Joshi et al. |
| 2017/0083252 A1 | 3/2017 | Singh et al. |
| 2017/0351437 A1 | 12/2017 | Marinescu et al. |
| 2018/0095784 A1 | 4/2018 | Gauffriau et al. |
| 2019/0004726 A1 | 1/2019 | Liu et al. |
| 2019/0171797 A1 | 6/2019 | Morris |
| 2019/0188079 A1 | 6/2019 | Kohli |
| 2019/0369890 A1 | 12/2019 | Danilov et al. |
| 2020/0026459 A1 | 1/2020 | Harduf et al. |
| 2020/0117605 A1 | 4/2020 | Cornett et al. |
| 2020/0218676 A1 | 7/2020 | Cao et al. |
| 2021/0117240 A1 | 4/2021 | Creed et al. |
| 2021/0294522 A1 | 9/2021 | Ish et al. |

FOREIGN PATENT DOCUMENTS

| | | |
|---|---|---|
| WO | 2015/069788 A1 | 5/2015 |
| WO | 2019/089057 A1 | 5/2019 |

OTHER PUBLICATIONS

US Office Action dated Sep. 11, 2024, issued in U.S. Appl. No. 17/790,463 (18 pages).

"Fast Switching of Threads Between Cores" by Richard Strong et al., To appear in ACM SIGOPS Operating Systems Review special issue on the Interaction Among the OS, the Compiler, and Multicore Processors, Apr. 2009, vol. 43, No. 2. (Year: 2009).

"Bringing NVMe/TCP Up to Speed" by Sagi Grimberg, Flash Memory Summit, Nov. 10-12, 2020. (Year: 2020).

"Thread pool for 1/0—Completion Ports" by Viktor Peller, 2018. (Year: 2018).

US Final Office Action dated Mar. 18, 2024, issued in U.S. Appl. No. 17/790,463 (19 pages).

EPO Extended European Search Report dated Feb. 16, 2024, issued in corresponding European Patent Application No. 21751132.8 (13 pages).

EPO Extended European Search Report dated Jan. 22, 2024, issued in corresponding European Patent Application No. 21750095.8 (8 pages).

'Meet KiloCore, a 1,000-core processor so efficient it could run on a AA battery' by Brad Chacos, PCWorld, Jun. 20, 2016. (Year: 2016).

'NVM Express Specification Revision 1.2.1' Jun. 5, 2016. (Year: 2016).

International Search Report & Written Opinion of International Searching Authority of PCT/IB2021/000056, Aug. 2, 2021, 9 pages.

US Office Action dated Sep. 27, 2023, issued in U.S. Appl. No. 17/790,463 (17 pages).

Chinese Office Action corresponding to CN Application No. 202180012633.2, dated Dec. 24, 2025 (10 pages).

\* cited by examiner

FIG. 4          <u>SECTION I</u>

Section II

200

Start

Write command

Receive write command including one or more chunks of data and a data access identifier    210

Write one or more chunks of data to unused locations in storage device    250

Update version log for file with version entry including pointers to locations of newly written chunks    270

End

Section II

Section II

SECTION III

SECTION III

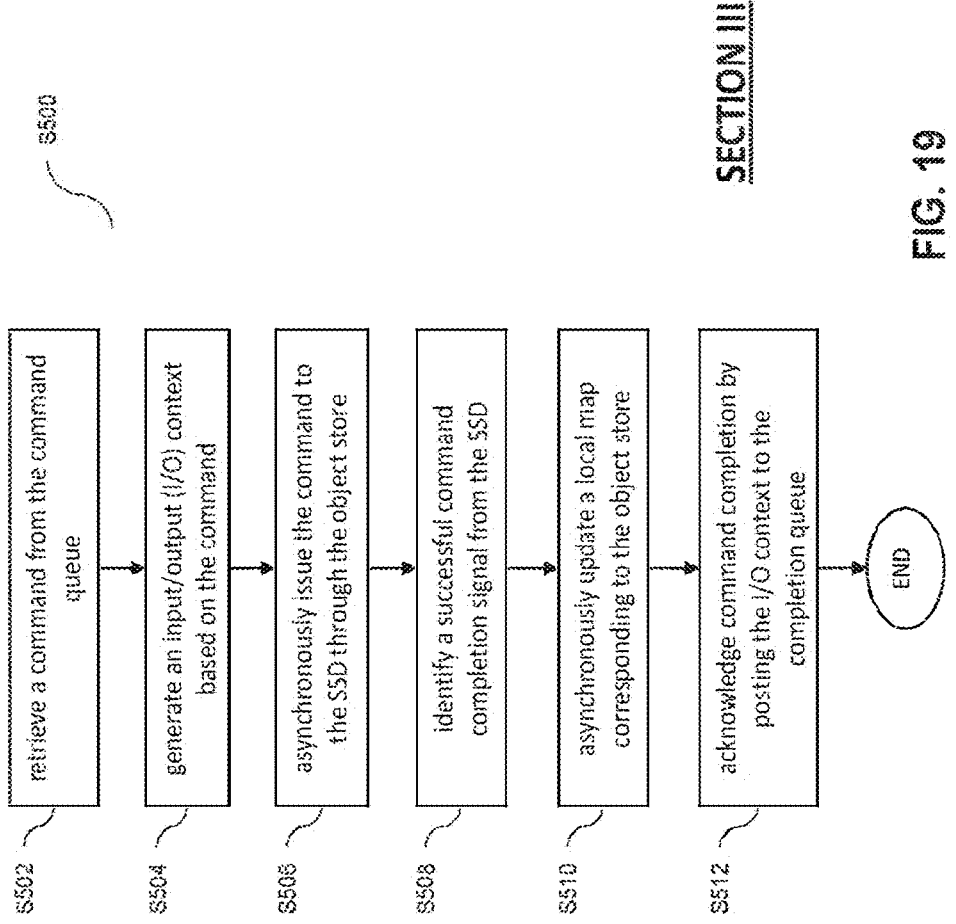

S500

S502 — retrieve a command from the command queue

S504 — generate an input/output (I/O) context based on the command

S506 — asynchronously issue the command to the SSD through the object store

S508 — identify a successful command completion signal from the SSD

S510 — asynchronously update a local map corresponding to the object store

S512 — acknowledge command completion by posting the I/O context to the completion queue

END

SECTION III

FIG. 19

SECTION IV

DATA MANAGEMENT SYSTEM AND METHOD OF CONTROLLING

CROSS-REFERENCE TO RELATED APPLICATIONS

This application is a continuation of U.S. patent application Ser. No. 17/790,419, filed on Jun. 30, 2022, entitled "DATA MANAGEMENT SYSTEM AND METHOD OF CONTROLLING," now U.S. Pat. No. 12,147,699, which is a National Stage Entry of PCT/IB2021/000065, filed on Feb. 2, 2021, which claims priority to, and the benefit of: (i) U.S. Provisional Application Ser. No. 62/969,623, filed on Feb. 3, 2020, entitled "DATA STORAGE PLATFORM"; (ii) U.S. Provisional Application Ser. No. 62/969,650, filed on Feb. 3, 2020, entitled "DATA MANAGEMENT SYSTEM"; and (iii) U.S. Provisional Application Ser. No. 62/970,158, filed on Feb. 4, 2020, entitled "DATA MANAGEMENT SYSTEM," the entire contents of all of which are incorporated herein by reference.

SECTION I

Methodology of Handling Small Metadata Objects and Compaction in High Performance Distributed Object Stores The text in the present "Section I" of the Specification, including any reference numerals or characters and any references to figures, refer and correspond to the FIGS. 1-5 with the label "Section I", and does not refer or correspond to the text in sections II-IV, nor any of the reference numerals, characters, or figures with the labels on the figure sheets that have the label "Section II", "Section III", or "Section IV". That is, each of the Sections I-IV in the present Specification should be interpreted in the context of the corresponding description in the same section and the figures labeled with the same section, respectively. Notwithstanding the foregoing, however, various aspects and inventive concepts of the various sections may be applied to aspects and inventive concepts of other sections.

FIELD

One or more aspects of embodiments of the present disclosure relate generally to data compaction, to handling of small metadata objects, and to distributed object stores.

BACKGROUND

Object storage, or an object store, may store data as one or more data objects. One or more of the data objects that are stored in the object store may be accessed by a corresponding application by using an object identifier for identifying the data object that is sought to be accessed.

Advantages provided by an object store may be further enhanced by use of distributed objects, as distributed object stores can provide scalable storage that is able to grow to suit the requests of one or more corresponding applications. However, the performance of a distributed application may depend on how efficiently a corresponding distributed object store can serve the data to the application given an object identifier.

SUMMARY

Embodiments described herein provide improvements to data storage by allowing applications that process large amounts of unstructured data to efficiently handle variably sized metadata objects, and to efficiently run background compaction, thereby increasing drive endurance while reducing write amplification, read amplification, and space amplification.

According to some embodiments of the present disclosure, there is provided a method of data storage in a data storage system, the method including identifying object headers respectively corresponding to object data, storing the object data at one side of an allocated data chunk, and storing the object headers at another side of the allocated data chunk.

The method may further include deleting or aggregating the object data such that invalid data causes the allocated data chunk to be fragmented, reading one of the object headers to determine a corresponding one of the object data is a valid data object, and moving the valid data object to a new allocated data chunk.

The method may further include reading one of object headers to determine a corresponding one of the object data is an invalid data object, and refraining from reading the invalid data object.

The method may further include reading the object headers to determine that the object data are valid object data, determining that the valid object data correspond to a single object, concatenating the valid object data, and writing the valid object data as the single object to a drive.

The method may further include staging the object data into a contiguous buffer in a persistent memory, determining the contiguous buffer has reached a threshold, and sequentially writing data corresponding to the object data to a drive.

The method may further include determining one of the object headers has an attribute set to long, and staging the one of the object headers in an active block in a persistent memory and writing the active block to a drive, or directly writing the active block to the drive.

The method may further include determining one of the object headers has an attribute set to short, and caching the one of the object headers in a persistent memory.

According to other embodiments of the present disclosure, there is provided a data storage system configured to store data, the data storage system including a storage node including a key-value store for storing data, and a data management node for sending or retrieving the data from the storage node, wherein the data management node is configured to identify object headers respectively corresponding to object data, store the object data at one side of an allocated data chunk, and store the object headers at another side of the allocated data chunk.

The data management node may be further configured to delete or aggregate the object data such that invalid data causes the allocated data chunk to be fragmented, read one of the object headers to determine a corresponding one of the object data is a valid data object, and move the valid data object to a new allocated data chunk.

The data management node may be further configured to read one of object headers to determine a corresponding one of the object data is an invalid data object, and refrain from reading the invalid data object.

The data management node may be further configured to read the object headers to determine that the object data are valid object data, determine that the valid object data correspond to a single object, concatenate the valid object data, and write the valid object data as the single object to a drive.

The data management node may be further configured to stage the object data into a contiguous buffer in a persistent memory, determine the contiguous buffer has reached a threshold, and sequentially write data corresponding to the object data to a drive.

The data management node may be further configured to determine one of the object headers has an attribute set to long, and stage the one of the object headers in an active block in a persistent memory and write the active block to a drive, or directly write the active block to the drive.

The data management node may be further configured to determine one of the object headers has an attribute set to short, and cache the one of the object headers in a persistent memory.

According to yet other embodiments of the present disclosure, there is provided a non-transitory computer readable medium implemented on a distributed object store system, the non-transitory computer readable medium having computer code that, when executed on a processor, implements a method of data storage by a data management node, the method including identifying object headers respectively corresponding to object data, storing the object data at one side of an allocated data chunk, and storing the object headers at another side of the allocated data chunk.

The computer code, when executed by the processor, may further implement the method of data storage by causing the data management node to delete or aggregate the object data such that invalid data causes the allocated data chunk to be fragmented, read one of the object headers to determine a corresponding one of the object data is a valid data object, and move the valid data object to a new allocated data chunk.

The computer code, when executed by the processor, may further implement the method of data storage by causing the data management node to read one of object headers to determine a corresponding one of the object data is an invalid data object, and refrain from reading the invalid data object.

The computer code, when executed by the processor, may further implement the method of data storage by causing the data management node to read the object headers to determine that the object data are valid object data, determine that the valid object data correspond to a single object, concatenate the valid object data, and write the valid object data as the single object to a drive.

The computer code, when executed by the processor, may further implement the method of data storage by causing the data management node to stage the object data into a contiguous buffer in a persistent memory, determine the contiguous buffer has reached a threshold, and sequentially write data corresponding to the object data to a drive.

The computer code, when executed by the processor, may further implement the method of data storage by causing the data management node to determine one of the object headers has an attribute set to short, and cache the one of the object headers in a persistent memory.

Accordingly, methods and systems of embodiments of the present disclosure reduce or avoid random access of small objects stored in a drive, thereby reducing the read amplification and write amplification. The methods and systems of embodiments of the present disclosure also efficiently use persistent memory to avoid writing frequently changing objects to the drive.

BRIEF DESCRIPTION OF THE DRAWINGS

The abovementioned and/or other aspects will become apparent and more readily appreciated from the following description of the embodiments, taken in conjunction with the accompanying drawings, in which.

DETAILED DESCRIPTION

Figure 1:
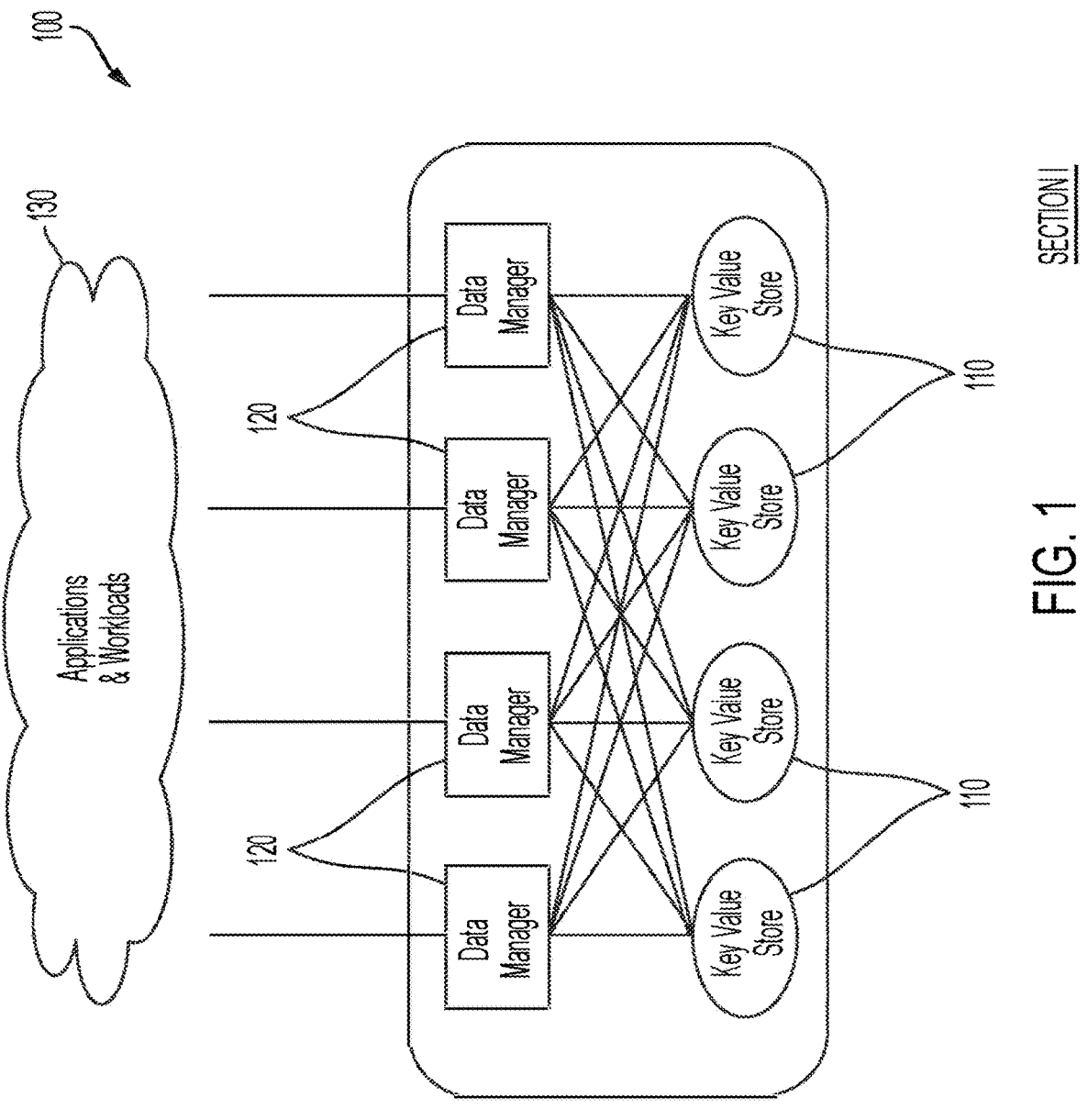
FIG. 1 is a block diagram of a storage system, according to some embodiments of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

FIG. 1 is a block diagram of a storage system, according to some embodiments of the present disclosure.

Referring to FIG. 1, and as described above, a storage system 100 (e.g., a distributed storage system, a distributed object store, or store) may include an object storage, or object store, which may store data as one or more data objects on one or more key-value stores 110 hosted by respective storage nodes. The storage nodes may be used to efficiently store different classes of data and metadata corresponding thereto. There may be a relatively large number of application-specific key-value stores 110 applied as the storage nodes.

The key-value stores 110 may be controlled by one or more data managers 120 hosted on one or more data management nodes (DMNs). The DMNs and the storage nodes may be implemented using a high performance, low latency KV fabric. The DMNs may read one or more data objects, and may write certain metadata corresponding to the one or more objects into the storage system 100.

The data objects may be accessed by one or more applications 130 (e.g., applications, workloads, or clients) that are connected to the storage system 100 via the data managers 120 when the applications 130 provide an object identifier corresponding to the data object to be accessed. The applications 130 connected to the storage system 100 may be able to "see" all of the storage nodes.

According to some embodiments of the present disclosure, and unlike traditional block storage or file storage systems, applications 130 accessing the storage system 100 are responsible neither for organizing the logical data stored therein as a set of fixed-size blocks, nor for organizing the logical data into a structured organization, such as one or more directories or files. Accordingly, the applications 130 are provided flat access (e.g., the namespace of objects is flat) to the data stored in storage system 100 by use of an object identifier for identifying a corresponding data object including the data, meaning the applications 130 may have the ability to access the objects directly given the object identifier, which is in contrast to hierarchical access of files and directories.

Accordingly, the described embodiments provide an advantage for the applications 130 seeking to process a relatively large amount of unstructured data stored in the key-value stores 110. For example, if one of the applications 130 that is seeking to process a large amount of unstructured data is a distributed application, meaning that the application has many data managers 120 of DMNs working on a single namespace, then the storage system 100 is further improved by the use of distributed object stores. This is due to distributed object stores being able to provide scalable storage that is able to grow with the functionality of new or changing applications.

To provide consistent latency and performance, data platform software of the disclosed embodiments may use a shared storage model where the data managers 120 of the DMNs are responsible for serving the application data to the applications 130, while the underlying storage nodes host the key-value stores 110, and export the application data to the DMNs as shared storage. That is, the storage system 100 utilizes one or more storage nodes (e.g., the key-value stores 110) for efficiently storing different classes of data to one or more underlying drives, and one or more data management nodes (DMNs) (e.g., the data managers 120) for processing and managing data.

Figure 2:
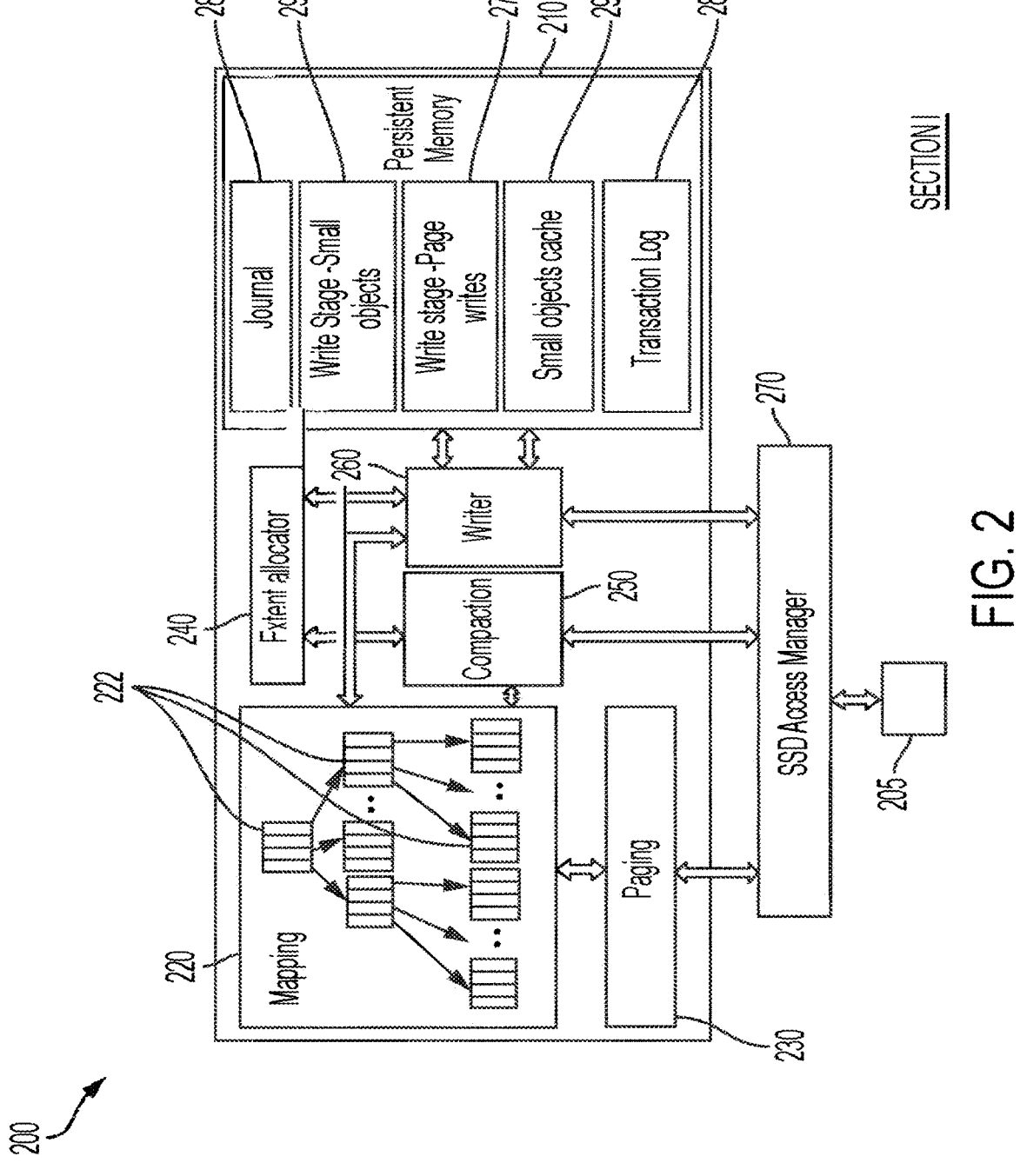
FIG. 2 is a block diagram of a storage system, according to some embodiments of the present disclosure.

FIG. 2 is a block diagram of a storage system, according to some embodiments of the present disclosure.

Referring to FIG. 2, a metadata store (MDS) 200 is a mutable key-value (KV) store. The MDS 200 may be part of one or more of the storage nodes (e.g., the key-value stores 110 of FIG. 1). The MDS 200 may be used to store metadata that is generated from one or more DMNs (e.g., the data managers 120 of FIG. 1). That is, metadata corresponding to one or more data objects may be generated internally by the storage system 100. The metadata may include an object identifier. Accordingly, and in a manner similar to key-value pairs, each object may include an object identifier and the object data.

Performance of the distributed applications 130 may depend on how efficiently the storage system 100 may serve the data given an object identifier. For example, performance of a distributed object store may be determined by the ability to have consistent latency with respect to accessing the data objects (e.g., as the distributed object stores scale out). That is, the distributed storage system 100 may scale, or grow, by adding storage nodes to thereby increase the storage capacity of the storage system 100. However, as a distributed object store scales out, the ability to have consistent latency with respect to accessing data objects of the storage system 100 may be impacted.

Performance of distributed object stores may also be determined by the ability to manage an underlying persistent storage for efficient data layout. That is, as the storage system 100 scales, the ability to manage the underlying persistent storage for efficient data layout may be impacted as well. Accordingly, the storage system 100 of some embodiments uses a memory module (e.g., a non-volatile dual in-line memory module (NVDIMM), storage class memory (SCM), etc.) as persistent memory (PMEM). The persistent memory may be a storage class memory, although any system memory may be used for the persistent memory in other embodiments.

In some embodiments, objects may be suitably stored depending on their attributes. That is, how, when, and where the objects are stored in the MDS 200 may be determined based on one or more respective attributes associated therewith. For example, small writes of small objects may be staged either in an active block of the persistent memory 210 (e.g., in active block 330 described further with respect to FIG. 3 below) or cached in the persistent memory 210.

For a small object having an attribute set to "long," or having an attribute that is unspecified, the small object may be directly staged in the active block 330 to be written to a drive (e.g., a solid state drive (SSD) 205) at a later time. For example, the persistent memory 210 may stage small objects, or small writes (e.g., write operations for writing relatively small objects), into a contiguous buffer (e.g., in a write stage 295) until the buffer size reaches an optimal size for the display platform software to write the data sequentially into an underlying drive (e.g., into one or more solid state drives (SSDs) 205). That is, a small object with the "long" attribute that is staged in the active block 330 may be written to the SSD 205 when the active block gets full.

A size of the active block 330 for staging the small writes may be selected based on a suitable SSD write size for the SSD 205. For example, a suitable SSD write size may be about 128 KB. By staging all small writes in the persistent memory 210, frequent small writes that would otherwise be written directly to the SSD 205 may be avoided. Further, by staging all small writes in the persistent memory 210, a corresponding input output thread (IO) may be acknowledged once the write is copied to the persistent memory 210, thereby providing low latency.

Contrastingly, a small object having an attribute set to "short" may be cached in the persistent memory 210 (e.g., in a small objects cache 290), as small objects with the "short" attribute may change relatively frequently due to frequent updates. Then, when the object is ready to be evicted from cache/from the persistent memory 210, the object may be written to the SSD 205 and marked for deletion from the persistent memory 210.

Accordingly, embodiments of the present disclosure efficiently utilize persistent memory (e.g., the persistent memory 210) to avoid writing constantly or frequently changing objects (e.g., metadata objects) to the corresponding drive (e.g., the SSD 205). That is, the MDS 200 may use the SSD 205 and the persistent memory 210 to respectively store data and corresponding metadata.

Figure 3:
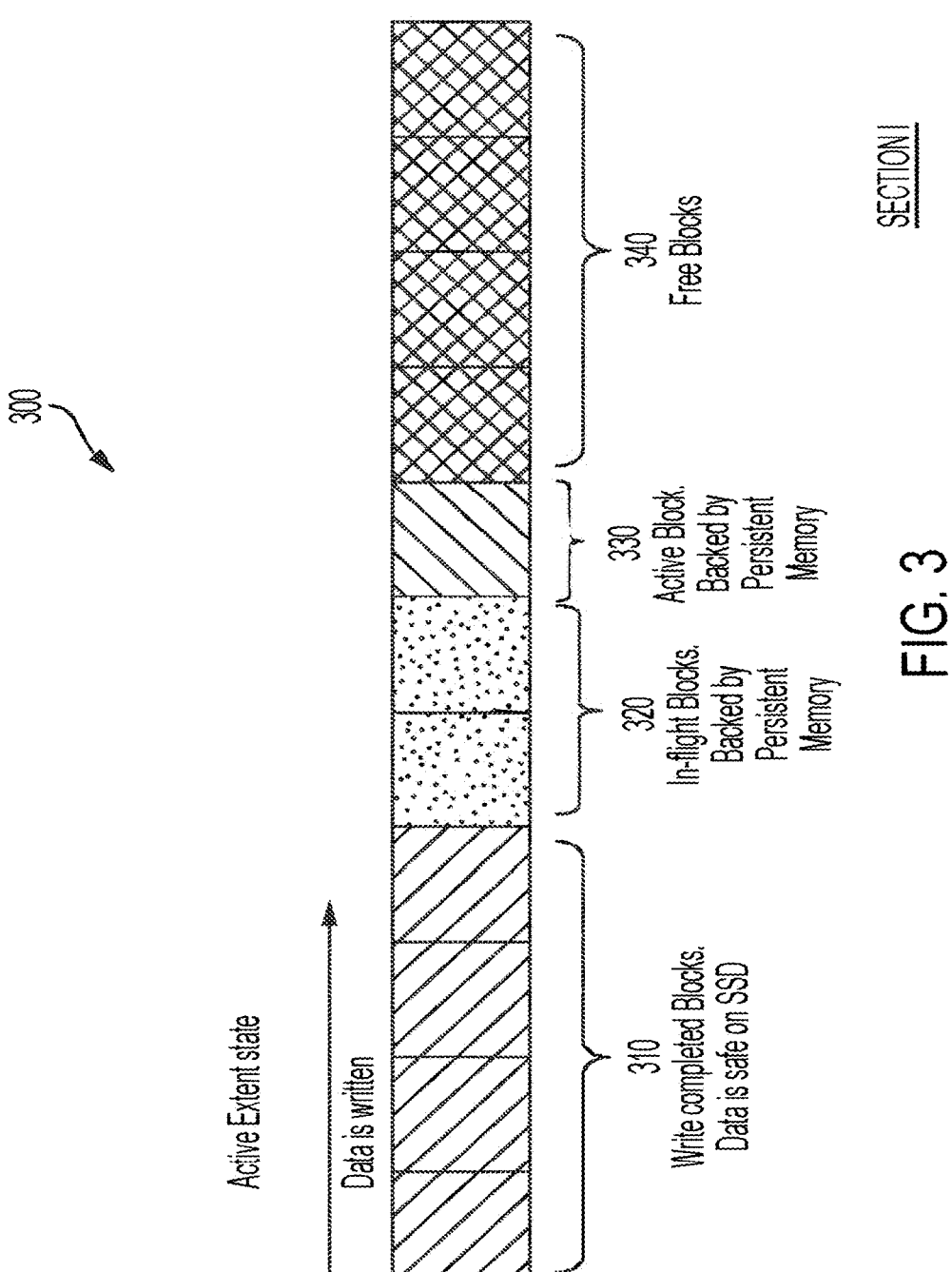
FIG. 3 is a block diagram depicting an extent, according to some embodiments of the present disclosure.

An amount of resources of the persistent memory 210 that are suitable for staging in-flight blocks (e.g., see in-flight blocks 320 discussed further with respect to FIG. 3) and active blocks 330 is relatively very low. That is, resources of the persistent memory 210 that are used for staging in-flight blocks 320 and active blocks 330 may be very small factor of a suitable SSD write size.

FIG. 3 is a block diagram depicting an extent, according to some embodiments of the present disclosure.

Referring to FIG. 3, data platform software running on the storage nodes may "chunk up," or partition, the SSD 205 into relatively small, equally sized chunks of data. The equally sized chunks of data may be referred to as "extents." A size of an individual extent 300 may be large enough where thousands of objects may be written into a given extent 300, and small enough to have an ability to find free available extents without having to spend additional effort to make a free extent available (e.g., as new data is written into the storage system 100).

Objects that are not considered to be small objects may be categorized as large objects. Depending on the object size, and depending on one or more attributes corresponding to the object, a partial object, or a whole object, may be written directly to the SSD 205. Because the SSD 205 may be efficient for big writes, staging at the persistent memory 210 may be avoided.

The extent 300 may be open for large writes. For example, an extent allocator 240 may allocate, on demand, an LBA range from the SSD 205 to provide a layout for the various objects stored on the MDS 200. A number of extents 300 that may be suitable for the MDS 200 is not particularly limited.

In an extent 300, there may be some blocks that are already persisted on the SSD 205 (e.g., write completed blocks 310). Some blocks may be in transit/in-flight (e.g., in-flight blocks 320), and other blocks may be active blocks 330 that are backed by the persistent memory 210 (e.g., blocks that are not yet entirely filled). Also, there may be one or more free blocks 340. In some embodiments, each of the blocks may have a size of about 128 KB, which may enable efficient performance of the SSD 205, although the present disclosure is not limited thereto.

Further, referring back to FIG. 2, a compaction module 260 for performing a compaction process. Because of the mutable nature of the metadata objects, the data platform software may manage storage space defragmentation by a method referred to as compaction. That is, as objects are deleted or aggregated, an extent 300 may generate some invalid data. At any point, there may be multiple extents 300 that are open in the storage system 100 including the MDS 200. Each extent 300 may then track an amount of invalid data stored in the MDS 200, and a compaction process may use an attribute of the extent 300, or may use information indicating that the corresponding data is invalid, to determine when to suitably start compaction on an extent 300. Accordingly, the compaction module 260 may engage in compaction, wherein valid data is moved from a fragmented extent, which includes some invalid data, to new extent.

In some embodiments of the present disclosure, object data may be written into the extent 300 from left to right. Furthermore, header data may be written from right to left. Accordingly, as object data is entered, software for managing the MDS 200 may push the metadata in a serialized fashion to the SSD 205. That is, with respect to the layout of the data, the metadata, which may include the extent headers, and the object data may be entered from two different directions.

Conventionally, both of the data and the metadata would be read during a compaction operation. However, in some embodiments of the present disclosure, the compaction module 260 may initially read only the extent headers (i.e., the metadata), which may be as small as 128 KB. By avoiding reading the object data, the extent headers may be read relatively quickly, thereby improving system operation by reducing the workload of the processor and decreasing the amount of interaction with the drive.

That is, the small objects need not be randomly accessed, and instead may be written into the memory in a relatively large sequential chunk (e.g., about 1 MB) containing multiple objects, some of which may be invalid. Accordingly, the valid objects may be identified by simply reading the extent headers/metadata, which may be significantly smaller than the corresponding objects (e.g., 128 KB), and then may be moved to a new or different extent. Therefore, the new extent 300 may (initially) contain only valid objects (e.g., may contain 1 MB of valid of objects). If the extent headers indicate that no object in the extent is valid, the system may avoid reading the extent entirely. By reading the extent headers without reading the object data before performing a read operation for reading the object data, latency may be improved.

After reading the extent headers, a processor may determine which objects are valid and which objects are invalid. After making such a determination, valid object data, which may be in 1 MB chunks, may be moved (along with the corresponding metadata) to a new or different extent, while object data corresponding to invalid extent headers may be ignored. The reading of valid 1 MB chunks of data may continue until the entire extent is read and the valid objects are moved to a different extent.

Compaction may ensure that small objects are not randomly accessed in the SSD 205, but instead are read in 1 MB-sized sequential chunks into the memory. This ensures that the traffic to SSD 205 is avoided completely and avoids random, access thereby reducing the read amplification. It should be noted that, although the sequential chunks described herein are described as being 1 MB in size, the chunks may be differently sized in different embodiments. For example, if a typical data object is only 64 bytes, which may be indicated by data collection statistics (that is, if most of the data objects are relatively small objects), the size of the sequential chunks may be reduced to a smaller granularity to reduce processes.

When the extent allocator 240 reaches a threshold for a number of available extents 300, the extent allocator 240 may call stores to perform "garbage collection" with respect to their extents 300. The garbage collection process may review a list of extents 300, and may begin compaction on the extent that has a suitable amount of invalid data (e.g., more than a threshold amount of allowable invalid data).

Accordingly, embodiments of the present disclosure provide improvements to data storage by having the ability to efficiently run background compaction, which may increase the endurance of a corresponding drive (e.g., the SSD 205) by reducing a number of writes thereto, while reducing or minimizing write amplification, read amplification, and space amplification. For example, read amplification may be reduced by avoiding random access of small objects stored in the corresponding drive.

Also, as shown in FIG. 2, a writer 250 for performing write operations may use the extents 300 to provide a layout for the objects on disk (e.g., on the SSD 205). The writer 250 may issue writes to the SSD 205. That is, a user application (e.g., one of the applications 130 of FIG. 1) may direct the writer 250 (e.g., via an access manager, such as a drive/SSD access manager 270) to write an object to the storage system 100. Depending on a size of an IO thread, the writing process may stage the data in the persistent memory 210 (e.g., in the write stage 295 for small writes) or may issue an IO thread directly to the SSD 205. The writing process may allocate extents 300, and may pack the data to be written to the SSD 205. On completion of a write operation, the writer 250 may initiate a suitable protocol to update a map entry (e.g., in a mapping module 220) to point to the SSD address at which the data is located.

Also, the MDS 200 may be tuned for reduced write amplification while providing power-fail guarantee. The characteristics of the data and the metadata may be very different. The MDS 200 may be tuned or optimized for low latency, small-sized writes, such as metadata objects, which are typically much smaller than the data objects to which the metadata object corresponds. The data objects from the DMNs are typically large in size and are immutable, while the metadata written to the MDS 200 may be very small objects. For example, the metadata objects and data objects may be, respectively as small as about 64 bytes and as large as about 1 MB. Small object writes may be, for example, objects having a size of about 4 KB or less, although the present disclosure is not limited thereto.

Figure 4:
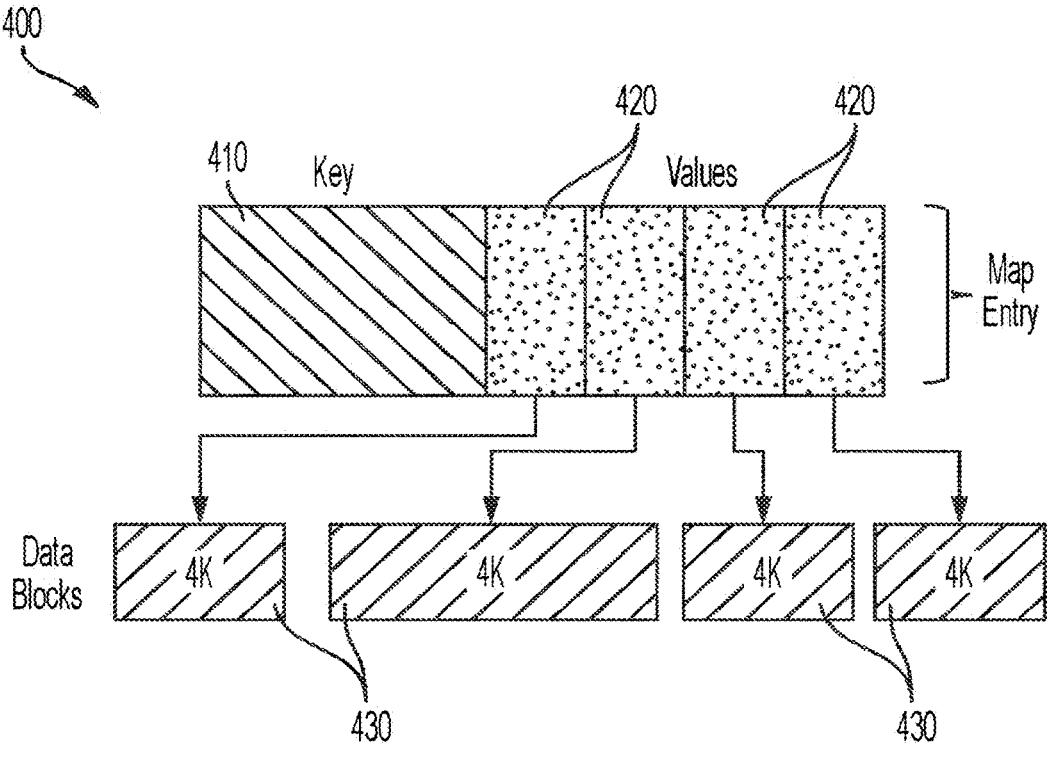
FIG. 4 is a block diagram depicting an append, according to some embodiments of the present disclosure.

FIG. 4 is a block diagram depicting an append, according to some embodiments of the present disclosure.

Referring to FIGS. 2 and 4, according to some embodiments, the MDS 200 may support append functionality. In append functionality, an incremental update to the data is appended at the end of a current object, thereby making the object mutable. Due to object mutability, some objects may grow from a very small size to sizes of up to about 2 MB or more. Based on the workload these mutable metadata objects may be deleted, thereby potentially causing fragmentation problems.

The append functionality may be achieved by using the mapping module 220. The mapping module 220 may map a key 410 (e.g., a metadata object key) to a physical logical block address (LBA) (e.g., an LBA on the SSD 205 and/or the persistent memory 210) where the value(s) 420 corresponding to the key 410 are stored. Mapping may be maintained for each group 222. Each key 410 may have a relatively small number of bytes that may be used as a group identifier. Each group 222 may be mapped to a DMN placement group. Query operations (e.g., for searching for, filtering, grouping, joining, selecting, or ordering data) may be confined to a group 222. The DMN(s) may be responsible for managing cross-group, or multi-group, operations.

An entry in the map/mapping tree, which is created by the mapping module 220, may point to a location in the persistent memory 210 or in the SSD 205, depending on where the object corresponding to the entry is located.

An append 400, which may be a map entry corresponding to the mapping tree created by the mapping module 220, may be staged at the persistent memory 210 depending on a size of, and/or one or more attributes of, the append 400. In general, the MDS 200 may expect most of the appends 400 to be relatively small in size.

In the event of a small append, the data of the append 400 may be staged in the persistent memory 210. The unit of the persistent memory page size may be, for example, about 4 KB. If the persistent memory page is full (e.g., if a buffer corresponding to a write stage 275 for page writes is full), it may be flushed to the SSD 205. If a key 410 has multiple pages in the persistent memory 210, the key 410 may be consolidated when flushing to the SSD 205 (e.g., when writing the key 410 to the SSD 205 while marking the copy of the key 410 staged in the persistent memory 210 for deletion).

Depending on what time the append 400 happens to a corresponding object, a key 410 may be used to point to multiple physical addresses. That is, a key 410 may correspond to multiple values 420. FIG. 4 depicts how values 420 of the append 400 may point to multiple data blocks 430 (e.g., to LBAs on the SSD 205). The data blocks 430 may collectively correspond to a data object.

For example, in the context of a metadata operation corresponding to a metadata object stored in the MDS 200, a metadata object may be initially stored. Sometime thereafter, it may be suitable for additional data to be added to the metadata object. However, because other objects may have been stored in the MDS 200 in the interim, it might not be possible for an object corresponding to the additional data to be laid out together with the initially stored metadata object. That is, because different data may be sought to be stored in the MDS 200 at different times, the respective objects corresponding to the different data might not be able to be laid out together.

Accordingly, each append 400 may be treated as a fragment of a metadata object. Concatenation is made possible by mapping the data blocks 430 (e.g., by using a mapping module 220 to put fragments in a map). Initially, there may be one key and only one corresponding value. As new data is added to the initial object, additional values 420 are attached to the append 400. Each additional value may be attached to indicate the corresponding additional data block 430 where the new data is stored on the SSD 205. Accordingly, the various objects corresponding to the data blocks 430 and based on the values 420 of the map entry may be stitched together.

It should be noted that, even though the various objects corresponding to the data blocks 430 are fragmented, the MDS 200 may perform a write operation for writing the fragmented objects to a different location as a single block with only one single corresponding value (e.g., shortly after a read operation for reading the object corresponding to the multiple data blocks is performed). That is, and for example, during a read operation, the various data blocks 430 may be stitched together to send a single object to the client, which may be used as an opportunity to write a single value representing the object to the SSD 205 without significant wear of the SSD 205.

It may be suitable to use a sufficiently sized DRAM to keep all of the index nodes, or internal nodes, in the DRAM. A mapping page that is persisted on the SSD 205 may have entries pointing only to the SSD 205. For example, an on-disk mapping page on the SSD 205 might never point to the persistent memory 210.

However, depending on the number of objects stored, and depending on how the objects are stored (e.g., by using appends 400), the mapping tree might not be able to fit in dynamic random access memory (DRAM). Hence, a paging module 230 for implementing a paging system may be suitable to page in and page out mapping pages indicating respective mapping trees.

The paging module 230 may be suitable for two reasons. First, paging operations may enable the MDS 200 to avoid recreating the mapping tree after shutdown or failure of the MDS 200, as all of the mapping nodes may be persisted on the SSD 205. Secondly, because the DRAM may be sized such that less than all of the mapping pages may fit in the DRAM, paging operations may assist in swapping pages into and/or out of the SSD 205. In some embodiments, all of the mapping pages may be about 4 KB in size. Further, in some embodiments, a map entry may be relegated to only a single mapping page (i.e., might not span across two mapping pages) to provide further simplification of operation.

The persistent memory 210 may also include a journal 280. A primary consumer of the journal 280 may be the mapping module 220. The mapping module 220 may use the journal 280 to store transient map entries, before the mapping pages are persisted on the drive/SSD 205.

The journal 280 may be implemented as a circular buffer, and may have fixed length elements and a contiguous block circular buffer. Entries may be added to the head and removed from the tail, although some entries may be invalid between the head and tail.

Figure 5:
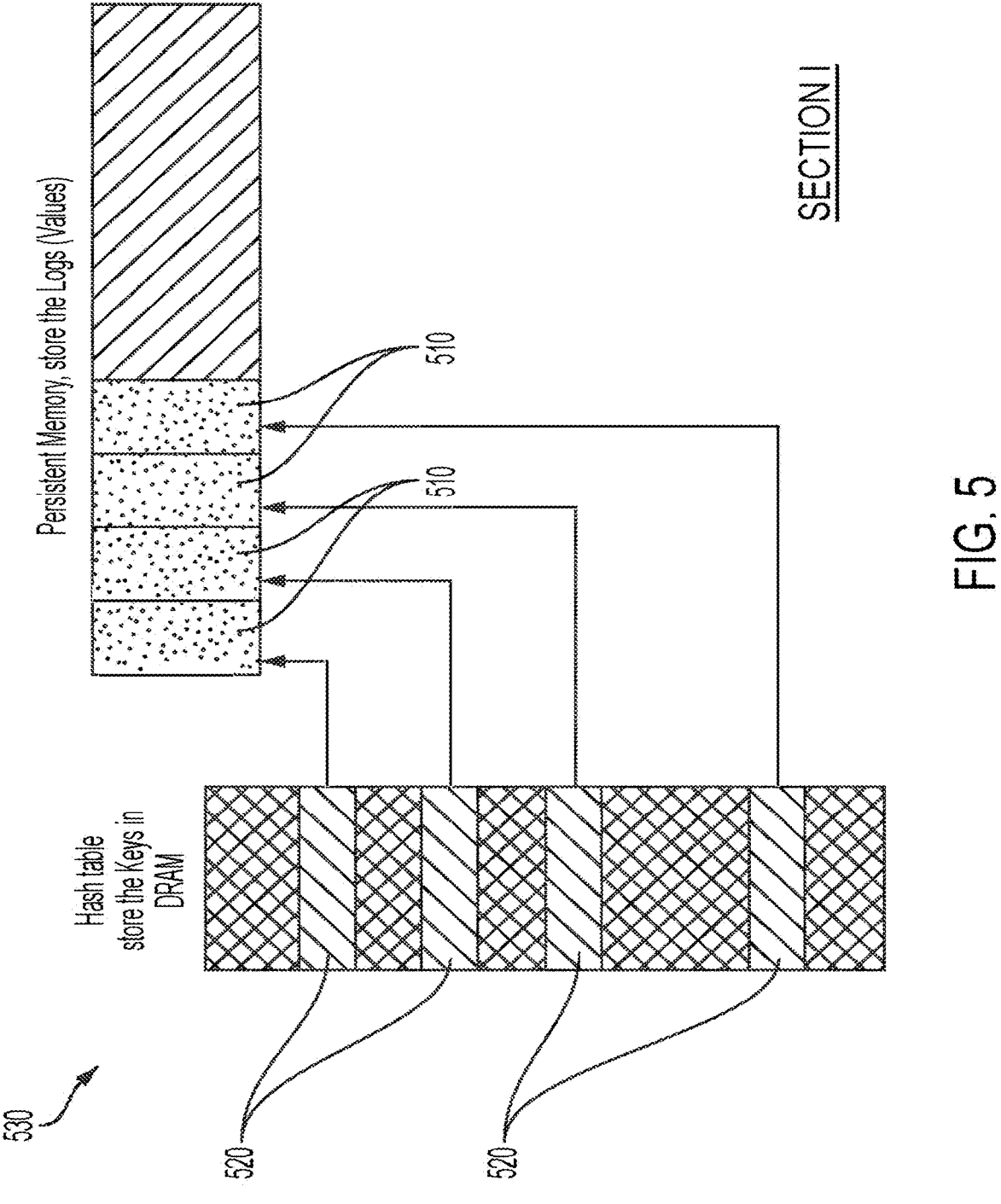
FIG. 5 is a block diagram depicting transaction logs for storing values of key-value pairs, according to some embodiments of the present disclosure.

FIG. 5 is a block diagram depicting transaction logs for storing values of key-value pairs, according to some embodiments of the present disclosure.

Referring to FIG. 5, according to some embodiments of the present disclosure, transaction logs 510 may be used by one or more DMNs to recover memory transactions (e.g., in the event of a system crash or power failure). The transaction logs 510 may be short-lived objects that are generally very small in size and that are intended to have a limited life cycle. Each transaction log 510 may be of a fixed size. Further, a total number of transaction logs 510 may also be fixed. The transaction logs 510 may be stored in a transaction log module 285 in the persistent memory 210.

The transaction logs 510 have key-value semantics. For example, a hash table (e.g., a transaction log map) 530 may be used to store keys 520 in memory, and the keys 520 may be used to identify a location of values (the transaction logs 510) that are persisted in the persistent memory 210.

Additionally, in some embodiments, there may be a maximum number of outstanding transaction logs 510 at any given point in time. Accordingly, the keys 520 for mapping to the values 520 that are stored in the persistent memory 210 may be maintained in a simple hash table as the transaction log map 530 in DRAM. Because the keys 520 are mapped in the hash table stored in DRAM, the hash table may be recreated during recovery following power failure or system crash. Each log entry in the hash table may contain a key.

In some embodiments, the transaction log map 530 may be stored in DRAM. However, in other embodiments, the transaction log map 530 may be kept in the persistent memory 210 (e.g., in the transaction log module 285). Accordingly, the transaction log map 530 need not be ever written to the drive/SSD 205. Accordingly, the transaction log map 530 may be used to decrease an amount of time for rebuilding following power failure or system crash.

Accordingly, the MDS 200 may store the transaction logs 520 as keys in persistent memory (e.g., the DRAM or the persistent memory 210) to be deleted at an appropriate time without ever having been written to the SSD 205, thereby increasing endurance of the SSD.

As described above, embodiments of the present disclosure provide a distributed storage system capable of scaling linearly, with respect to both read and write operations that may occur in parallel, by allowing data to be distributed across all available storage nodes, the structure of the data being maintained by data management nodes.

Also, embodiments of the present disclosure provide improvements to data storage by having the ability to have an object store that is part of a relatively large and scalable distributed storage system, and that is designed for a metadata workload that may have variably sized objects.

Further, embodiments of the present disclosure improve drive functionality by writing large objects and sequential writes into the drive, while refraining writing the small objects into the drive in a random access fashion. That is, the embodiments provide a methodology of writing small objects efficiently to the object store that absorbs the overhead of writing small objects to the drive in a random-access fashion. Accordingly, by decreasing the number of writes to the drive, endurance of the drive may be improved, and IO latency may be improved.

Accordingly, embodiments of the present disclosure provide advantages for applications used for processing relatively large amounts of unstructured data, such advantages providing increased benefit for a distributed system where the data management nodes work on a single name space, while maintaining consistency of performance under load.

One or more embodiments according the present disclosure may include one or more characteristics of one or more of the following clauses (although embodiments are not limited thereto):

Clause 1: A method of data storage in a data storage system, the method comprising:
identifying object headers respectively corresponding to object data;
storing the object data at one side of an allocated data chunk; and
storing the object headers at another side of the allocated data chunk.

Clause 2: The method of clause 1, further comprising:
deleting or aggregating the object data such that invalid data causes the allocated data chunk to be fragmented;
reading one of the object headers to determine a corresponding one of the object data is a valid data object; and
moving the valid data object to a new allocated data chunk.

Clause 3: The method of clause 1, further comprising:
reading one of object headers to determine a corresponding one of the object data is an invalid data object; and
refraining from reading the invalid data object.

Clause 4: The method of clause 1, further comprising:
reading the object headers to determine that the object data are valid object data;
determining that the valid object data correspond to a single object;
concatenating the valid object data; and
writing the valid object data as the single object to a drive.

Clause 5: The method of clause 1, further comprising:
staging the object data into a contiguous buffer in a persistent memory;
determining the contiguous buffer has reached a threshold; and sequentially writing data corresponding to the object data to a drive.

Clause 6: The method of clause 1, further comprising:
determining one of the object headers has an attribute set to long; and
staging the one of the object headers in an active block in a persistent memory and writing the active block to a drive; or
directly writing the active block to the drive.

Clause 7: The method of clause 1, further comprising:
determining one of the object headers has an attribute set to short; and
caching the one of the object headers in a persistent memory.

Clause 8: A data storage system configured to store data, the data storage system comprising a storage node comprising a key-value store for storing data, and a data management node for sending or retrieving the data from the storage node, wherein the data management node is configured to:
identify object headers respectively corresponding to object data;
store the object data at one side of an allocated data chunk; and
store the object headers at another side of the allocated data chunk.

Clause 9: The data storage system of clause 8, wherein the data management node is further configured to:
delete or aggregate the object data such that invalid data causes the allocated data chunk to be fragmented;
read one of the object headers to determine a corresponding one of the object data is a valid data object; and
move the valid data object to a new allocated data chunk.

Clause 10: The data storage system of clause 8, wherein the data management node is further configured to:
read one of object headers to determine a corresponding one of the object data is an invalid data object; and
refrain from reading the invalid data object.

Clause 11: The data storage system of clause 8, wherein the data management node is further configured to:
read the object headers to determine that the object data are valid object data;
determine that the valid object data correspond to a single object;
concatenate the valid object data; and
write the valid object data as the single object to a drive.

Clause 12: The data storage system of clause 8, wherein the data management node is further configured to:
stage the object data into a contiguous buffer in a persistent memory;
determine the contiguous buffer has reached a threshold; and
sequentially write data corresponding to the object data to a drive.

Clause 13: The data storage system of clause 8, wherein the data management node is further configured to:
determine one of the object headers has an attribute set to long; and
stage the one of the object headers in an active block in a persistent memory and write the active block to a drive; or directly write the active block to the drive.

Clause 14: The data storage system of clause 8, wherein the data management node is further configured to:

determine one of the object headers has an attribute set to short; and
cache the one of the object headers in a persistent memory.

Clause 15: A non-transitory computer readable medium implemented on a distributed object store system, the non-transitory computer readable medium having computer code that, when executed on a processor, implements a method of data storage by a data management node, the method comprising:
identifying object headers respectively corresponding to object data;
storing the object data at one side of an allocated data chunk; and
storing the object headers at another side of the allocated data chunk.

Clause 16: The non-transitory computer readable medium of clause 15, wherein the computer code, when executed by the processor, further implements the method of data storage by causing the data management node to:
delete or aggregate the object data such that invalid data causes the allocated data chunk to be fragmented;
read one of the object headers to determine a corresponding one of the object data is a valid data object; and
move the valid data object to a new allocated data chunk.

Clause 17: The non-transitory computer readable medium of clause 15, wherein the computer code, when executed by the processor, further implements the method of data storage by causing the data management node to:
read one of object headers to determine a corresponding one of the object data is an invalid data object; and
refrain from reading the invalid data object.

Clause 18: The non-transitory computer readable medium of clause 15, wherein the computer code, when executed by the processor, further implements the method of data storage by causing the data management node to:
read the object headers to determine that the object data are valid object data;
determine that the valid object data correspond to a single object;
concatenate the valid object data; and
write the valid object data as the single object to a drive.

Clause 19: The non-transitory computer readable medium of clause 15, wherein the computer code, when executed by the processor, further implements the method of data storage by causing the data management node to:
stage the object data into a contiguous buffer in a persistent memory;
determine the contiguous buffer has reached a threshold; and
sequentially write data corresponding to the object data to a drive.

Clause 20: The non-transitory computer readable medium of clause 15, wherein the computer code, when executed by the processor, further implements the method of data storage by causing the data management node to:
determine one of the object headers has an attribute set to short; and cache the one of the object headers in a persistent memory.

In the description, for the purposes of explanation, numerous specific details provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

SECTION II

Systems and Methods for Data Versioning and Snapshotting

The text in the present "Section II" of the Specification, including any reference numerals or characters and any references to figures, refer and correspond to the FIGS. 6-14 with the label "Section II", and does not refer or correspond to the text in sections I, III, or IV, nor any of the reference numerals, characters, or figures with the labels on the figure sheets that have the label "Section I", "Section III", or "Section IV". That is, each of the Sections I-IV in the present Specification should be interpreted in the context of the corresponding description in the same section and the figures labeled with the same section, respectively. Notwithstanding the foregoing, however, various aspects and inventive concepts of the various sections may be applied to aspects and inventive concepts of other sections.

FIELD

Aspects of embodiments of the present disclosure relate to data storage systems, including systems and methods for data versioning and snapshotting.

BACKGROUND

Generally, aspects of data storage systems, such as file systems, protect against data loss via snapshots or file versioning. Snapshots provide a point-in-time image of a file system on a system-wide basis. File versioning provides protection by keeping previous versions of a file on a file-by-file basis.

SUMMARY

Aspects of embodiments of the present disclosure relate to efficient always-on file or object versioning and snapshots, which provide protection against data loss in a data storage system by combining file (or object) versioning and snapshot implementation to provide both continuous data protection and snapshot-based protection. The snapshot aspects provide a consistent view of the data (e.g., the file system) at a specific point in time. The file or object versioning aspects allows for recovery of any changes made to a file or object between different snapshots. Both are native to the data storage system, e.g., native to the file system in the case of embodiments implemented as a file system.

According to one embodiment of the present disclosure, a method for storing versions of data includes: receiving, by a storage controller connected to a storage device, a write command including one or more chunks of data and a data access identifier; writing, by the storage controller, the one or more chunks of data to one or more corresponding locations in the storage device; and updating, by the storage controller, a version log associated with the data access identifier to add a version entry including pointers to the one or more locations in storage device storing the one or more chunks of data.

The data access identifier may identify new data to be stored, and the version entry may be a first entry of the version log.

The data access identifier may identify previously stored data, the version entry may include pointers to one or more locations in the storage device storing chunks of data associated with the data access identifier that are unmodified by the write command, and the method may further include appending, by the storage controller, the version entry to the version log.

The storage controller may further store an active version pointer associated with the data access identifier, the active version pointer identifying a version entry corresponding to a current version of data associated with the data access identifier.

The method may further include compressing each of the one or more chunks of data independently before writing each chunk to the storage device.

According to one embodiment of the present disclosure, a method for reading a version of a data includes: receiving, by a storage controller connected to a storage device, a read command including a data access identifier; retrieving, by the storage controller, a version entry from a version log associated with the data access identifier, the version entry identifying one or more locations in the storage device; reading, by the storage controller, one or more chunks of data from the one or more locations in the storage device; and returning, by the storage controller, the one or more chunks of data associated with the data access identifier.

The read command may further include a version identifier, and the retrieving the version entry from the version log may include identifying the version entry corresponding to the version identifier.

The read command may omit a version identifier, and the retrieving the version entry from the version log may include retrieving an active version pointer corresponding to the version log, wherein the active version pointer identifies the version entry.

The one or more chunks of data may be individually compressed, and the method may further include individually decompressing the one or more chunks of data.

According to one embodiment of the present disclosure, a method for storing versions and snapshots of data includes: receiving, by a storage controller connected to a storage device, a command to capture a snapshot; generating, by the storage controller, a snapshot ID; storing, by the storage controller, the snapshot ID as a current snapshot ID; receiving, by the storage controller, a write command including one or more chunks of data and a data access identifier; generating, by the storage controller, a snapshot entry for the data access identifier with the current snapshot ID; appending, by the storage controller, the snapshot entry to a snapshot log associated with the data access identifier; writing, by the storage controller, the one or more chunks of data to one or more locations in the storage device; and updating, by the storage controller, a version log associated with the data access identifier to add a version entry in response to the write command, the version entry including pointers to the one or more locations in the storage device storing the one or more chunks of data.

The snapshot entry may include a portion of the version log prior to the version entry generated in response to the write command.

The snapshot log may include a previous snapshot entry, and the portion of the version log may include version entries between the previous snapshot entry and the version entry generated in response to the write command.

The method may further include: receiving, by the storage controller, a command to generate a clone based on the snapshot entry; and adding, by the storage controller, a branch writable head having a parent pointer identifying the snapshot entry.

The method may further include: receiving, by the storage controller, a command to capture a second snapshot; generating, by the storage controller, a second snapshot ID; storing, by the storage controller, the second snapshot ID as the current snapshot ID; receiving, by the storage controller, a second write command including one or more second chunks of data and a second data access identifier; generating, by the storage controller, a second snapshot entry for the data access identifier with the current snapshot ID; appending, by the storage controller, the second snapshot entry to a snapshot log associated with the data access identifier and the branch writeable head, the second snapshot entry having a parent pointer identifying the snapshot entry; writing, by the storage controller, the one or more chunks of data to one or more second locations in the storage device; and updating, by the storage controller, a version log associated with the data access identifier to add a second version entry in response to the write command, the version entry including second pointers to the one or more second locations in the storage device storing the one or more second chunks of data.

According to one embodiment of the present disclosure, a method for reading a version of data based on snapshots includes: receiving, by a storage controller connected to a storage device, a read command including a data access identifier and a requested snapshot identifier; retrieving, by the storage controller, a snapshot log associated with the data access identifier; retrieving, by the storage controller, a snapshot entry from the snapshot log having a largest snapshot identifier less than or equal to the requested snapshot identifier; retrieving, by the storage controller, a version entry from the snapshot entry, the version entry including pointers to one or more locations in the storage device; and retrieving, by the storage controller, one or more chunks of data from the one or more locations identified in the version entry, the one or more chunks of data corresponding to a version of data associated with the data access identifier at the requested snapshot identifier.

The retrieving the snapshot log may include identifying a branch of a snapshot tree corresponding to a current writable head.

The snapshot entry may include a portion of a version log associated with the data access identifier.

The snapshot entry may further include an object active version identifying a first version entry in the version log and a file active version identifying a second version entry in the version log.

The data access identifier may correspond to an object identifier, and the retrieving the version entry may include retrieving the first version entry identified by the object active version of the snapshot entry.

The data access identifier may correspond to a file identifier, and the retrieving the version entry may include retrieving the second version entry identified by the file active version of the snapshot entry.

According to some embodiments of the present disclosure, system including a processor and memory may be configured to implement the storage controller in accordance with any of the above embodiments.

BRIEF DESCRIPTION OF THE DRAWINGS

The accompanying drawings, together with the specification, illustrate aspects of some example embodiments of the present invention, and, together with the description, serve to explain the principles of the present invention.

Figure 6:
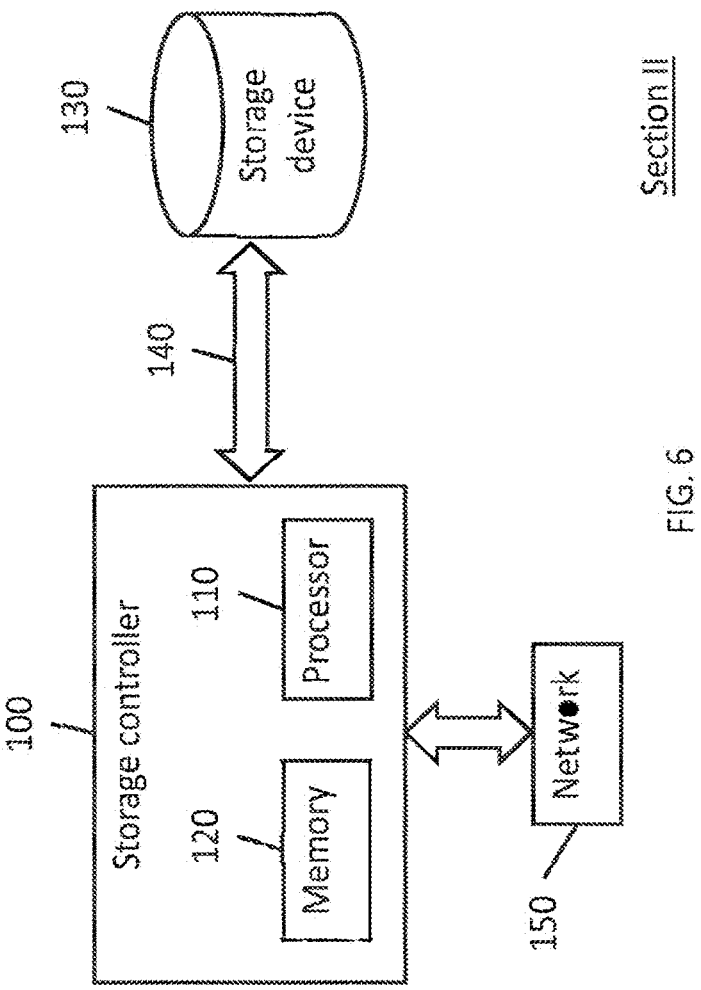

FIG. 6 is a schematic block diagram of a storage system according to one embodiment of the present disclosure.

Figure 7:
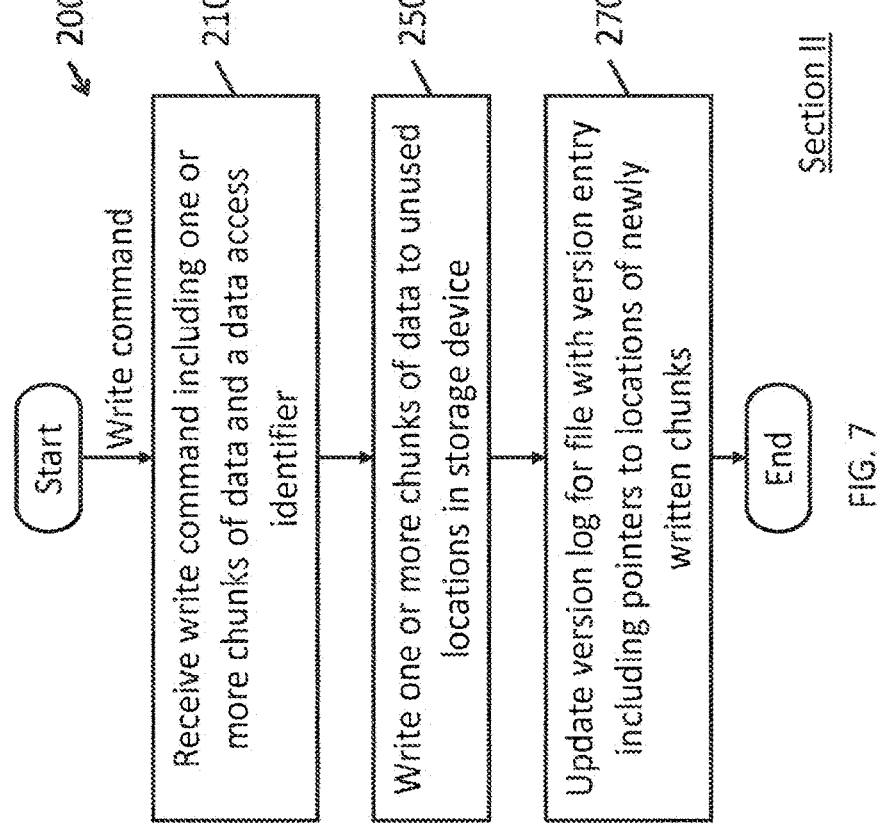

FIG. 7 is a flowchart depicting a method for processing a write command in accordance with one embodiment of the present disclosure.

Figure 8A:
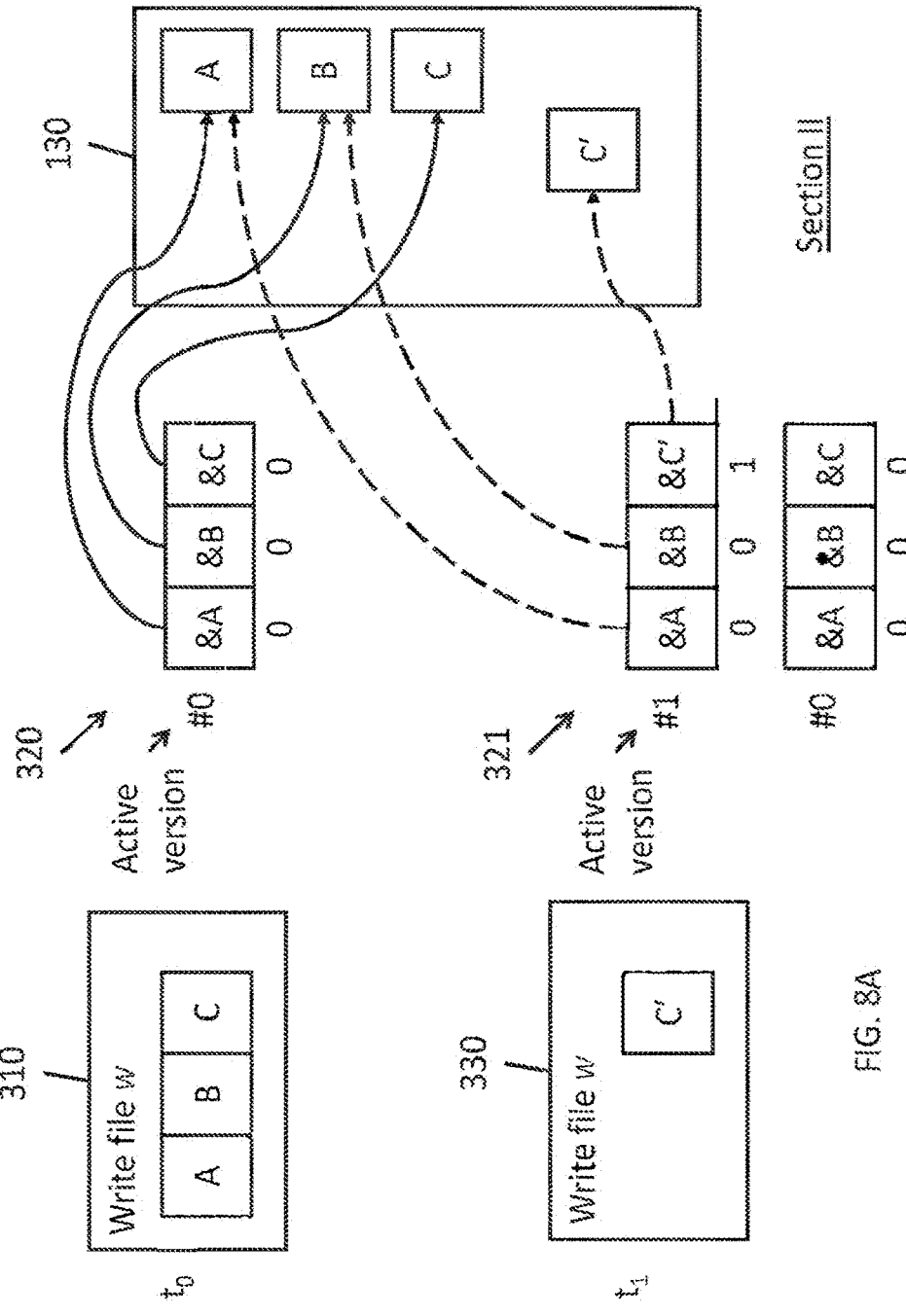

FIG. 8A is a schematic diagram depicting data storage of files and/or objects in multiple chunks and pointers between versions of a stored file or object and the stored chunks of data in accordance with one embodiment of the present disclosure.

Figure 8B:
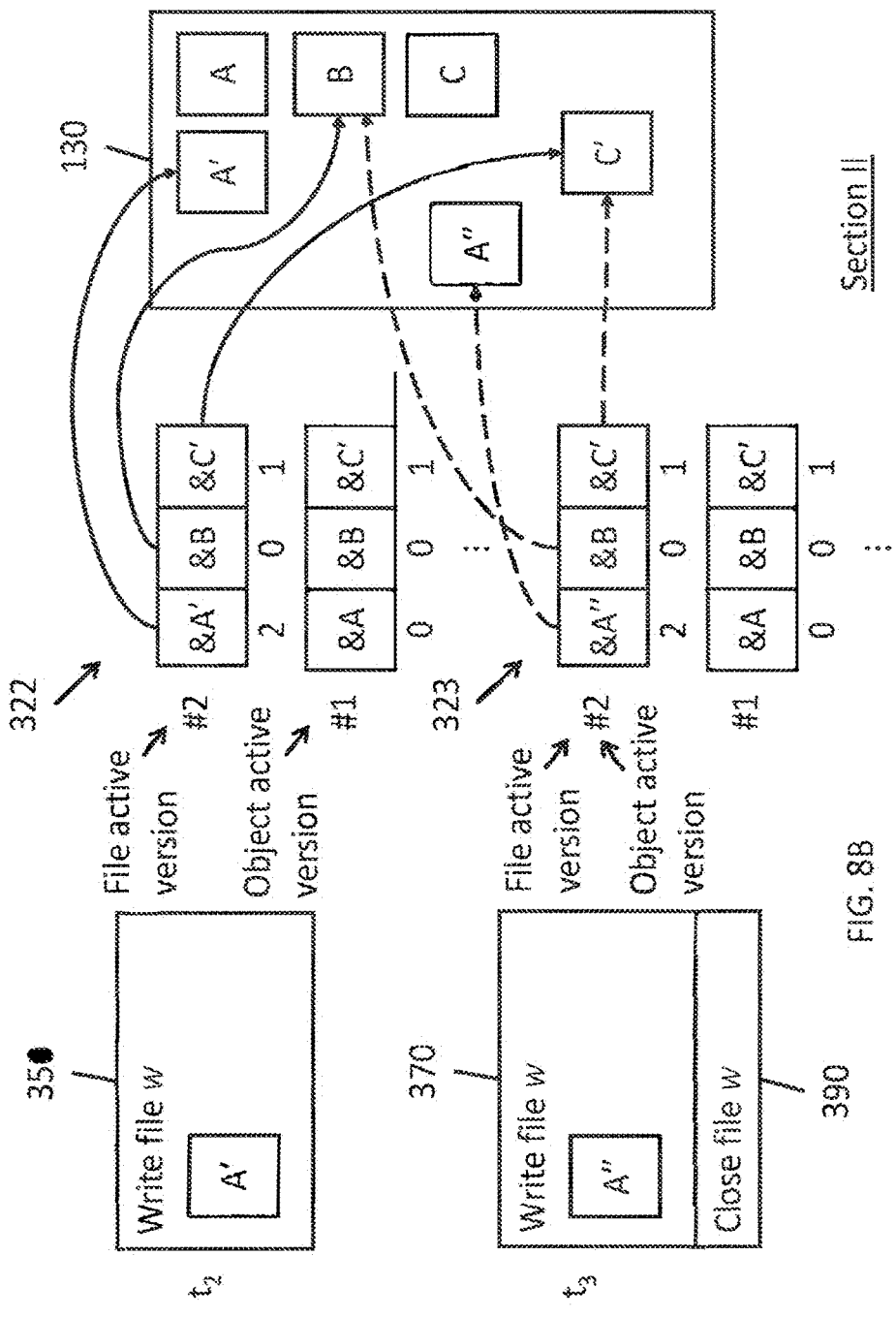

FIG. 8B is a schematic diagram depicting the case of multiple writes to a same chunk of a file according to one embodiment of the present disclosure.

Figure 8C:
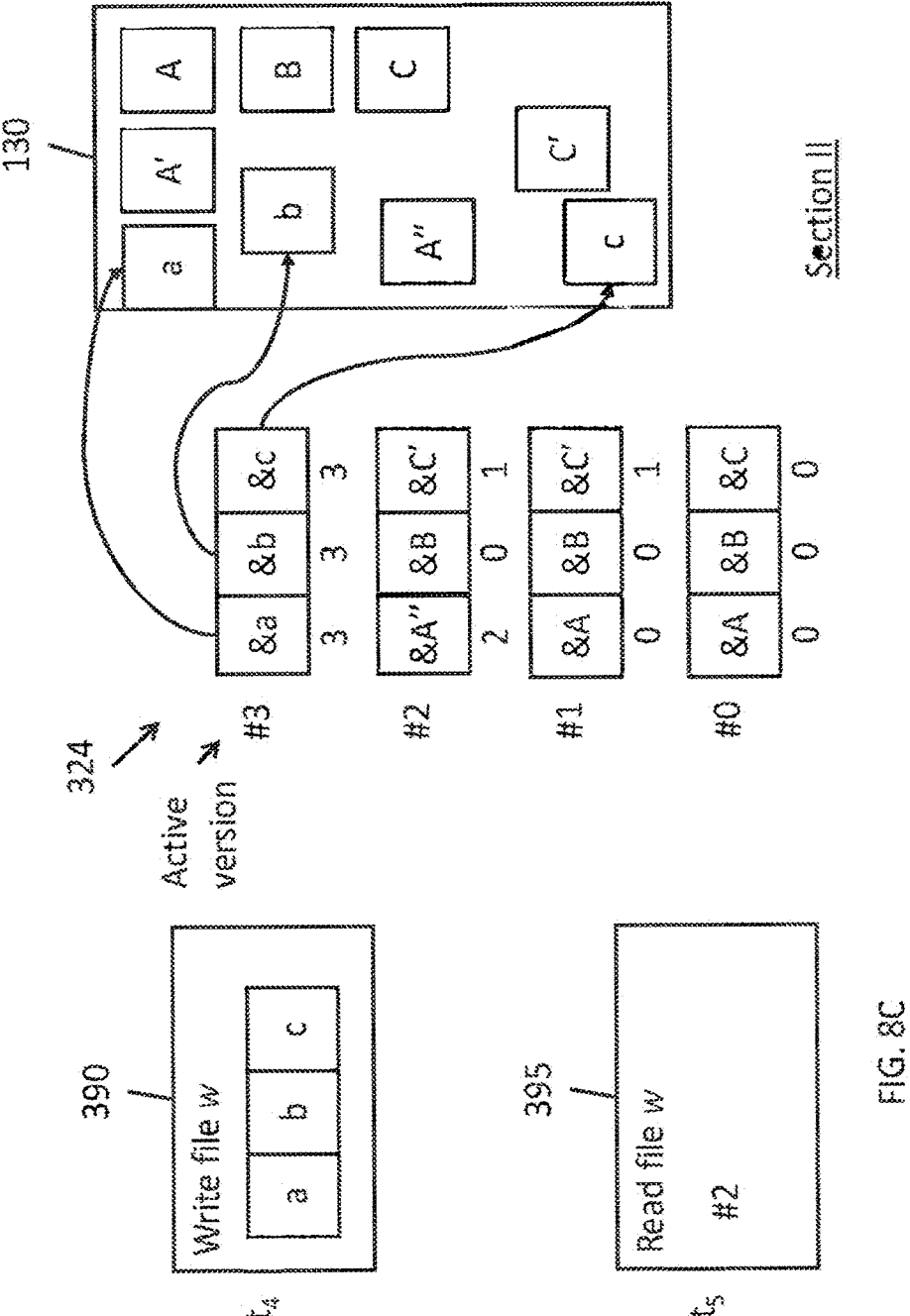

FIG. 8C is a schematic diagram depicting the case of a write replacing all of the chunks of data associated with a file according to one embodiment of the present disclosure.

Figure 9:
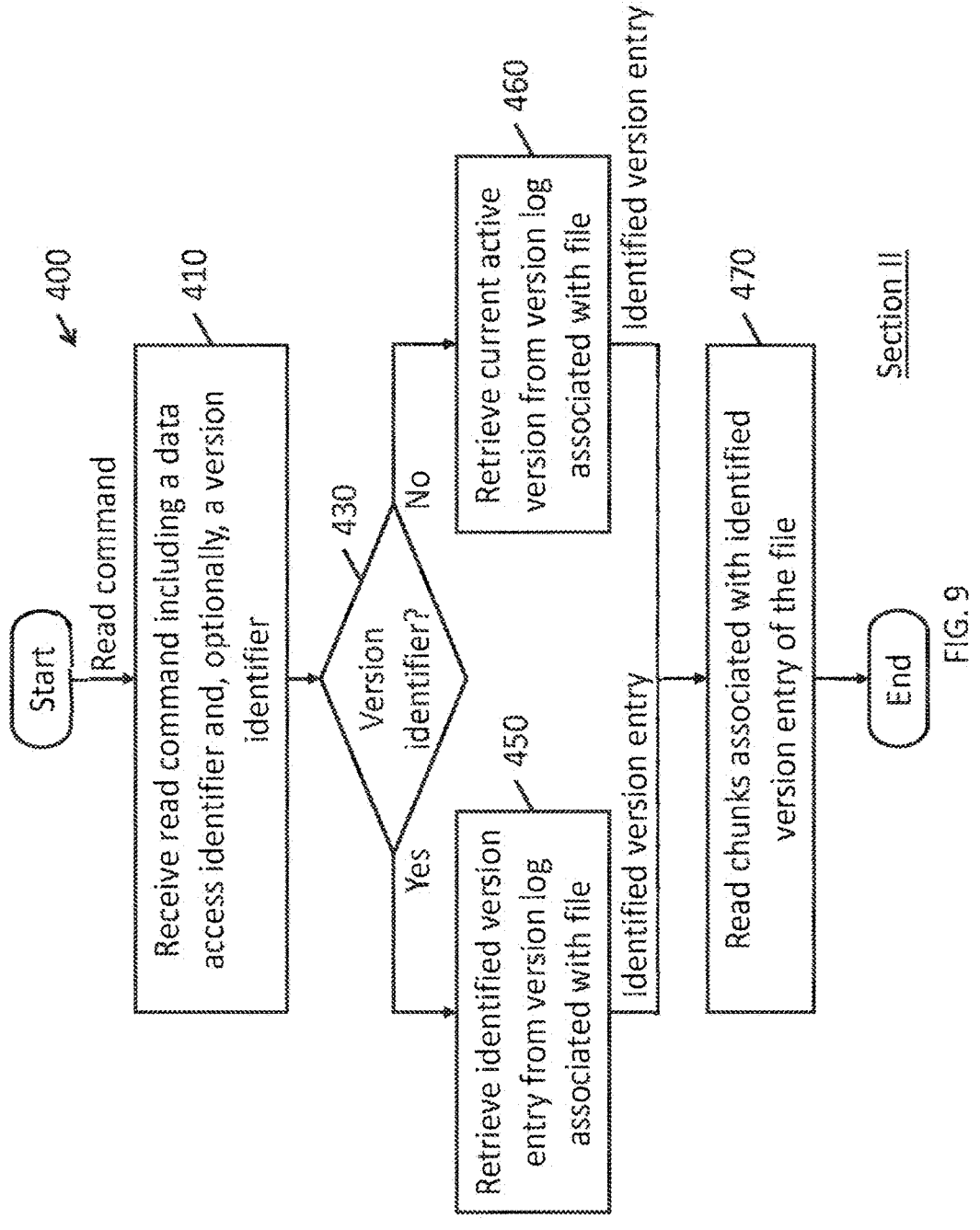

FIG. 9 is a flowchart depicting a method for reading a file or object from a storage device based on file version according to one embodiment of the present disclosure.

Figure 10:
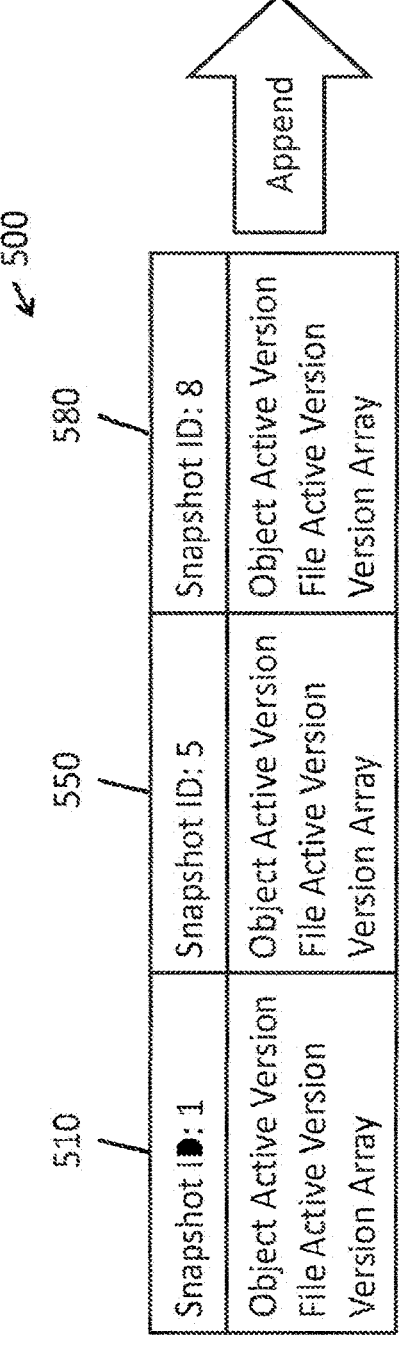

FIG. 10 is a schematic depiction of a snapshot log for a file according to one embodiment of the present disclosure.

Figure 11:
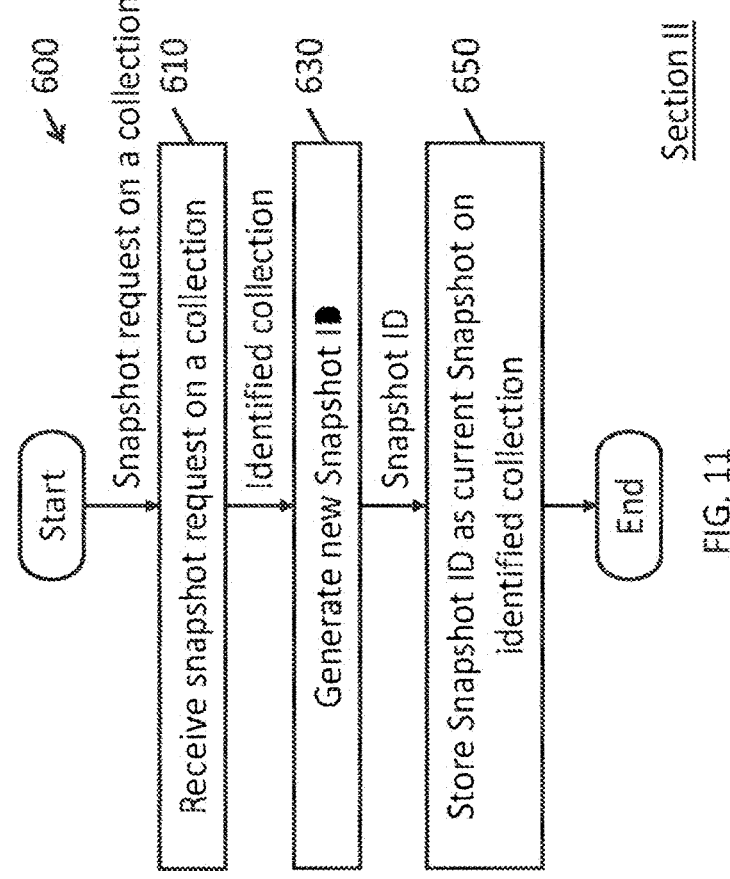

FIG. 11 is a flowchart depicting a method of capturing a snapshot of a Container according to one embodiment of the present disclosure.

Figure 12:
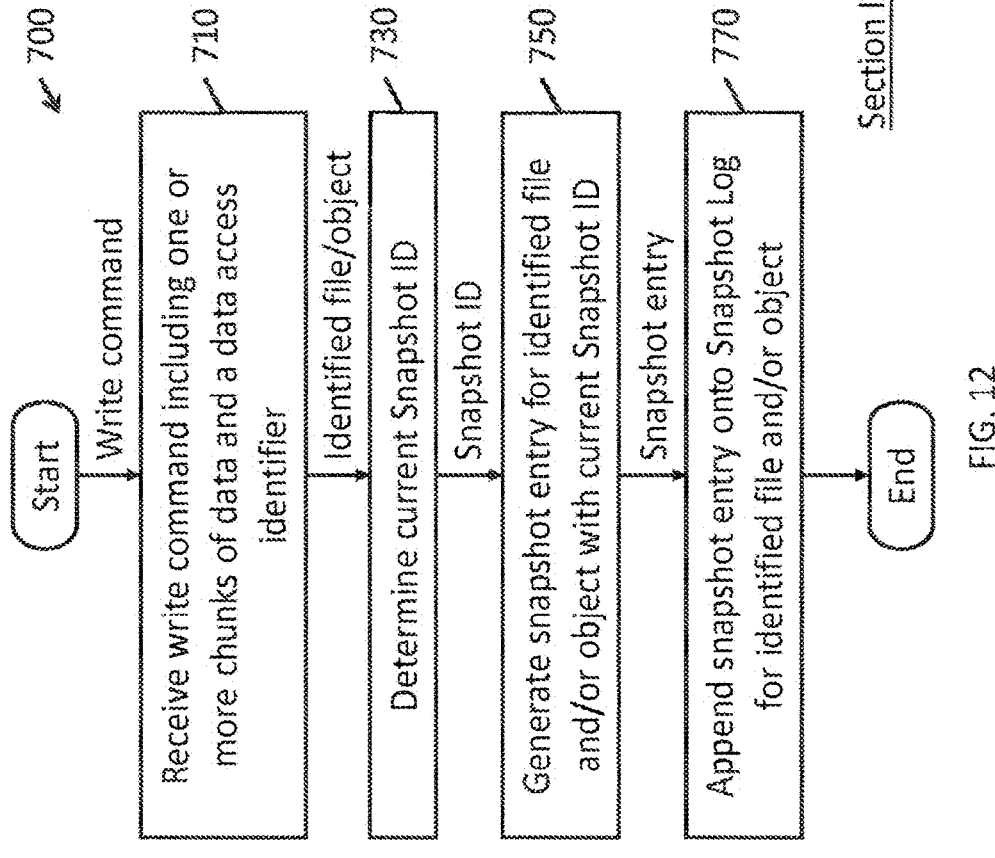

FIG. 12 is a flowchart depicting a method of performing a write operation after a snapshot of a Container has been captured according to one embodiment of the present disclosure.

Figure 13:
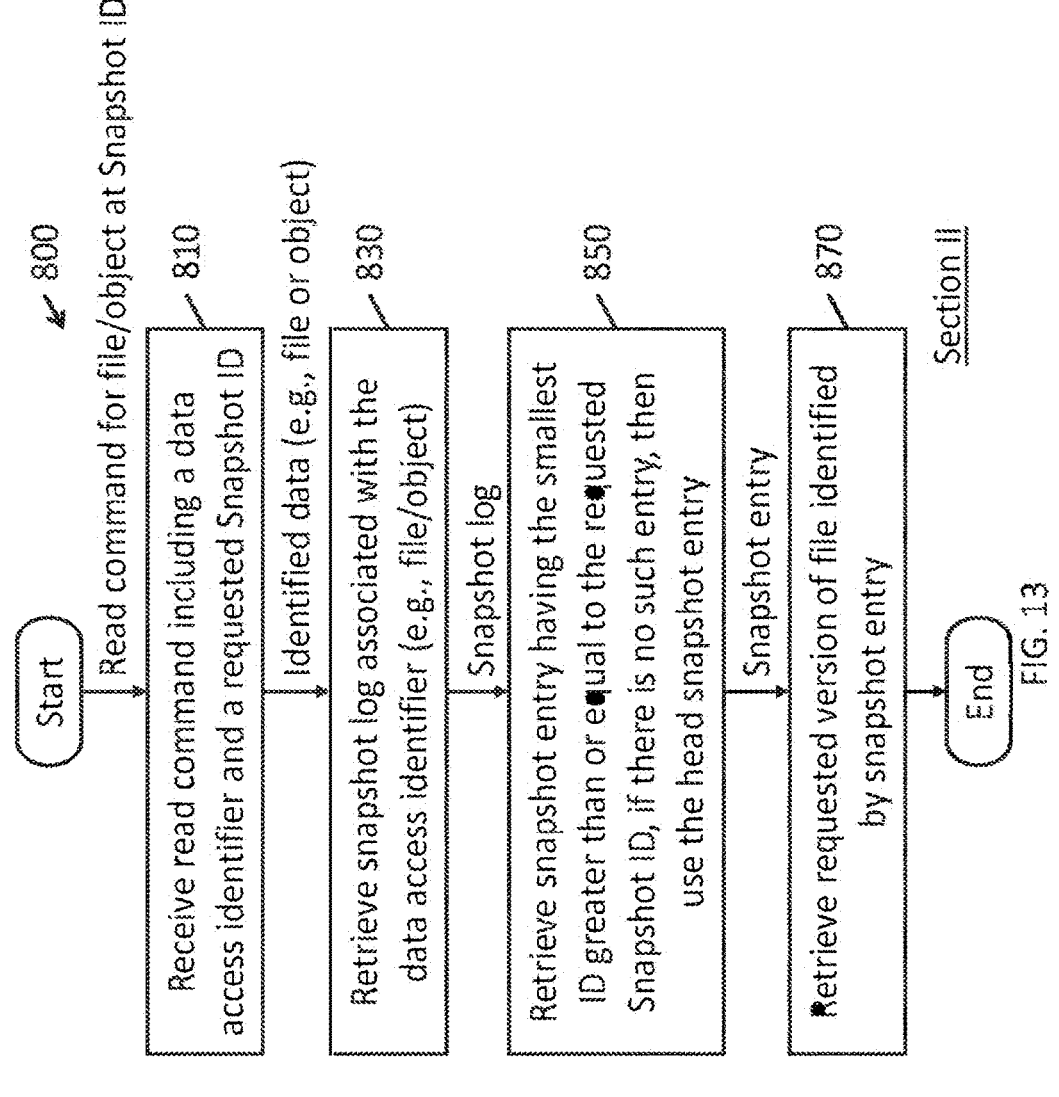

FIG. 13 is a flowchart depicting a method of reading data from a particular snapshot according to one embodiment of the present disclosure.

Figure 14:
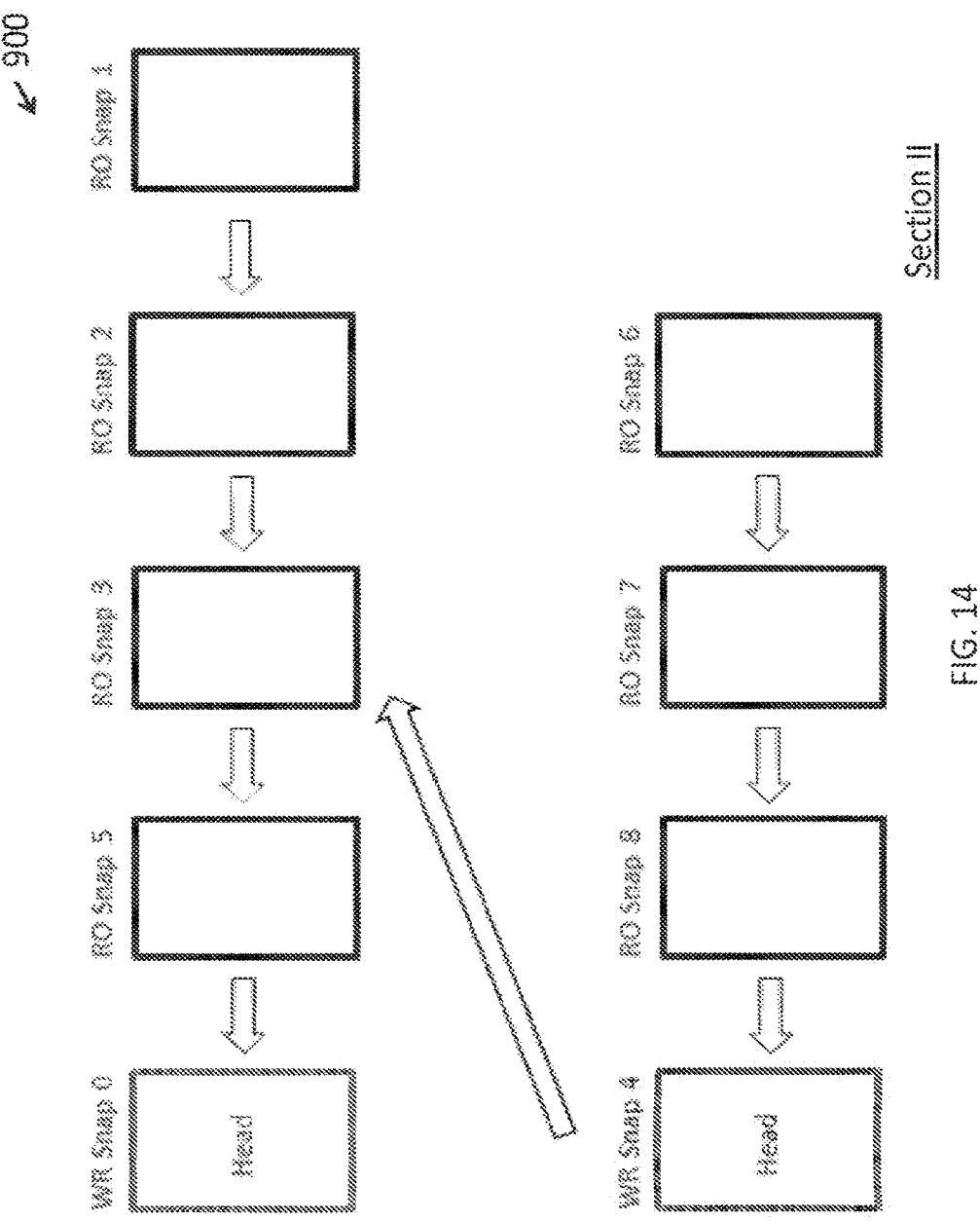

FIG. 14 is a schematic depiction of a snapshot tree according to one embodiment of the present disclosure.

DETAILED DESCRIPTION

In the following detailed description, only certain example embodiments of the present invention are shown and described, by way of illustration. As those skilled in the art would recognize, the invention may be embodied in many different forms and should not be construed as being limited to the embodiments set forth herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

Aspects of embodiments of the present disclosure relate to systems and methods for data protection based on file or object versioning and snapshotting. Some data storage architectures such as file systems store data in a file hierarchy, where data is stored in files located within a hierarchical tree structure (e.g., a directory or folder structure) and uniquely identified by a path or file path within the file system. Some data storage architectures such as object storage systems (or "key-value" storage systems) store data (sometimes referred to as "values," "objects," or "blobs") in association with globally unique identifiers, sometimes referred to as "keys."

Aspects of embodiments of the present disclosure will be described herein primarily in the context of providing versioning for data stored in files within a file system. However, embodiments of the present disclosure are not limited thereto and may also be applied more generally to storing multiple versions of data stored in other data storage architectures, such as providing versioning of objects stored in an object store or key-value store.

Always-on file versioning in accordance with some aspects of embodiments of the present disclosure protects against unintended overwrites in a system. Examples of unintended overwrites include write operations (e.g., "save" commands) initiated by users that alter or destroy some information, and embodiments of the present disclosure enable the user to recover or restore the overwritten information at a later time, within some practical constraints. Some aspects of embodiments of the present disclosure provide protection on a file-by-file basis, in contrast to systems that provide protection on a system-wide or partition basis (e.g., on a file system basis). In some embodiments, file versioning is built into the data management system (e.g., a driver for a file system and/or a controller for a storage device such as a network attached storage (NAS) device) in that the data management system ensures that each file has at least one previous version stored in the system. In addition, some aspects of embodiments of the present disclosure relate to keeping the storage of the previous versions of the files transparent to the user, such that the user is not required to explicitly request the storage of a new version of the file. In some aspects of embodiments, the creation of new versions of a file is unscheduled (e.g., versions are not created on a time basis, such as an hourly basis) but instead, are created based on changes (e.g., writes and/or appends) being applied to the file. Moreover, some aspects of embodiments relate to improving storage efficiency by sharing common chunks (e.g., unchanged chunks) of data between different file versions.

In addition to file versioning, some aspects of embodiments of the present disclosure relate to storing and reading snapshots of data captured at particular timepoints (e.g., scheduled time points or as requested by a user). These snapshots may leverage the file versioning system discussed above to improve the efficiency of storing copies of snapshots and sharing data between different snapshots.

FIG. 6 is a schematic block diagram of a storage system according to one embodiment of the present disclosure. As shown in FIG. 6, a storage controller 100 configured to perform various operations such as file and object versioning and snapshotting in accordance with embodiments of the present disclosure. In some embodiments, the storage controller 100 includes a processor 110 and a non-transitory computer readable memory 120, where the memory 120 stores instructions that, when executed by the processor, cause the processor 110 to perform the specialized operations described in more detail below. In various embodiments of the present disclosure the processor 110 may include, for example, a general purpose central processing unit (CPU), a graphics processing unit (GPU), a field programmable gate array (FPGA), an application specific integrated circuit (ASIC), and the like, or combinations thereof. The storage controller 100 is connected to a storage device 130 over a data bus 140 and is configured to write data to the storage device 130 and read data from the storage device 130. The storage device 130 may be a non-volatile mass storage device such as flash memory in a solid state drive (SSD), magnetic memory of a hard disk drive (HDD), non-volatile dual-inline memory modules (NVDIMM), or the like. However, embodiments of the preset disclosure are not limited thereto and may also include the case where data is temporarily stored or cached in volatile memory (e.g., dynamic random access memory (DRAM)) prior to being persisted to non-volatile memory. In addition, embodiments of the present disclosure may be implemented to operate on top of one or more storage abstraction layers that provide higher-level access to data storage services that hide details regarding the underlying storage media (e.g., file systems, memory controllers of solid state drives, virtualized data storage devices such as virtualized block storage devices (e.g., Amazon Elastic Block Store), and the like).

Also, although the storage controller 100 is shows as a single integrated module, a person of skill in the art will recognize that the functionality of the storage controller 100 may be subdivided into further sub-modules without departing from the spirit and scope of the inventive concept.

The storage controller 100 may be connected to a network adapter 150 to communicate with external devices over a network connection (e.g., an Ethernet connection or a wireless connection) to communicate with other computing devices over a network such a local area network (LAN) and/or the Internet.

As one example, the operations performed by a storage controller 100 may be implemented as a software component of an operating system (e.g., as a driver for a file system) or a user space data storage system, where the processor 110 and the memory 120 are components of a computer system such as a server, and where the operating system and the storage controller run on the computer system (whether directly on the processor 110 and memory 120 or in a virtual machine through a hardware virtualization layer). The storage controller 100 may be configured to provide data storage services to applications running locally on the computer system and/or provide data storage services to remote computers over a network connection using one or more network data storage protocols. As another example, the storage controller 100 may be implemented in firmware in a dedicated storage device such as a network attached storage (NAS) device that may provide storage services via one or more network data storage protocols. Examples of network data storage protocols include object based or key-value based storage protocol (e.g., Amazon Web Services Simple Storage Service (S3), Memcached, Redis, and the like) or file based storage protocols (e.g., Network File System (NFS), Server Message Block (SMB), and the like).

File and Object Versioning

As noted above, some aspects of embodiments of the present disclosure relate to systems and methods for storing multiple versions of data on a file-by-file basis.

FIG. 7 is a flowchart depicting a method 200 for processing a write command in accordance with one embodiment of the present disclosure.

FIG. 8A is a schematic diagram depicting data storage of files and/or objects in multiple chunks and pointers between versions of a stored file or object and the stored chunks of data in accordance with one embodiment of the present disclosure.

As shown in FIG. 8A, at time to, and in accordance with operation 210, the storage controller 100 may receive a write command 310 to write a file (or object) having a data access identifier w containing data chunks A, B, and C, where the data of the full file or object w is the (in order) concatenation of chunks A, B, and C. The data access identifier w may be, for example, a file path in the case of a file in a file system or a unique object identifier or key in the case of an object storage system. For the sake of discussion herein, each of the chunks A, B, and C has the same size, where any data written and/or retrieved through a storage controller 100 according to embodiments of the present disclosure is broken into one or more chunks of the same size (in some embodiments, data that is smaller than the size of a chunk or that has a size that is not a multiple of a chunk size is padded to reach the chunk size). Chunks may also be referred to herein as "atoms" or "atomic objects." In some embodiments of the present disclosure, the size of each chunk corresponds to a smallest addressable unit within the storage device 130, such as 4 kilobytes (KiB). For example, in the case of a storage device 130 using flash memory, a chunk size or atomic object size may correspond to the size of a single page (or an integral number of pages) within the flash memory (e.g., common flash memory page sizes include 4 KiB, 8 KiB, and 16 KiB). In some embodiments, the size of each chunk is independent of a smallest addressable unit within the storage device 130. For example, in some embodiments a chunk may have a size of 256 KiB, 512 KiB, or 1 MiB.

In operation 250, and as shown in FIG. 8A, the storage controller 100 writes the newly added data to one or more unused locations in the storage device 130. The one or more unused locations may be locations marked as free space (e.g., pages within erased blocks of flash memory) or may be locations that are marked to be overwritten (e.g., locations in the storage device that store the older versions of data chunks, in the case of a storage controller 100 that automatically reclaims older backup copies). In some circumstances, a chunk of data may be spread across multiple physical or logical locations in the storage device, such as a case where the storage device 130 does not have a location large enough to store an entire chunk or where the chunk is spread across multiple storage media for redundancy or performance reasons (e.g., striping in a redundant array of independent disks (RAID)).

In operation 270, and as shown in FIG. 8A, the storage controller 100 updates a version log corresponding to the file (or object) with data access identifier w that is being written to 210. The version log may be metadata associated with the data managed by the storage controller 100 and may be stored on the same storage device 130 as the data or may be stored in a different computer readable memory connected to the storage controller 100. In the case of creating a new file or object, such as that shown in FIG. 8A, the storage controller 100 creates a new version log 320 for the new file or object. The version log stores an ordered collection of one or more version entries, and each of the version entries corresponds to a different version of the file or object. Each version entry is an ordered collection of pointers to the locations of the chunks of data that make up that version of the file. In the example shown in FIG. 8A, version entry having sequence #0 of newly written file with identified by data access identifier w is represented by an ordered list of three pointers &A, &B, and &C identifying the locations of the corresponding chunks A, B, and C within the storage device 130. These chunk pointers within the file version entry may also be labeled with their sequence numbers 0, 0, and 0. The storage controller 100 may also maintain an active version pointer that identifies the current version of the file or object. In this case, the active version pointer identifies version entry #0 as the current (and only) version entry. In some embodiments, the storage controller 100 maintains different active version pointers for different data access protocols, such as a file active version pointer for file-based access protocols (e.g., NFS and SMB) and an object active version pointer for object-based access protocols (e.g., S3). This enables a storage controller 100 to comply with semantics or behaviors of the various data access protocols.

Referring again to FIG. 8A, at a later time $t_1$, a second write command 330 is received by the storage controller 100 (operation 210), where the second write command 330 indicates a modification to replace the data of chunk C with new data chunk C' (e.g., new data chunk C' begins at the same offset from the start of the file as previous chunk C). Accordingly, in operation 250, the storage controller 100 writes the new data chunk C' to an unused location within the storage device 130 (in a "write-redirect" manner) and updates the version log 321 to create a new version entry #1 for the file containing the pointers &A and &B to the locations of the original chunks A and B in the storage device 130, and a pointer &C' to the location of the updated chunk C'. The sequence numbers for chunks A and B remain the same (sequence number 0), and the sequence number for updated chunk C' is increased to the next available sequence number (in this case sequence number 1). The active version pointer is also updated to identify version entry #1 as the current version of file with data access identifier w.

Referring still to FIG. 8A, version entry #0 remains in the updated version log 321, and the pointers &A, &B, &C to the locations of the original chunks A, B, and C remain valid, because those data chunks remain in the storage device 130. In addition, as shown in FIG. 8A, two different version entries (version #0 and version #1) for file identified by data access identifier w are available, and unmodified chunks A and B are not duplicated.

Note that the locations (e.g., &A, &B, &C, and &C') identified by the version log do not necessarily refer to physical locations within the storage device 130, but instead refer to logical addresses as presented by the storage device 130 to the storage controller 100. For example, a controller of a solid state drive periodically moves data between different physical locations within its flash memory dies when performing garbage collection to consolidate valid data in used pages, but presents the same logical addresses of the data to the storage device, as maintained by a flash translation layer (FTL) of the storage device.

In some cases, multiple writes to a same file are bundled or grouped together, such that these multiple writes do not create multiple versions. For example, writes may be bundled together based on instances of opening and closing a file (e.g., calling the C library functions fopen and fclose) or writes that occur between explicit file flush and/or file close commands sent to the storage controller 100.

FIG. 8B is a schematic diagram depicting the case of multiple writes to a same chunk of a file according to one embodiment of the present disclosure. As shown in FIG. 8B, at time $t_2$, a third write command 350 is performed to update the chunk of data corresponding to chunk A (e.g., the first chunk at the beginning of the file with data access identifier w) with new data A'. In addition, at time $t_3$, the storage controller 100 receives a fourth write command 370 to write to the same first chunk of file with data access identifier w with further modified data A" within a period that causes the third write command 350 and the fourth write command 370 to be aggregated, followed by a close command 390 to close the file associated with data access identifier w.

In some embodiments, as before, the new data A' is written to a new location in storage device 130 and a new version entry #2 for the file with data access identifier w is created and added to the version log 322, where version entry #2 contains pointers &A', &B, and &C' to the locations of the chunks A', B, and C' in the data storage device 130 (for the sake of clarity, version entry #0 is not shown in FIG. 8B). To be consistent with the behavior and semantics of various data data access protocols, the written data (A') is immediately available to when accessed via file-based protocols (e.g., NFS) but may not be available to object-based or key-value based protocols (e.g., S3) until a close command is processed. Accordingly, as shown in FIG. 8B, a file active version pointer is updated to point to version #2 and an object active version pointer remains at the version prior to the write command 350. In the embodiment shown in FIG. 8B, the subsequent write of chunk A" causes the data A" to be written to a new location in the storage device 130. However, because chunks A' and A" were aggregated or consolidated by the storage controller 100 (e.g., because no file-based "close" command was received for file the file identified by identifier w between $t_2$ and $t_3$), only the final chunk A" is included in the version log 323 after both writes have completed (e.g., after time $t_3$) and chunk A' does not appear in the version log. In addition, a close command 390 is received at time $t_3$. As such, storage controller 100 also updates the object active version pointer to identify version entry #2 as the current version of the data associated with data access identifier w (the file active version pointer was already updated to version #2 at time $t_2$). Note that between performing the write command 370 and performing the close file command 390, the object active version pointer will still point to version #1. Accordingly, to be consistent with file-based and object-based semantics, the storage controller 100 maintains separate "file active version" and "object active version" pointers to version entries in the version log.

In some embodiments, a read command (described in more detail below with respect to FIG. 9) on the current version of file with data access identifier w occurring between times $t_2$ and $t_3$ returns the data A', B, C'. In some embodiments, a read command on the current version of file with identified by data access identifier w occurring between times $t_2$ and $t_3$ would returns the previous version of the file A, B, C' (e.g., because the current version of the document may not be set until after it is no longer possible to aggregate writes). In some embodiments, the read behavior (e.g., whether A, B, C' or A', B, C' is returned) depends on the protocols used to perform the write commands and the read commands. For example, in some embodiments, if the write commands 350 and 370 are performed using file-based operations (e.g., NFS or SMB) and the read command is performed using a file-based operation, then the file-based read would return A', B, C' in order to be consistent with standard file-based access semantics (e.g., the behavior of file-based protocols such as NFS or SMB), but if the write commands 350 and 370 are performed using file-based operations and the read command is performed using object-based or key-value store-based operations (e.g., Amazon S3), then the read would return the previous value A, B, C'.

In some embodiments, in response to receiving the fourth write command 370, instead of writing data chunk A" to a new location as shown in FIG. 8B, the previous write of data chunk A' in response to third write command 350 is overwritten with data chunk A". For example, in some circumstances, the data chunk A' may be stored in a write buffer prior to being written to the storage device 130, and therefore available to be read by a read command between time $t_2$ and time $t_3$. In some circumstances, the data is overwritten at the same logical address as the chunk A' (e.g., where &A' and &A" refer to the same location in storage device 130).

FIG. 8C is a schematic diagram depicting the case of a write replacing all of the chunks of data associated with a file according to one embodiment of the present disclosure. As shown in FIG. 8C, at time $t_4$, the storage controller 100 receives (e.g., in operation 210) a fifth write command 390 to write to file identified by identifier w, where all three chunks (e.g., originally chunks A, B, and C of version #0) are replaced with new chunks a, b, and c. Accordingly, in operation 250, the storage controller 100 writes the new chunks a, b, and c to unused locations in the storage device 130 and, in operation 270, updates the version log 324 to further include a new version entry #3 containing pointers &a, &b, and &c to the locations of chunks a, b, and c in the storage device 130, and updating the active version pointer to identify version entry #3 as representing the current version of the file identified by data access identifier w. The identifiers associated with the pointers &a, &b, and &c are set to the next available sequence number (in this case, sequence #3).

As such, aspects of embodiments of the present disclosure relate to storing multiple versions of a file (or object) in a storage efficient manner, such as by redirecting writes to different chunks of a file to different locations in a storage device and maintaining a version log for files, where each version entry in the version log includes an ordered collection of pointers to locations in the storage device containing the chunks of data associated with that particular version of the data associated with that data access identifier.

FIG. 9 is a flowchart depicting a method 400 for reading a file or object from a storage device based on version according to one embodiment of the present disclosure. In operation 410, the storage controller 100 receives a read command with a data access identifier (e.g., identifying a file or object to be read) and, optionally, a version identifier. In some cases, the read command may omit the version of the file to be read, in which case the read command implicitly identifies that the current or active version of the file is to be read. As one example, referring to FIG. 8C, at time to a read command 395 may request the data associated with version entry #2 of file identified by data access identifier w.

In operation 430, the storage controller 100 determines whether the read command includes a version identifier. If so, then in operation 450, the storage controller 100 identifies the version log associated with the file to be read and retrieves the identified version entry from the version log. Continuing the above example, the storage controller 100 retrieves requested version entry #2 from the version log 324 shown in FIG. 8C. As seen in FIG. 8C, version entry #2 includes pointers &A", &B, and &C'. If the read command does not include a version identifier, then in operation 460 the storage controller 100 reads a version entry corresponding to a current active version (e.g., current file active version or current object active version, as discussed in more detail below).

In operation 470, the storage controller 100 reads the data from the storage device 130 at the locations identified by pointers (&A", &B, and &C') from the identified version entry (#2) of the version log, and returns the read data (data chunks A", B, and C') to the requesting application.

Accordingly, aspects of embodiments of the present disclosure provide systems and methods for efficiently storing and retrieving multiple versions of data files and/or objects in a storage device.

Data Compression

Some aspects of embodiments of the present disclosure relate to compression of data on a chunk basis. Some comparative techniques for data compression perform data compression on a file basis or an object basis. In these comparative techniques, modifications to select portions of the file or object or appending data to an object may require decompressing the entire file, writing the additional data, and recompressing the entire file.

In contrast, some aspects of embodiments of the present disclosure relate to applying data compression to each chunk independently, on a chunk-by-chunk basis (e.g., where the compression of one chunk is not affected by the compression of other chunks) . . . . By doing so, a storage controller 100 can read or decompress individual chunks of a file without decompressing other chunks, and can also write to a portion of a file by recompressing only the affected chunks, thereby saving the computational expense of decompressing and recompressing chunks that are not affected by the write command applied to the file. In some embodiments, the compression is performed independently on each chunk on a sub-chunk basis, where each chunk is divided into sub-chunks, and where the sub-chunks are also independently compressed or decompressed. For example, in the case of a chunk size of 256 KiB, 512 KiB, or 1 MiB, each sub-chunk may be 32 KiB in size.

As a concrete example, and referring back to FIG. 8A, assuming that the first write command 310 was a command to write data chunks A, B, C in compressed form. Accordingly, the storage controller 100 applies a data compression algorithm (e.g., Huffman coding, Lempel-Ziv (LZ) compression, bzip2, gzip, etc.) to each of the data chunks A, B, C separately, and writes the compressed data to storage device 130. When the second write command 330 is received to replace chunk C with chunk C', the storage controller 100 only compresses new chunk C' and writes new chunk C' to the storage device 130, without decompressing chunks A and B, and without recompressing chunks A and B, because the compression of chunk C' is independent of that of chunks A and B.

Therefore, by performing compression on a chunk-by-chunk basis rather than a file or object basis, embodiments of the present disclosure provide increased computational efficiency by avoiding the decompression and recompression of unmodified chunks of the file or object.

Metadata Sharing

Some aspects of embodiments of the present disclosure further relate to the sharing of metadata between different access protocols, such as a local file system (e.g., ext4, Btrfs, new technology file system (NTFS), etc.), network file system (NFS), server message block (SMB), Amazon Simple Storage Service (S3), and the like.

Many different file systems and network data access protocols may specify that particular types of metadata be stored in association with files or objects that are accessed via those protocols. Examples of these metadata include: creation time, modification time, access time, expiration time (or time to live (TTL)), data size, storage quota, user access permissions, and the like.

Some of these metadata may be unique to particular protocols. For example, user access permissions on a particular file or object may depend on a particular set of user identifiers that are unique to a particular data access protocol (e.g., particular authenticated users in an SMB server), and therefore these unique data must be stored for each supported protocol.

On the other hand, some metadata is shared or common to multiple protocols (e.g., all protocols) implemented by the storage controller 100. In these cases, rather than store a separate copy of the shared metadata for each protocol, some embodiments of the present disclosure relate to storing a single copy of these common metadata and automatically mapping requests from each of these protocols for particular metadata to the appropriate shared copy of the data, and automatically transforming the metadata to an appropriate format, if needed. Examples of metadata that are common to multiple protocols include: creation time, modification time, and access time. Examples of transformation include, for example, transformations between representation of times in Unix time (or Epoch time or POSIX time) in seconds versus milliseconds, NTFS timestamps, International Organization for Standardization (ISO) 8601 representations of times and dates, and the like.

Snapshotting

Some aspects of embodiments of the present disclosure relate to systems and methods for capturing snapshots (or "images") of the data stored in a collection such as a root collection (e.g., an entire file system) or any sub-tree collection (e.g., subdirectory or subfolder or storage bucket) of data stored in the storage device 130 at particular points in time. A snapshot is a read-only copy of an image at that particular point in time. This allows for a consistent view of the whole file-system or a branch of the file system at a specific point in time, thereby making it easier to determine which particular versions of multiple files were in use together at the time of a particular snapshot.

According to some embodiments of the present disclosure, a storage controller 100 implements snapshot functionality using three design concepts: Snapshot ID numbers, a Snapshot Log, and Snapshot Tree.

In some embodiments of the present disclosure, a Snapshot ID number is a monotonically increasing number that identifies a snapshot generation. More recently captured snapshots have larger the Snapshot ID numbers than earlier captured snapshots. The Snapshot ID number is maintained on a per-root collection basis (i.e. namespace, file system, storage bucket, etc.) and is incremented (e.g., increased by 1) whenever a snapshot is created anywhere in the root collection.

FIG. 10 is a schematic depiction of a snapshot log 500 for a file according to one embodiment of the present disclosure. A Snapshot Log is used to represent all the modifications to a file or directory due in accordance with captured snapshots and/or file versioning. Every unit of data associated with a data access identifier (e.g., every file or object stored in the system) or collection of data (e.g., directory or storage bucket) has its own associated Snapshot Log 500. FIG. 10 depicts a Snapshot Log 500 for a particular file, including three snapshots having Snapshot ID 1 510, Snapshot ID 5 550, and Snapshot ID 8 580. The Snapshot Log 500 captures modifications to the unit of data between different snapshots (e.g., between Snapshot ID 1 510 and Snapshot ID 5 550). A new entry is added to a Snapshot Log if and only if the current applicable Snapshot ID (obtained from the Snapshot Tree, as discussed in more detail below) is different from the most recent entry in the Snapshot Log 500. New snapshots (e.g., captured after the snapshots already in the snapshot log) for the unit of data are appended to (e.g., added to the end of) the Snapshot Log 500.

Each entry (e.g., entries or snapshots 510, 550, and 580) in the Snapshot Log 500 specifies the Snapshot ID associated with the written data and how to retrieve the data for that snapshot. No two entries in the Snapshot Log have the same Snapshot ID. In addition, in some embodiments, exactly one new entry is created when a write (modification) occurs across snapshots, regardless of how many snapshots may have been created in the interim.

In more detail, each entry in the Snapshot Log 500 includes a version array, a file active version pointer, and an object active version pointer. The version array in each entry corresponds to a portion (or slice) of the version array maintained for each file, as discussed above, where the version array of each snapshot includes all of the versions of the file between the previous snapshot entry (e.g., the next, lower numbered snapshot), if any, and the next snapshot entry, if any. For example, considering the Snapshot Log 500 for a given file identified by data access identifier w, the version array of the snapshot 550 (having Snapshot ID 5) includes all of the versions in the version array for file with data access identifier w that were created after the capture of the previous snapshot 510 (having Snapshot ID 1) up until the last version of file with data access identifier w before the creation of the next snapshot 580 (having Snapshot ID 8). The Object Active Version pointer and the File Active Version pointer of a given snapshot entry refer to a particular version within the version array associated with that snapshot entry that would be read by default when being accessed in accordance with an object access protocol versus a file access protocol, respectively. As noted above, different active version pointers may be maintained based on the access semantics or behaviors of the different protocols. In the example given above, NFS writes are immediately visible in subsequent NFS reads, even before an NFS close operation is processed, whereas these writes are not visible to object (e.g., S3) read operations until after a close operation has been processed. On the other hand, in an example case of performing writes to an object or file w using object-based operations (e.g., using S3 operations), writes to a file are not visible until the file is closed using an object-based close operation. In such a case, both the file active version and the object active version pointers may continue to identify a previous version of the file until an object-based close operation is processed on the file.

FIG. 11 is a flowchart depicting a method 600 of capturing a snapshot of a Container according to one embodiment of the present disclosure. In operation 610, the storage controller 100 receives a snapshot request, which may identify a particular collection (e.g., a root collection, a particular sub-collection such as a sub-directory, or a storage bucket of objects). In operation 630, the storage controller 100 generates a new Snapshot ID, such as by adding 1 to the highest numbered snapshot ID in use by the storage controller 100. In operation 650, the storage controller 100 stores the generated Snapshot ID as the current snapshot ID on the collection identified by the snapshot request. In some embodiments, substantially no further writes or modifications are made to any snapshot logs or version logs in response to receiving a snapshot request.

FIG. 12 is a flowchart depicting a method 700 of performing a write operation after a snapshot of a Container has been captured according to one embodiment of the present disclosure. The operations shown in FIG. 12 may be performed in addition to the operations for handling a write command in embodiments of the present disclosure, such as the method 200 shown in FIG. 7. As shown in FIG. 12, in operation 710, the storage controller 100 receives a write command 310 to write a file (or object) having data access identifier w. In operation 730, the storage controller 100 determines the current Snapshot ID (e.g., as stored in operation 650 of FIG. 11). In operation 750, the storage controller 100 generates a snapshot entry for the identified file based on the Snapshot ID, where the snapshot entry includes a region or a slice of the version log from the latest entry in the Snapshot Log of for the file, up until the current version of the file (before processing the current write command). The storage controller 100 may also generate the object active version and file active version pointers for the new snapshot entry. In operation 770, the storage controller 100 appends the newly generated snapshot entry onto the end of the Snapshot Log for the identified file and/or object that was targeted by the write command. The storage controller 100 may then proceed with processing the write command, such as in accordance with the method 200 of FIG. 7, including writing the received chunks of data to the storage device 130 and updating the version log of the file.

FIG. 13 is a flowchart depicting a method of reading data from a particular snapshot according to one embodiment of the present disclosure. In operation 810, the storage controller 100 receives a read command requesting to read a file and/or object as it appeared at a requested Snapshot ID. In operation 830, the storage controller 100 retrieves the snapshot log corresponding to the file and/or object identified by the read command.

In operation 850, the storage controller 100 retrieves a snapshot entry from the snapshot log that corresponds to the requested Snapshot ID. When the snapshot log contains a snapshot entry matching the exact Snapshot ID that was requested, then that matching snapshot entry is returned as the corresponding snapshot entry. However, in some cases, the snapshot log does not contain an exact matching entry (see, e.g., the example snapshot log 500 shown in FIG. 10, where there are no snapshot log entries with IDs 2, 3, 4 6, or 7). If this is the case, then there were no writes made to the file between the snapshots in between the entry having a next lowest snapshot ID and the entry having the next highest snapshot ID (e.g., referring again to FIG. 10, if a read command requested the file associated with data access identifier w as of Snapshot ID 3, the storage controller 100 determines that the snapshot entry having the smallest snapshot ID that is greater than or equal to the requested Snapshot ID is the corresponding snapshot entry—in this case snapshot entry 510 having ID 5). If there is no next highest snapshot ID, then the head snapshot entry is the matching snapshot entry.

In operation 870, the storage controller 100 retrieves and returns the requested version of the file identified by the snapshot entry. For example, if the read command requested a file at a particular snapshot ID, then storage controller reads the file version identified by the file active version stored in the snapshot entry. Likewise, if the read command requested an object at a particular snapshot ID, then storage controller reads the object version identified by the object active version stored in the snapshot entry. In either case, the storage controller reads the chunks from the locations identified by the pointers in the identified version and returns the data chunks to the requesting application.

Snapshot Tree

Some aspects of embodiments of the present disclosure relate to using a Snapshot Tree to represent the snapshot relationship or hierarchy between snapshots (i.e. based on when a snapshot is taken). In some embodiments, every collection where one or more snapshots have been taken has a Snapshot Tree.

FIG. 14 is a schematic depiction of a snapshot tree 900 according to one embodiment of the present disclosure. The Snapshot Tree 900 shown in FIG. 14 represents the following sequence of events:

Writable (WR) Snap 0 represents the head of the list. The head is the active content, and the most recent version of any object is always found in the head.

When a snapshot is created, the root collection's current Snapshot ID number is incremented by 1 and, in this example, an entry representing Read Only (RO) Snap 1 is added to the Snapshot Tree 900.

At a later time, another snapshot of the root collection is created, and the root collection's current Snapshot ID number is incremented to 2, yielding RO Snap 2 in this Snapshot Tree. Likewise, at a later time, another snapshot RO Snap 3 was created from the head after RO Snap 2.

A writeable clone of RO Snap 3 is then created as WR Snap 4. Creating a writeable clone establishes a new head and therefore a new branch of the Snapshot Tree. This new head becomes an additional point from which snapshots can be created (e.g., changes may be made from the first head identified by WR Snap 0 or from the second head identified by WR Snap 4).

In the example shown in FIG. 14, RO Snap 5 was created from the first head.

Then RO Snap 6 was created from the second head WR Snap 4, followed by RO Snap 7 and RO Snap 8 also created from the second head at WR Snap 4. As can be seen from the example of FIG. 14, the Snapshot Tree provides information regarding: the relationship between snapshots created for the snapshotted collection; and the most recent Snapshot ID applicable to this collection and its sub-collections. In the example of FIG. 14, the highest applicable Snapshot ID for WR Snap 0 is 5 and the highest applicable Snapshot ID for WR Snap 4 is Snapshot ID 8.

This information is important when creating Snapshot entries, where a newly created Snapshot entry includes a parent pointer identifying its immediate parent snapshot entry in order to maintain information about the parent-child relationships between different snapshot entries.

When retrieving a corresponding entry based on a requested snapshot ID (e.g., in operation 850 of FIG. 13), the search is performed based on a particular writable head, and the search is performed only through the particular snapshot entries contained in the particular branch of the Snapshot Tree associated with the particular writable head. Accordingly, in some embodiments, when retrieving or identifying a snapshot log associated with a particular data access identifier (e.g., in operation 830) a snapshot log associated with the data access identifier is retrieved by identifying the snapshot entries associated with the particular branch of the snapshot tree associated with the particular head.

For example, when requesting a file as of a particular snapshot ID based on the first writable head (WR Snap 0), the relevant branch of the Snapshot Tree contains only entries RO Snap 5, RO Snap 3, RO Snap 2 and RO Snap 1. The snapshot entries in the other branch (RO Snap 8, RO Snap 7, and RO Snap 6) are not considered because they are members of a different branch of the Snapshot Tree. Accordingly, the retrieved snapshot log would include entries RO Snap 5, RO Snap 3, RO Snap 2 and RO Snap 1.

Likewise, when requesting a file as of a particular snapshot ID based on the second writable head (WR Snap 4), snapshots RO Snap 8, RO Snap 7, and RO Snap 6 would be considered, along with the shared portion of the Snapshot Tree, including snapshots RO Snap 3, RO Snap 2, and RO Snap 1. However, RO Snap 5, which was created after creating the clone at WR Snap 4, would not be considered as part of the snapshot log. Accordingly, the retrieved snapshot log would include entries RO Snap 8, RO Snap 7, RO Snap 6, RO Snap 3, RO Snap 2, and RO Snap 1.

As such, as discussed above, aspects of embodiments of the present disclosure provide: automatic versioning of files on a file-by-file basis and is only versioned when the file changes (not time based), both point-in-time snapshot of the whole file system or branch of the file system as well as file versioning; efficient use of storage space in that content of a file may be shared between a snapshot and a specific version of a file or shared between a snapshot and another snapshot or shared between different versions of a file; and efficient compression of data stored on the storage device.

One or more embodiments according the present disclosure may include one or more characteristics of one or more of the following clauses (although embodiments are not limited thereto):

Clause 1. A method for storing versions of data comprising:

receiving, by a storage controller connected to a storage device, a write command comprising one or more chunks of data and a data access identifier;

writing, by the storage controller, the one or more chunks of data to one or more corresponding locations in the storage device; and updating, by the storage controller, a version log associated with the data access identifier to add a version entry comprising pointers to the one or more locations in storage device storing the one or more chunks of data.

Clause 2. The method of clause 1, wherein the data access identifier identifies new data to be stored, and wherein the version entry is a first entry of the version log.

Clause 3. The method of clause 1, wherein the data access identifier identifies previously stored data, wherein the version entry comprises pointers to one or more locations in the storage device storing chunks of data associated with the data access identifier that are unmodified by the write command, and wherein the method further comprises appending, by the storage controller, the version entry to the version log.

Clause 4. The method of clause 1, wherein the storage controller further stores an active version pointer associated with the data access identifier, the active version pointer identifying a version entry corresponding to a current version of data associated with the data access identifier.

Clause 5. The method of clause 1, further comprising compressing each of the one or more chunks of data independently before writing each chunk to the storage device.

Clause 6. A method for reading a version of a data, comprising:

receiving, by a storage controller connected to a storage device, a read command comprising a data access identifier;

retrieving, by the storage controller, a version entry from a version log associated with the data access identifier, the version entry identifying one or more locations in the storage device;

reading, by the storage controller, one or more chunks of data from the one or more locations in the storage device; and returning, by the storage controller, the one or more chunks of data associated with the data access identifier.

Clause 7. The method of clause 6, wherein the read command further comprises a version identifier, and wherein the retrieving the version entry from the version log comprises identifying the version entry corresponding to the version identifier.

Clause 8. The method of clause 6, wherein the read command omits a version identifier, and wherein the retrieving the version entry from the version log comprises retrieving an active version pointer corresponding to the version log, wherein the active version pointer identifies the version entry.

Clause 9. The method of clause 6, wherein the one or more chunks of data are individually compressed, and wherein the method further comprises individually decompressing the one or more chunks of data.

Clause 10. A method for storing versions and snapshots of data comprising: receiving, by a storage controller connected to a storage device, a command to capture a snapshot;

generating, by the storage controller, a snapshot ID;

storing, by the storage controller, the snapshot ID as a current snapshot ID;

receiving, by the storage controller, a write command comprising one or more chunks of data and a data access identifier;

generating, by the storage controller, a snapshot entry for the data access identifier with the current snapshot ID;

appending, by the storage controller, the snapshot entry to a snapshot log associated with the data access identifier;

writing, by the storage controller, the one or more chunks of data to one or more locations in the storage device; and updating, by the storage controller, a version log associated with the data access identifier to add a version entry in response to the write command, the version entry comprising pointers to the one or more locations in the storage device storing the one or more chunks of data.

Clause 11. The method of clause 10, wherein the snapshot entry comprises a portion of the version log prior to the version entry generated in response to the write command.

Clause 12. The method of clause 11, wherein the snapshot log comprises a previous snapshot entry, and wherein the portion of the version log comprises version entries between the previous snapshot entry and the version entry generated in response to the write command.

Clause 13. The method of clause 10, further comprising:

receiving, by the storage controller, a command to generate a clone based on the snapshot entry; and adding, by the storage controller, a branch writable head having a parent pointer identifying the snapshot entry.

Clause 14. The method of clause 13, further comprising:

receiving, by the storage controller, a command to capture a second snapshot; generating, by the storage controller, a second snapshot ID;

storing, by the storage controller, the second snapshot ID as the current snapshot ID;

receiving, by the storage controller, a second write command comprising one or more second chunks of data and a second data access identifier;

generating, by the storage controller, a second snapshot entry for the data access identifier with the current snapshot ID;

appending, by the storage controller, the second snapshot entry to a snapshot log associated with the data access identifier and the branch writeable head, the second snapshot entry having a parent pointer identifying the snapshot entry;

writing, by the storage controller, the one or more chunks of data to one or more second locations in the storage device; and updating, by the storage controller, a version log associated with the data access identifier to add a second version entry in response to the write command, the version entry comprising second pointers to the one or more second locations in the storage device storing the one or more second chunks of data.

Clause 15. A method for reading a version of data based on snapshots comprising:

receiving, by a storage controller connected to a storage device, a read command including a data access identifier and a requested snapshot identifier;

retrieving, by the storage controller, a snapshot log associated with the data access identifier;

retrieving, by the storage controller, a snapshot entry from the snapshot log having a largest snapshot identifier less than or equal to the requested snapshot identifier;

retrieving, by the storage controller, a version entry from the snapshot entry, the version entry comprising pointers to one or more locations in the storage device; and retrieving, by the storage controller, one or more chunks of data from the one or more locations identified in the version entry, the one or more chunks of data corresponding to a version of data associated with the data access identifier at the requested snapshot identifier.

Clause 16. The method of clause 15, wherein the retrieving the snapshot log comprises identifying a branch of a snapshot tree corresponding to a current writable head.

Clause 17. The method of clause 15, wherein the snapshot entry comprises a portion of a version log associated with the data access identifier.

Clause 18. The method of clause 17, wherein the snapshot entry further comprises an object active version identifying a first version entry in the version log and a file active version identifying a second version entry in the version log.

Clause 19. The method of clause 18, wherein the data access identifier corresponds to an object identifier, and wherein the retrieving the version entry comprises retrieving the first version entry identified by the object active version of the snapshot entry.

Clause 20. The method of clause 18, wherein the data access identifier corresponds to a file identifier, and wherein the retrieving the version entry comprises retrieving the second version entry identified by the file active version of the snapshot entry.

Clause 21. A system comprising a processor and memory configured to implement the storage controller in accordance with any of clauses 1-20.

In some embodiments, the storage controller 100 discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first," "second," "third," etc., may be used herein to describe various elements, components, regions, layers and/or sections, these elements, components, regions, layers and/or sections should not be limited by these terms. These terms are only used to distinguish one element, component, region, layer or section from another element, component, region, or section. Thus, a first element, component, region, or section discussed herein could be termed a second element, component, region, or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

While the present invention has been described in connection with certain example embodiments, it is to be understood that the invention is not limited to the disclosed embodiments, but, on the contrary, is intended to cover various modifications and equivalent arrangements included within the spirit and scope of the appended claims, and equivalents thereof.

SECTION III

Highly Scalable Distributed Object Store

The text in the present "Section I" of the Specification, including any reference numerals or characters and any references to figures, refer and correspond to the FIGS. 15-19 with the label "Section III", and does not refer or correspond to the text in sections I, II, or IV, nor any of the reference numerals, characters, or figures with the labels on the figure sheets that have the label "Section I", "Section II", or "Section IV". That is, each of the Sections I-IV in the present Specification should be interpreted in the context of the corresponding description in the same section and the figures labeled with the same section, respectively. Notwithstanding the foregoing, however, various aspects and inventive concepts of the various sections may be applied to aspects and inventive concepts of other sections.

FIELD

Aspects of embodiments of the present disclosure are generally related to storage systems and methods of operating the same.

BACKGROUND

Object storage systems store data as objects that are accessible by applications providing the corresponding object identifier. Unlike traditional block or file storage systems, applications accessing object storage need not be responsible for organizing its logical data either as a set of fixed size blocks or into structured organization like directories or files, thereby providing a flat access to data given an object identifier.

This approach is desirable for the applications that need to process large amount of unstructured data. In particular, in a distributed application (e.g., one where many data management nodes work on single namespace), the advantages of object store may be further enhanced by distributed object stores, as distributed object stores can provide scalable storage that can grow with the needs of applications. The performance of the distributed applications is dependent on how efficiently the distributed object store can serve the data given an object identifier. The performance of distributed object stores may be determined by the following factors: 1) the ability to have consistent read/write latency accessing these objects, especially as the distributed object stores scale out, 2) the ability to efficiently map an object given an object identifier, 3) the ability to manage underlying persistent storage for efficient data layout.

However, to achieve the above in distributed object stores there may be a number of overheads. For example, the ability to write new objects or retrieve existing objects involves maintaining and updating a mapping table or some variants of it. Size of these tables can grow significantly as the scale of distributed systems grow. The software overhead of maintaining the huge tables may be high. Further, in a distributed system, this table can also be distributed, but may result in overhead of synchronizing this table. Furthermore, as the distributed object storage system scales out, the performance is impacted.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a distributed object store that enables massive parallelism by having a single thread per solid-state drive (SSD) and local contained maps. Even in a massively distributed system, the local maps are small, which means that the tree depth of the local maps can be very small proportionate to the number of keys generated by the distributed object store. As such, the distributed object store may maintain consistency of performance under different loads. Further, the distributed object store may scale linearly for read and write operations.

According to some embodiments of the present invention, there is provided a data processing unit in a key-value (KV) store node of a distributed data storage, the data processing unit including: a memory hosting a command queue and a completion queue corresponding to an object store; and a processor coupled to a solid-state drive (SSD) and configured to perform: retrieving a command from the command queue; generating an input/output (I/O) context based on the command; asynchronously issuing the command to the SSD through the object store; identifying a successful command completion signal from the SSD; asynchronously updating a local map corresponding to the object store; and acknowledging command completion by posting the I/O context to the completion queue.

In some embodiments, a source of the command is a data manager of the distributed data storage, and the command corresponds to an application I/O request received by the data manager.

In some embodiments, the command queue and the completion queue are accessible to the data manager.

In some embodiments, the object store is an immutable data store configured to manage storage of immutable data in the SSD, a staging store configured to manage storage of staging data in the SSD, or a metadata store configured to manage storage of metadata in the SSD, and the immutable data store, the staging store, and the metadata store have characteristics that are different from one another.

In some embodiments, the command is a put command, an append command, an overwrite command, or an erase command.

In some embodiments, the I/O context includes at least one of an identification of the object store, a type of the command, a pointer to a location of an object corresponding to the command, and a current state of the command.

In some embodiments, the generating the I/O context based on the command includes: identifying an object ID, the identification of the object store, and the type of the command from the retrieved command; and identifying the pointer to the location of the object based on the local map and the object ID.

In some embodiments, the data processing unit further includes: validating the I/O context, wherein the asynchronously issuing the command to the SSD is in response to the validating of the I/O context.

In some embodiments, the asynchronously issuing the command to the SSD through the object store includes: issuing the command to the SSD; and processing another command from the command queue before completion of the command by the SSD.

In some embodiments, the identifying the successful command completion signal from the SSD including one of: polling the SSD for the successful command completion signal; and receiving an interrupt or call back function from the SSD indicating successful command completion by the SSD.

In some embodiments, the local map is one of a plurality of maps including an immutable data map, a staging data map, and a metadata map, the plurality of maps being stored at the SSD, wherein the immutable data map includes object IDs of immutable data stored at the SSD and corresponding locations of the immutable data at the SSD, wherein the staging data map includes object IDs of staging data stored at the memory and corresponding locations of the staging data at the memory, and wherein the metadata map includes object IDs of metadata stored at the SSD and corresponding locations of the metadata at the SSD.

In some embodiments, the asynchronously updating the local map includes: updating the local map; and processing another command from the command queue before completion of the updating the local map.

According to some embodiments of the present invention, there is provided a data processing unit in a key-value (KV) store node of a distributed data storage, the data processing unit including: a memory hosting a first command queue and a first completion queue corresponding to a first object store, and a second command queue and a second completion queue corresponding to a second object store; and a processor coupled to a solid-state drive (SSD) and configured to: process a first command by: retrieving the first command from the first command queue; generating a first input/output (I/O) context based on the first command; asynchronously issuing the first command to the SSD through the first object store; and asynchronously updating a first local map corresponding to the first object store; and process a second command by: retrieving the second command from the second command queue; generating a second I/O context based on the second command; asynchronously issuing the second command to the SSD through the second object store; and asynchronously updating a second local map corresponding to the second object store, wherein the processor is configured to process the first and second commands independently.

In some embodiments, the processor is configured to process the first command without accessing the second local map, and to process the second command without accessing the first local map.

In some embodiments, the first local map has a tree structure separate from that of the second local map.

In some embodiments, the first command queue is different from the second command queue.

According to some embodiments of the present invention, there is provided a key-value store (KVS) node of a distributed data storage, the KVS node including: a first data processing unit including: a first memory hosting a first command queue corresponding to a first object store; and a first processor coupled to a first solid-state drive (SSD) and configured to perform: retrieving a first command from the first command queue; generating a first input/output (I/O) context based on the first command; asynchronously issuing the first command to the first SSD through the first object store; and asynchronously updating a first local map corresponding to the first object store; and a second data processing unit including: a second memory hosting a second command queue corresponding to a second object store; and a second processor coupled to a second SSD and configured to perform: retrieving a second command from the second command queue; generating a second I/O context based on the second command; asynchronously issuing the first command to the second SSD through the second object store; and asynchronously updating a second local map corresponding to the first object store.

In some embodiments, the first SSD is separate from and external to the second SSD.

In some embodiments, the KVS node is configured to identify the first object store and the second object store to a data manager of the distributed data storage.

In some embodiments, the first processor is configured to acknowledge completion of the first command to a data manager of the distributed data storage by posting the first I/O context to a first completion queue of the first data processing unit, the second processor is configured to acknowledge completion of the second command to the data manager by posting the second I/O context to a second completion queue of the second data processing unit, and the first and second completion queues are accessible by the data manager.

BRIEF DESCRIPTION OF THE DRAWINGS

The accompanying drawings, together with the specification, illustrate example embodiments of the present disclosure, and, together with the description, serve to explain the principles of the present disclosure.

Figure 15:
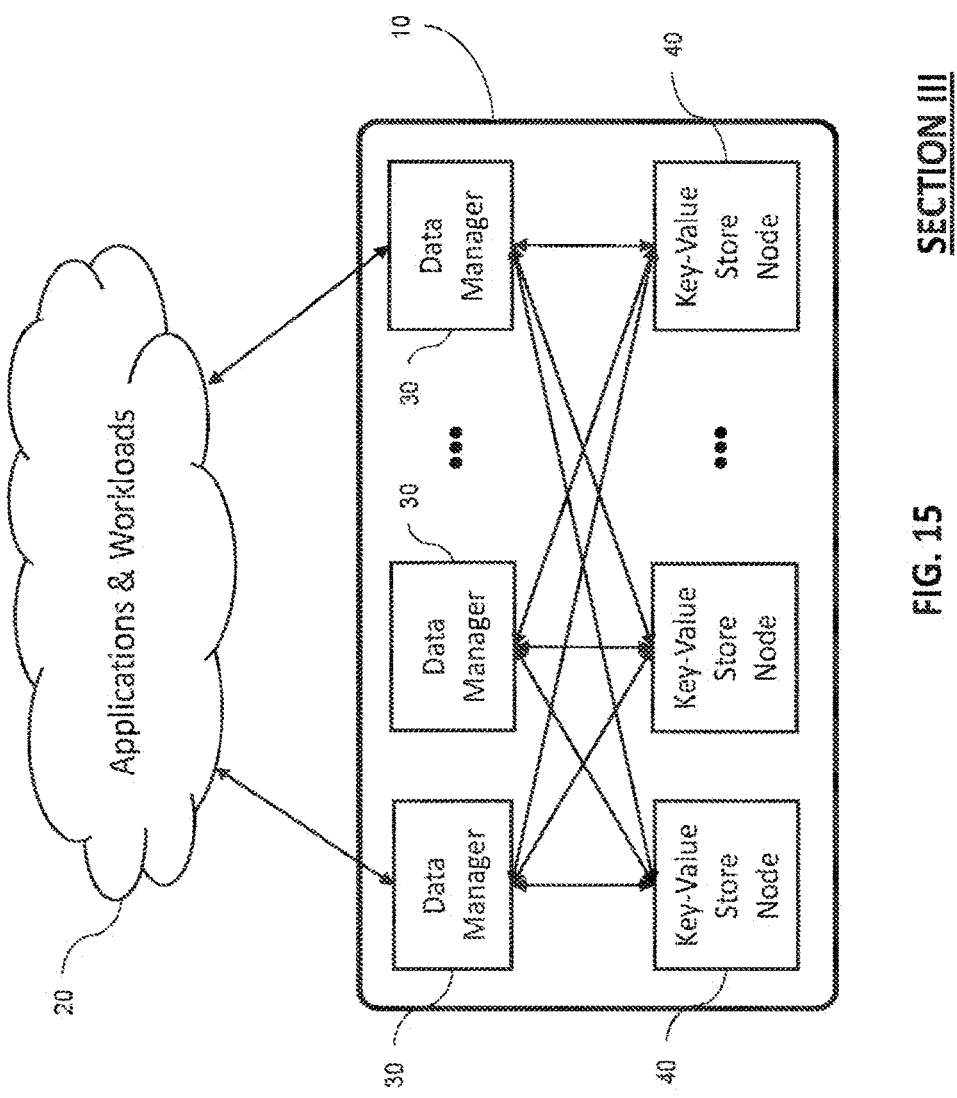

FIG. 15 is a block diagram illustrating a data platform, according to some embodiments of the present disclosure.

Figure 16:
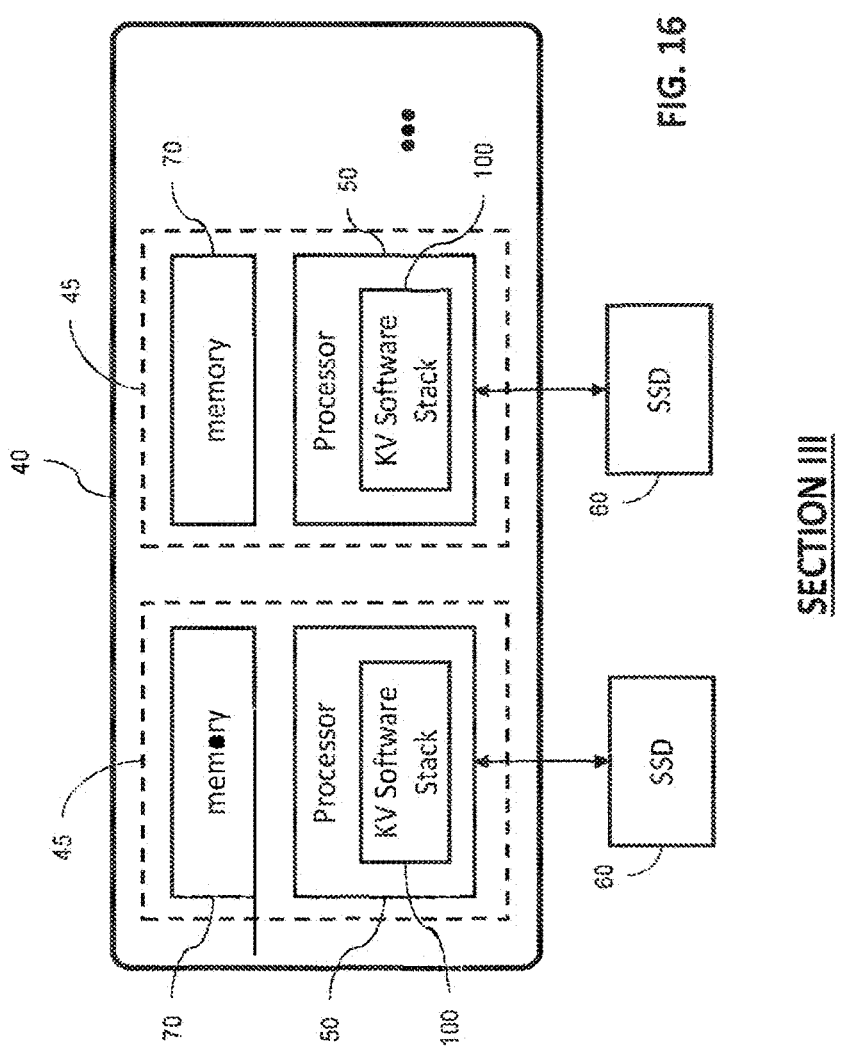

FIG. 16 is a block diagram of a key-value (KV) store node, according to some embodiments of the present disclosure.

Figure 17:
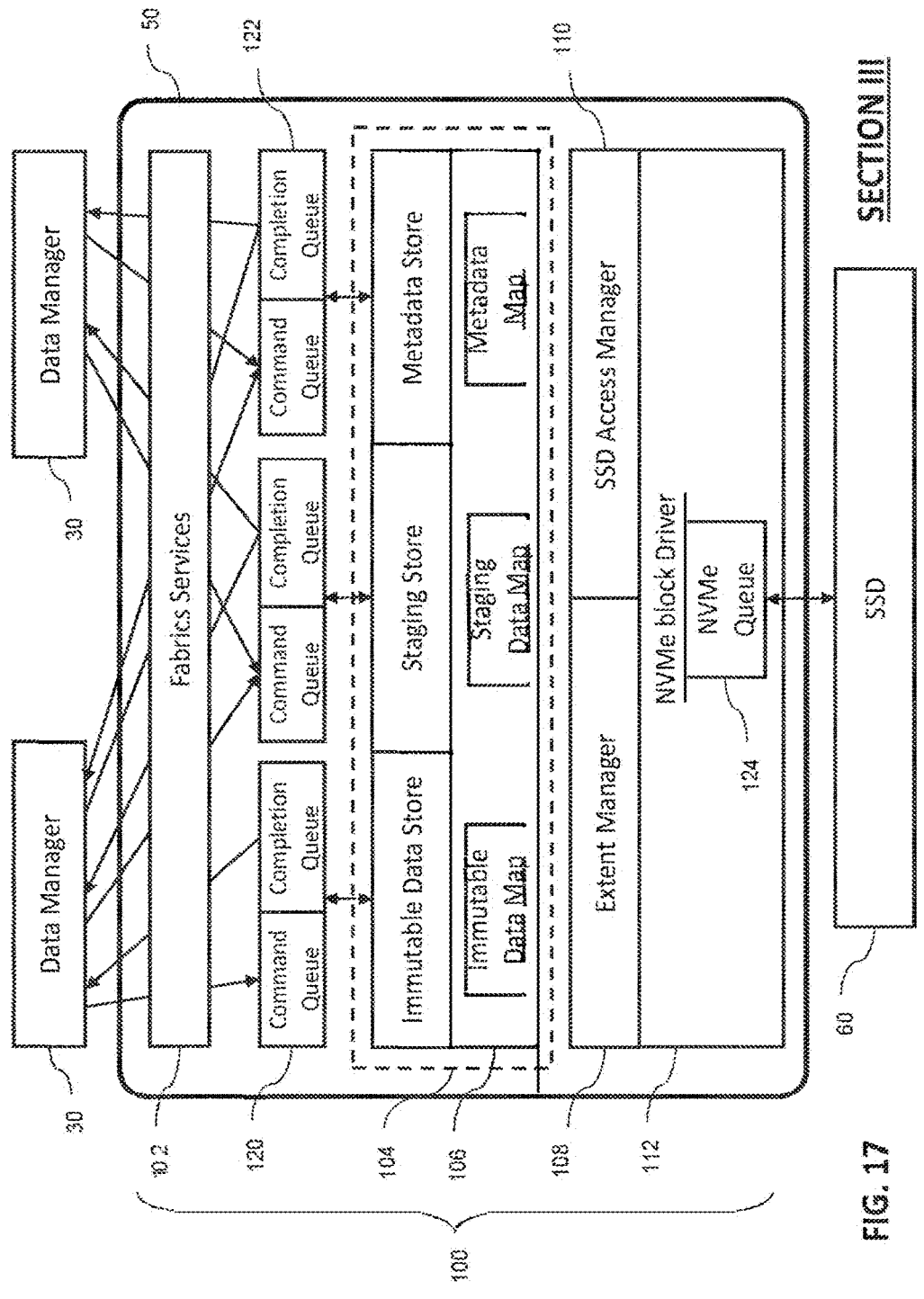

FIG. 17 is a block diagram of the KV software stack running on a processor of the KV store node, according to some embodiments of the present disclosure.

Figure 18:
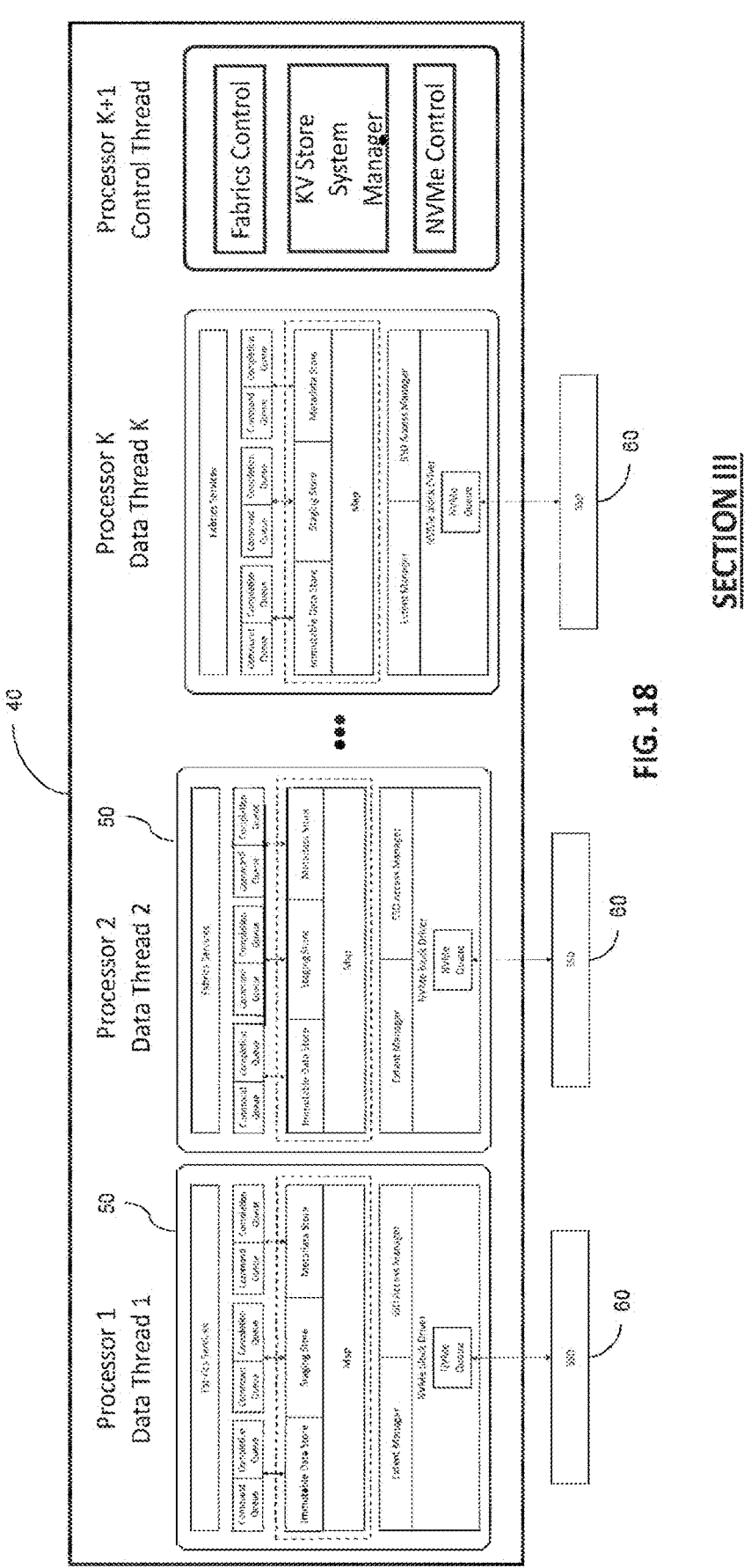

FIG. 18 is a block diagram illustrating the threading model of the KV store node, according to some embodiments of the present disclosure.

FIG. 19 is a flow diagram illustrating a method of processing a command received from a data manager by a processor of a data processing unit, according to some embodiments of the present disclosure.

DETAILED DESCRIPTION

The detailed description set forth below is intended as a description of example embodiments of a system and method for image compression, storage, and decompression, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

FIG. 15 is a block diagram illustrating a data platform, according to some embodiments of the present disclosure. FIG. 16 is a block diagram of a key-value store node, according to some embodiments of the present disclosure.

Referring to FIG. 15, according to some embodiments, the data platform 10 (also referred to as a cluster) is a parallel data computer that provides scalable distributed object storage to applications and workloads 20. The data platform 10 is capable of handling file and object-based data (henceforth referred to as objects) for data-intensive workloads such as cognitive artificial intelligence (AI), machine learning, high-speed microscopy, genomic sequencing, data streaming applications, and the like. In some embodiments, the data platform includes a plurality of data managers 30 (also referred to as data management nodes) and a corresponding plurality of key-value (KV) store nodes 40.

The data manager 30 provides input/output (I/O) access to data storage to a client application 20 through an interface, such as NFS (network file system), SMB (server message block), S3 (simple storage service), etc. When receiving data from the application 20, the data manager 30 may perform one or more operations on the data, such as adding data resiliency, converting a data file to an object, splitting received data into smaller objects (e.g., atomic objects), etc., before distributing the data across one or more key-store nodes. The data manager 30 may perform the inverse operation when the data is being read by the application 20.

When splitting a large file into a number of smaller objects (e.g., atomic objects), the data manager 30 keeps track of where each object is stored. For example, when the data manager 30 receives an I/O request for a large data file (e.g., 1 GB), the data manager converts the file into a number of smaller objects (of, e.g., 1 MB), and distributes the objects across the different KV store nodes 40 (e.g., each object is directed to a different KV store node 40). By converting a single large I/O request into a large number (e.g., a 1000) of atomic I/O requests, the data manager 30 generates substantial parallelism in the system, which significantly reduces the processing time of the original I/O request (e.g., write time may be reduced by 2 or 3 orders of magnitude). The meta data generated by this process, which keeps track of the relationship of the atomic objects to the original file, may be stored as one or more metadata objects, which are stores in an appropriate number of KV store nodes 40 (e.g., by the corresponding metadata stores within the nodes 40). The data manager 30 controls, and keeps track of, the distribution of the objects and the associated metadata.

In some embodiments, the KV store nodes 40 store objects in solid-state drives (SSDs) and maintain local maps of data being stored. Because the KV store node 40 localizes mapping tables to a particular SSD, the size and complexity of mapping tables is restricted to a given SSD even when the distributed object store can scale out to support very large data storage (e.g., petabytes of storage). Here, the small map structure means that the tree depth can be very small, proportionate to the number of keys generated by the distributed object store.

Referring to FIG. 16, according to some embodiments, the KV store node 40 includes a plurality of data processing units 45, each of which includes a processor 50, which is coupled to an SSD 60, and a memory 70. The processors 50 and SSDs 60 may have a one-to-one correspondence. Each processor 50 may run a single data thread, which is represented by the key-value (KV) software stack 100, and may access (e.g., write to/read from) a single SSD 60. According to some embodiments, each processor 50 hosts a plurality of key-value stores (i.e., object stores) that are tuned for different types of data. The plurality of KV stores may share a persistent memory in the KV store node 40. The memory 70 may include the persistent memory (e.g., non-volatile dual in-line memory module (NVDIMM)) and a volatile memory (e.g., dynamic random-access memory (DRAM)). The processor 50 may include a single processing core (e.g., of a multi-core CPU) that runs the data thread, or a plurality of cores. When each processor 50 includes a set of cores, a single core of the set may communicate with the SSD 60 and the data managers 30 and offload some of its operations to the remaining cores of the set, which may act as co-processing cores. In some embodiments, the mapping operation of each SSD is local to the corresponding processor/thread, and each processor 50 operates completely independently of the other processors 50 in the KV store node 40 and the data platform 10.

In some embodiments, each of the KV stores are uniquely identifiable across the data platform by a cluster-wide unique store ID. The data manager 30 may identify all of the KV stores of each of the KVS nodes 40 during a device discovery phase, which may, for example, occur when the data platform is powered on or restarted. Once discovered, the data manager 30 may send one or more objects (e.g., one or more atomic objects) to a particular KV store in the data platform using its unique store ID.

FIG. 17 is a block diagram of the KV software stack 100 running on the processor 50, according to some embodiments of the present disclosure.

According to some embodiments, the KV software stack includes a fabric services layer 102, a store layer 104, a maps layer 106, an extent manager 108, and an SSD access manager layer 110.

The fabric services layer 102 provides connectivity between the data managers 30 and the KV store node 40 that includes the processor 50. The fabric services layer 102 may receive command packets (e.g., NVMe command packets) that contain (e.g., wrap) native key-value requests. It converts (e.g., unwraps) these command packets into key-value requests and issues the key-value requests to the store layer 104. Similarly, the fabric services layer 102 receives responses for the key-value requests from the store layer 104 and wraps them in command packets (e.g., NVMe command packets) for transport to a data manager 30.

In some embodiments, the store layer 104 includes the plurality of KV stores (also referred to as object stores), each of which has its own characteristics and is configured to manage the storage of different type of data. The KV stores may share a common set of characteristics (e.g., operations such as get, put, erase may be common to all KV stores), and may have a number of individualized/differently-set characteristics to improve (e.g., speed up) the handling of IO requests. In addition to presenting key value stores for each physical SSD (e.g., NVMe SSD), the store layer 104 is configured to convert a native key-value request, which is received from the fabric services layer 102, into one or more block requests (e.g., NVMe block requests) that are sent to the underlying physical SSD 60 according to mapping information stored at the mapping layer 106. The store layer 104 utilizes the memory 70 (e.g., persistent memory, such as NVDIMM) to cache and coalesce (e.g., aggregate) block requests to ensure that the underlying SSD 60 (e.g., block NVMe SSD) sees sequential write traffic. This may aid to avoid random access to blocks within the SSD 60 and to facilitate sequential writes of large sizes, which can improve the performance of the SSD 60 and the data platform 10 as a whole.

According to some embodiments, the plurality of KV stores in the store layer 104 include an immutable data store, a staging store (e.g., a mutable data store), and a metadata store.

In some embodiments, the immutable data store is configured to store immutable user data (e.g., in the form of immutable atomic objects). The immutable data store maintains an immutable data map within the maps layer 106 in the form of a set of KV pairs, each of which corresponds to a different object stored at the SSD 60. In some examples, the immutable data map may be a data structure in the form of a tree like data structure for efficient storing, updating, and retrieval of the object ID to physical location mapping, such as a B Tree/B+ Tree. Each KV pair in the immutable data map includes a key that is an object identifier of the corresponding object and a value that is the pointer to the physical location of the corresponding object in the SSD 60. The KV pairs in this dataset may not change frequently and have long lifespans. As such, the data managed by the immutable data store may be predominantly subject to read requests and seldom be deleted or overwritten by new values. Thus, the immutable data store may be configured primarily for (e.g., tuned/optimized for) handling of read, overwrite, and delete requests, and for efficient usage of SSD capacity. The immutable data store may perform large sequential writes to the SSD 60. For example, this KV store may write in units of 64 KB to 1 MB. In some examples, the immutable data store may improve its I/O efficiency (e.g., lower I/O latency) by not supporting operations such as append and overwrite. In some examples, the immutable data store may utilize about 90% of the capacity of the SSD 60.

In some embodiments, the staging store is configured to store intermediate data (e.g., mutable objects) before they are finalized and moved to the immutable store. The staging store may be configured (e.g., optimized) to exhibit high performance in (i) its ability to handle changes to mutable data by aggregating updates to the object data, and (ii) its ability to maintain consistent performance against multiple mutable operations through efficient data layout that is tuned for handling these operations. As such, the staging store helps the overall performance of the distributed object store by segregating mutable data sets from immutable data sets and localizing the handling of mutable operations on the distributed object store.

According to some examples, the staging store may use a storage layout within the SSD that includes and leverages persistent class memory technologies as the underlying persistent storage for the staging store. Such persistent class memory technologies may provide performance and byte addressability that (i) make possible significantly higher performance for the client application 10 and for processing the active working data set, and that (ii) decrease the overall wear on the underlying storage in the object store.

Each KV pair in the staging store includes a key that is an object identifier of the corresponding object and a value that is the pointer to the physical location of the corresponding object in the memory 70. The KV pairs in this dataset, which include data being actively modified by the application 20, may be small objects that are updated frequently (e.g., via the append operations). As such, the staging store may be configured to perform (e.g., be tuned/optimized for) operations such as append and overwrite. In some embodiments, the staging store maintains a log of all modification made to an object (e.g., an atomic object). For example, every time a modification is to be made, the processor 50 appends the change to the end of the log. When the data manager 30 determines that the log has reached a particular size (i.e., the log size exceeds a size threshold, such as 1 MB) or a certain amount of time has elapsed since starting the log (i.e., elapsed time exceeds a time threshold), the processor 50 performs the actions/operations recorded in the log, clears the log, and passes the modified object to the immutable data store (also referred to as de-staging the modified data). Without the staging store, when an atomic object is being modified (e.g., even when only a few bits of an object are being changed), it has to be read from the SSD, modified, then stored back into the SSD. This read-write process has to be repeated every time the object is modified, which can be time consuming and very inefficient. As such, the staging store improves the performance of the KV store node 40, and thus the data platform 10, by aggregating modifications to an object prior to them being performed on the object. In some embodiments, each KV pair in the staging store corresponds to an object (e.g., an atomic object), with the key being an object identifier and the value being a pointer to the location of the staging data in the SSD.

According to some embodiments, the metadata store is configured to store metadata information, which is frequently updated, in a portion of the SSD 60 and to maintain a metadata map in the form of KV pairs. Each KV pair in the metadata store includes a key that is an object identifier of the corresponding object and a value that is the pointer to the physical location of the corresponding object in the SSD 60. The KV pairs in this data set may be updated frequently through operations such as overwrite and append. As such, some subset of the KV pairs in this store may be short-lived or highly volatile (e.g., experience frequent changes). As such, the metadata KV store may be configured for (e.g., tuned/optimized for) data volatility, small sized data requests, append type requests, and/or the like. For example, this KV store may write to the SSD 60 in units of 64 Bytes to 128 KB. The information stored at the metadata store may be internally generated and/or externally generated metadata. As an example, the internally generated metadata may be produced by the data managers 30 when splitting a large file or object into a number of smaller atomic objects. The metadata information for stitching the data back may be stored at the metadata store. As a further example, the externally generated metadata may be the metadata associated with a received file which is used for the management of the file. In some examples, the processor 50 may allocate about 5% of the capacity of the SSD 60 to the metadata store.

In some embodiments, each of the immutable data map, the staging data map, and the metadata map are stored in the SSD. When accessed, each map is lowded into the volatile memory (e.g., DRAM), updates are accumulated and stored in the persistent memory (e.g., NVDIMM) and then slowly flushed does to the SSD 60 in the background.

While FIG. 17 illustrates embodiments in which the store layer 104 includes the metadata store, the staging store, and the immutable data store, embodiments of the present disclosure are not limited thereto. For example, the store layer 104 may include any number and any type of KV stores that are suitably tuned for a given application or set of applications.

During the device discovery phase of the data platform 10, the KV store nodes 40 may identify the KV stores that are available to the data managers 30 (e.g., immutable data, staging, and metadata stores). Therefore, when servicing the client applications 20, the data managers 30 are aware of what KV stores are at each KV store node 40. As such, when the data platform receives application data, the data managers 30 can forward the data or a portion of the data (e.g., in the form of atomic objects) to the appropriate KV stores at the corresponding KV store nodes 40.

The mapping layer 106 facilitates key-value traffic. In some embodiments, the mapping layer 106 includes a plurality of high speed maps (e.g., the immutable data map, the staging data map, and the metadata map) utilized by the store layer 104 to map a native object identifier to a physical location (e.g., an underlying logical block address (LBAs)) at the SSD (e.g., NVMe block SSD) 60 or at the memory 70 (e.g., when the object is cached) where the corresponding object is stored. The map utilizes persistent memory (e.g., NVDIMM), which is part of the memory 70, to journal the updates to the maps, cache frequent map lookups, and coalesce multiple map updates. This layer is configured to support efficient range operations including obtaining a list of all keys in a specified range (i.e., range query), deleting all keys in a specified range (i.e., Range Delete), and/or the like. The range operations may improve the operation of the data distribution functionality provided by the data managers 30 by reducing the amount of flash pages to read from the SSD 60. In some embodiments, the mapping layer 106 creates a separate mapping data structure (e.g., a mapping tree) for each KV store, which is independently persisted. By having separate small map structures (e.g., the immutable data map, the staging data map, and the metadata map), the tree depth of the map structures can be very small proportionate to the number of keys generated by the distributed object store.

According to some examples, the SSD extent management layer 108 manages the space allocation on the physical SSD 60 for the plurality of KV stores (e.g., the immutable data store, the metadata store, and the staging store), and the SSD access management layer 110 manages the NVMe block driver 112 to issue block IO requests to the underlying SSD.

In some examples, the processor 50 utilizes a set of command queues 120 to queue the commands (e.g., read and write commands) directed to each of the KV stores by the data manager 30, and a corresponding set of completion queues 122 to queue command completions from the KV stores, which indicate to the data manager 30 the completion of one or more commands. Each KV store may have a corresponding pair of command and completion queues 120 and 122. The processor 50 may also utilize one or more NVMe queues 124 to queue outgoing NVMe commands directed to the corresponding SSD 60. In some examples, each KV store may have a corresponding NVMe queue 124, or the different KV stores may share a common NVMe queue 124.

FIG. 18 is a block diagram illustrating the threading model of the KV store node 40, according to some embodiments of the present disclosure.

In some embodiments, the KV store node hosting N number of SSDs has N number of KV software stacks 100 running independently, in parallel, and without any contention, on N different processors 50. Each software stack 100 has its own dedicated processor and memory resources (see also FIG. 16). This allows for linear scaling of performance both within the KV store nodes 40 and across the KV store nodes 40. In some examples, the KV store node 40 has a (K+1)th processor running a control thread that controls and manages the fabrics, the KV store system, and the NVMe drivers across the different threads running on the KV store node 40. By using this threading model, the KV store software stack 100 is lockless, where it runs independently on a processor 50 (e.g., a core or set of cores) without having to synchronize across multiple processors 50. This provides for consistent latency in accessing the objects, irrespective of how the data platform, which is a distributed object store, scales out.

Further, the KV store node 40 localizes mapping tables to a particular SSD 60. In embodiments in which there are multiple KV stores that reside in a given SSD, the mapping tables are localized to a particular store within that SSD. Therefore, the size and complexity of mapping tables is restricted to a given SSD even when the distributed object store can scale out to support very large data storage (e.g., petabytes of storage). This reduces or eliminates the contentions that may arise in the solutions of the related art. For example, in the related art platforms where the metadata is stored in a separate metadata server with its own dedicated SSD, contentions may occur when accessing different servers.

FIG. 19 is a flow diagram illustrating a method S500 of processing a command received from a data manager by a processor 50 of a data processing unit 45, according to some embodiments of the present disclosure.

According to some embodiments, the data manager 30 sends a command to a particular object store using the store's unique store ID. The object store may be an immutable data store configured to manage storage of immutable data in the SSD 60, a staging store configured to manage storage of staging data in the SSD 60, or a metadata store configured to manage storage of metadata in the SSD 60. The command may be a put command, a get command, an append command, an overwrite command, or an erase command. This command may be received by (e.g., queued in) the command queue 120 corresponding to the store ID.

The processor 50 of the data processing unit 45 that corresponds to the store ID retrieves the command from the command queue (S502) and generates an input/output (I/O) context based on the command (S504). The I/O context may include one or more of the store ID, a type of the command (e.g., get, put, erase, etc.), a pointer to a location of the object corresponding to the command, and a current state of the command. In some examples, the processor 50 may identify an object ID corresponding to the command, the store ID, and the type of the command from the retrieved command, and may identify the pointer to the location of the object based on a local map corresponding to the store ID and the object ID.

The processor 50 then validates to validating the I/O context (e.g., to ensure that the object or object ID actually exists in the SSD 60 or the memory 70), and when the I/O context is valid, the processor 50 asynchronously issues the command to the SSD 60 through the object store (S506). By doing so asynchronously, the processor 50 does not wait for the command completion by the SSD 60 before proceeding to the next operation and begins the next operation once the command is issued to the SSD 60. Here, by utilizing the object store corresponding to the store ID, the processor 50 benefits from the particular characteristics of the object store (e.g., small or large write sizes, existence of only certain operations, etc.) to improve the processing time of the command.

The processor identifies a successful command completion signal from the SSD 60 (S508). In some examples, the processor 50 may do so by polling the SSD 60 for the successful command completion signal, or by receiving an interrupt or call back function from the SSD 60 indicating successful command completion by the SSD. In response to identifying the successful command completion signal, the processor asynchronously updates the local map corresponding to the object store (S510). The processor 50 then acknowledges command completion by posting the I/O context to the completion queue 122 corresponding to the store ID (S512).

In some examples, the data manager 30 may send a plurality of commands directed to different object stores within the same data processing unit 45. For example, the data manager 30 may asynchronously send a first command to a first command queue 120 and a second command to a second command queue 120 within the same data processing unit 45. Here, the processor 50 may independently process each command as described above, and without any synchronization points (i.e., without sharing any resources. For example, the processor 50 may process the first command without accessing a second local map corresponding to the second object store, and to process the second command without accessing a first local map corresponding to the first object store. By having each object store have their own local maps, it means that there are no synchronization point (e.g., locks, mutex) that are needed in order to access the map. In comparison, a multi-threaded system of the related art with a shared resource may require a synchronization point (e.g., lock, mutex) before any access to the shared resource. This typically requires a lot of CPU cycles and can slow down overall performance. In some embodiments, the first local map has a tree structure separate from that of the second local map. According to some embodiments, all of the different maps are implemented using a tree-like data structure (e.g., a B+Tree) and each store has its own instance of a map containing only objects that are known and relevant for that particular store.

In some examples, the data manager 30 may send a plurality of commands directed to different object stores from different data processing units 45. For example, the data manager 30 may asynchronously send a first command to a first command queue 120 at a first data processing unit 45 and a second command to a second command queue 120 at a second data processing unit 45. As detailed before, a first processor 50 associated with the first command queue 120 in the first data processing unit 45 may process the first command, and a second processor 50 associated with the second command queue 120 in the second data processing unit 45 may process the second command. As the resources (e.g., processor 50, SSD 60, local maps, etc.) of each data processing unit are completely separate from (and e.g., external to) those of other data processing units, the two commands are processed in parallel and completely independently of one another.

As will be understood by a person of ordinary skill in the art, the number of commands that may be processed in parallel within a same data processing unit 45 or even across KVS nodes 40 is not limited to two and may be any suitable number.

As such, the processor 50 provides a consistent latency per SSD 60. As the number of SSDs in the distributed system are added, the number of processors also increases thereby ensuring consistent latency as these processors are independent and have no synchronization points.

One or more embodiments according the present disclosure may include one or more characteristics of one or more of the following clauses (although embodiments are not limited thereto):

Clause 1. A data processing unit in a key-value (KV) store node of a distributed data storage, the data processing unit comprising:

a memory hosting a command queue and a completion queue corresponding to an object store; and a processor coupled to a solid-state drive (SSD) and configured to perform:

retrieving a command from the command queue;

generating an input/output (I/O) context based on the command;

asynchronously issuing the command to the SSD through the object store;

identifying a successful command completion signal from the SSD;

asynchronously updating a local map corresponding to the object store; and acknowledging command completion by posting the I/O context to the completion queue.

Clause 2. The data processing unit of clause 1, wherein a source of the command is a data manager of the distributed data storage, and the command corresponds to an application I/O request received by the data manager.

Clause 3. The data processing unit of clause 2, wherein the command queue and the completion queue are accessible to the data manager.

Clause 4. The data processing unit of clause 1, wherein the object store is an immutable data store configured to manage storage of immutable data in the SSD, a staging store configured to manage storage of staging data in the SSD, or a metadata store configured to manage storage of metadata in the SSD, and wherein the immutable data store, the staging store, and the metadata store have characteristics that are different from one another.

Clause 5. The data processing unit of clause 1, wherein the command is a put command, an append command, an overwrite command, or an erase command.

Clause 6. The data processing unit of clause 1, wherein the I/O context comprises at least one of an identification of the object store, a type of the command, a pointer to a location of an object corresponding to the command, and a current state of the command.

Clause 7. The data processing unit of clause 6, wherein the generating the I/O context based on the command comprises:

identifying an object ID, the identification of the object store, and the type of the command from the retrieved command; and identifying the pointer to the location of the object based on the local map and the object ID.

Clause 8. The data processing unit of clause 1, further comprising:

validating the I/O context, wherein the asynchronously issuing the command to the SSD is in response to the validating of the I/O context.

Clause 9. The data processing unit of clause 1, wherein the asynchronously issuing the command to the SSD through the object store comprises:

issuing the command to the SSD; and processing another command from the command queue before completion of the command by the SSD.

Clause 10. The data processing unit of clause 1, wherein the identifying the successful command completion signal from the SSD comprising one of:

polling the SSD for the successful command completion signal; and receiving an interrupt or call back function from the SSD indicating successful command completion by the SSD.

Clause 11. The data processing unit of clause 1, wherein the local map is one of a plurality of maps comprising an immutable data map, a staging data map, and a metadata map, the plurality of maps being stored at the SSD, wherein the immutable data map comprises object IDs of immutable data stored at the SSD and corresponding locations of the immutable data at the SSD, wherein the staging data map comprises object IDs of staging data stored at the memory and corresponding locations of the staging data at the memory, and wherein the metadata map comprises object IDs of metadata stored at the SSD and corresponding locations of the metadata at the SSD.

Clause 12. The data processing unit of clause 1, wherein the asynchronously updating the local map comprises:

updating the local map; and processing another command from the command queue before completion of the updating the local map.

Clause 13. A data processing unit in a key-value (KV) store node of a distributed data storage, the data processing unit comprising:

a memory hosting a first command queue and a first completion queue corresponding to a first object store, and a second command queue and a second completion queue corresponding to a second object store; and a processor coupled to a solid-state drive (SSD) and configured to:

process a first command by:

retrieving the first command from the first command queue;

generating a first input/output (I/O) context based on the first command;

asynchronously issuing the first command to the SSD through the first object store; and asynchronously updating a first local map corresponding to the first object store; and process a second command by:

retrieving the second command from the second command queue;

generating a second I/O context based on the second command;

asynchronously issuing the second command to the SSD through the second object store; and asynchronously updating a second local map corresponding to the second object store, wherein the processor is configured to process the first and second commands independently.

Clause 14. The data processing unit of clause 13, wherein the processor is configured to process the first command without accessing the second local map, and to process the second command without accessing the first local map.

Clause 15. The data processing unit of clause 13, wherein the first local map has a tree structure separate from that of the second local map.

Clause 16. The data processing unit of clause 13, wherein the first command queue is different from the second command queue.

Clause 17. A key-value store (KVS) node of a distributed data storage, the KVS node comprising:

a first data processing unit comprising:

a first memory hosting a first command queue corresponding to a first object store; and a first processor coupled to a first solid-state drive (SSD) and configured to perform:

retrieving a first command from the first command queue;

generating a first input/output (I/O) context based on the first command;

asynchronously issuing the first command to the first SSD through the first object store; and asynchronously updating a first local map corresponding to the first object store; and a second data processing unit comprising:

a second memory hosting a second command queue corresponding to a second object store; and a second processor coupled to a second SSD and configured to perform:

retrieving a second command from the second command queue;

generating a second I/O context based on the second command;

asynchronously issuing the first command to the second SSD through the second object store; and asynchronously updating a second local map corresponding to the first object store.

Clause 18. The KVS node of clause 17, wherein the first SSD is separate from and external to the second SSD.

Clause 19. The KVS node of clause 17, wherein the KVS node is configured to identify the first object store and the second object store to a data manager of the distributed data storage.

Clause 20. The KVS node of clause 17, wherein the first processor is configured to acknowledge completion of the first command to a data manager of the distributed data storage by posting the first I/O context to a first completion queue of the first data processing unit, wherein the second processor is configured to acknowledge completion of the second command to the data manager by posting the second I/O context to a second completion queue of the second data processing unit, and wherein the first and second completion queues are accessible by the data manager.

Here, the processor 50 or "processing circuit" may include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ.

Further, the use of "may" when describing embodiments of the inventive concept refers to "one or more embodiments of the inventive concept." Also, the term "exemplary" is intended to refer to an example or illustration.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

SECTION IV

System and Method for Managing Metrics in a Clustered File System

Figure 20:
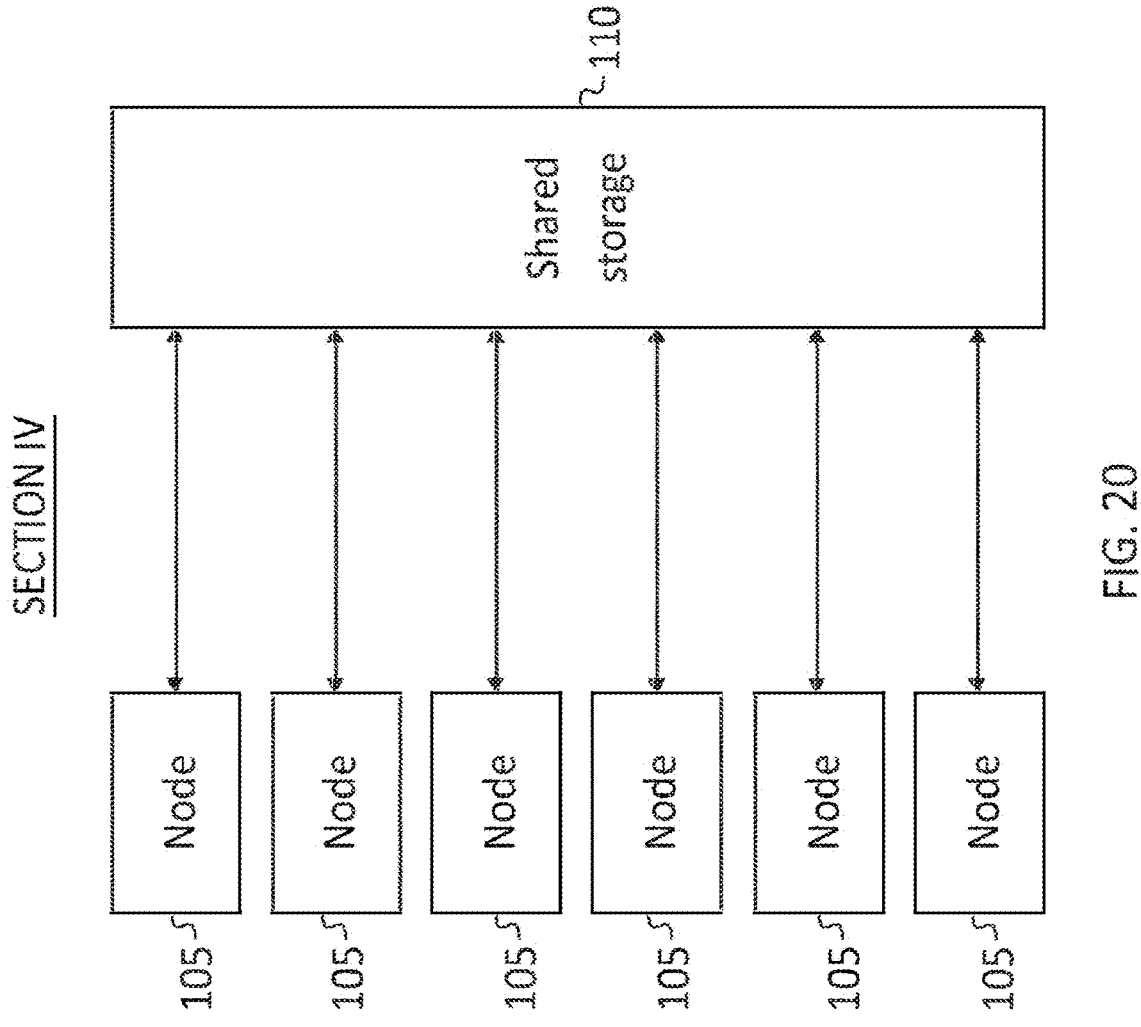
Figure 21:
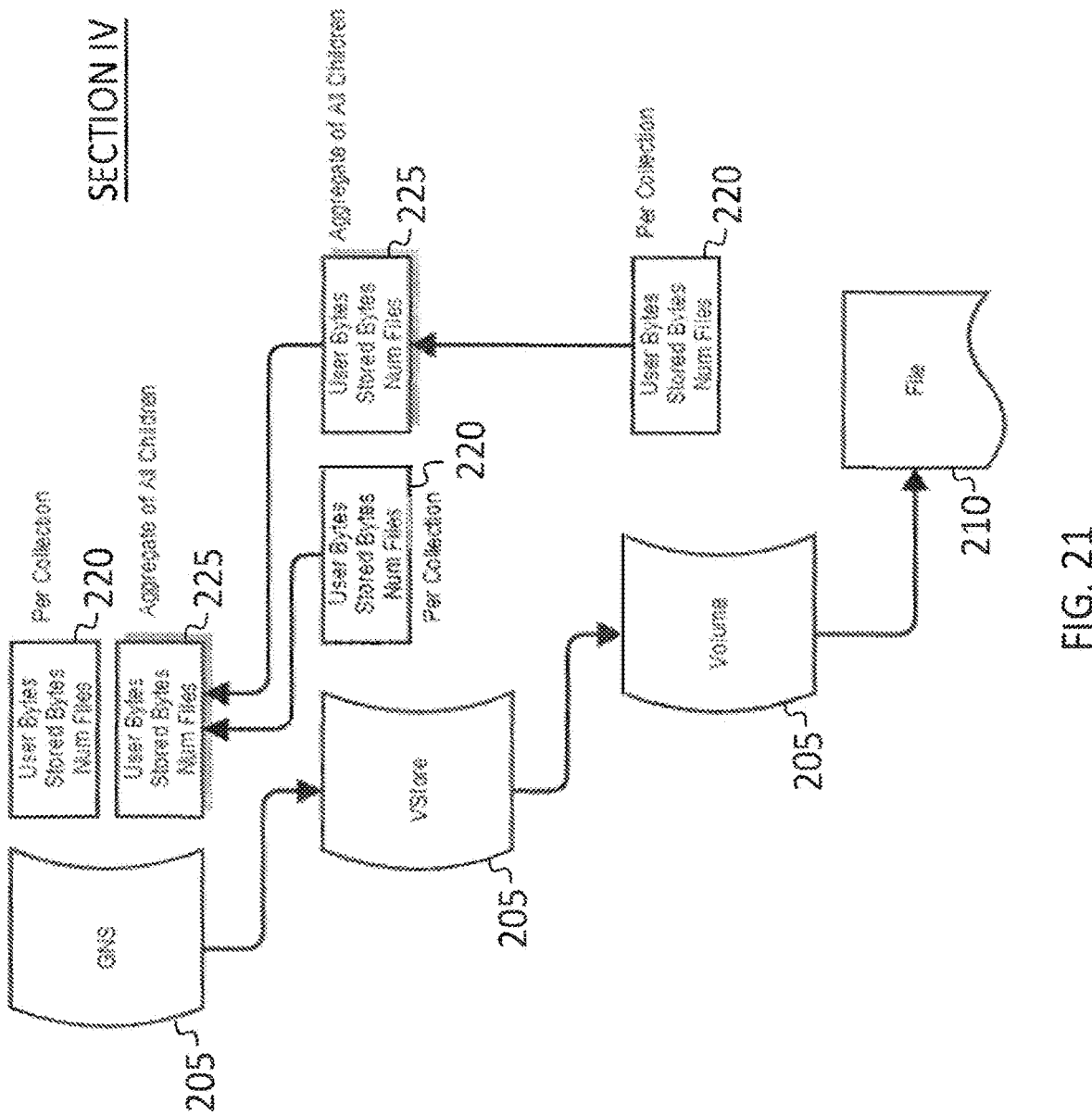

The text in the present "Section IV" of the Specification, including any reference numerals or characters and any references to figures, refer and correspond to the FIGS. 20 and 21 with the label "Section IV", and does not refer or correspond to the text in sections I-III, nor any of the reference numerals, characters, or figures with the labels on the figure sheets that have the label "Section I", "Section II", or "Section III". That is, each of the Sections I-IV in the present Specification should be interpreted in the context of the corresponding description in the same section and the figures labeled with the same section, respectively. Notwithstanding the foregoing, however, various aspects and inventive concepts of the various sections may be applied to aspects and inventive concepts of other sections.

FIELD

One or more aspects of embodiments according to the present disclosure relate to data storage, and more particularly to a system and method for managing metrics in a clustered file system.

BACKGROUND

Metrics, such as disk usage or data access rates may be useful in operating and managing a file system such as a clustered file system. Some methods of gathering such metrics, however, may be slow and burdensome. For example, to calculate disk usage by inspecting every directory of a file system, and summing the totals obtained, may be time consuming, resulting in significant delay before the result is available. Moreover, certain methods for managing metrics may require a system-wide lock for some operations; such a lock may significantly degrade the performance of the file system.

Thus, there is a need for a system and method for managing metrics in a clustered file system.

SUMMARY

According to an embodiment of the present disclosure, there is provided a method for tracking metrics in a clustered file system, the clustered file system including a plurality of directories, the method including: determining that a first reporting criterion is met for a first metric for a first directory of the plurality of directories; and reporting, to a second directory of the plurality of directories, an update for the first metric for the first directory, the first directory being a child directory of the second directory.

In some embodiments: the clustered file system further includes a plurality of nodes, and each of the directories has a primary owner node from among the plurality of nodes.

In some embodiments, the reporting includes sending the update for the first metric, by a first node, to a second node, the first node being the primary owner node of the first directory, and the second node being the primary owner node of the second directory.

In some embodiments, the reporting further includes computing, by the first node, a node identifier for the second node, the computing including computing a hash of a name of the second directory.

In some embodiments, the method further includes retrieving, from a parent cache of the first node, the name of the second directory.

In some embodiments, the hash is a consistent hash.

In some embodiments: each of the directories further has a secondary owner node from among the plurality of nodes, and the method further includes: determining that the primary owner node of the first directory has failed, and reporting, to the second directory, an update for a second metric, the reporting of the update for the second metric including sending the update for the second metric, by the first node, to a third node, the third node being the secondary owner node of the second directory.

In some embodiments, the reporting of the update includes reporting a change in the first metric for the first directory.

In some embodiments, the method further includes: reporting, to the first directory, a first update, the first update being an update of a second metric for a third directory, the third directory being a child directory of the first directory; reporting, to the first directory, a second update, the second update being an update of the second metric for a fourth directory, the fourth directory being a child directory of the first directory; and updating an aggregate value of the second metric based on the first update and on the second update.

In some embodiments, the method further includes reporting an update for the aggregate value to the second directory.

In some embodiments, the first metric for the first directory is a quantity of storage allocated, in the first directory, to a first user.

In some embodiments, the method further includes calculating an amount by which an aggregate value of the first metric for the second directory is less than a storage quota for the first user.

In some embodiments, the first metric for the first directory is a measure of an access rate in the first directory.

In some embodiments, the method further includes identifying a directory, of the plurality of directories, having the greatest value of the first metric.

In some embodiments, the first metric for the first directory is a measure of an aggregate access rate, for a first user, in the first directory.

In some embodiments, the method further includes: calculating an aggregate access rate, for the second directory, for each of a plurality of users including the first user, and identifying a user having a greatest value of the aggregate access rate for the second directory.

According to an embodiment of the present disclosure, there is provided a system including: shared storage; and a plurality of nodes, the shared storage being configured to store a plurality of directories, each of the directories having a primary owner node, a first node, including a first processing circuit, being the primary owner node of a first directory of the plurality of directories, a second node, including a second processing circuit, being the primary owner node of a second directory of the plurality of directories, the first directory being a child directory of the second directory, the first processing circuit being configured to: determine that a first reporting criterion is met for a first metric for the first directory; and send, to the second processing circuit, an update for the first metric for the first directory.

In some embodiments, the first metric is a quantity of storage allocated, in the first directory, to a first user.

In some embodiments, the first metric for the first directory is a measure of an access rate in the first directory.

According to an embodiment of the present disclosure, there is provided a system including: shared storage; and a plurality of nodes, the shared storage being configured to store a plurality of directories, each of the directories having a primary owner node, a first node, including first means for processing, being the primary owner node of a first directory of the plurality of directories, a second node, including second means for processing, being the primary owner node of a second directory of the plurality of directories, the first directory being a child directory of the second directory, the first means for processing being configured to: determine that a first reporting criterion is met for a first metric for the first directory; and send, to the second processing circuit, an update for the first metric for the first directory.

BRIEF DESCRIPTION OF THE DRAWINGS

These and other features and advantages of the present disclosure will be appreciated and understood with reference to the specification, claims, and appended drawings wherein:

FIG. 20 is a block diagram of a clustered file system, according to an embodiment of the present disclosure; and FIG. 21 is data organization diagram, according to an embodiment of the present disclosure.

DETAILED DESCRIPTION

The detailed description set forth below in connection with the appended drawings is intended as a description of some example embodiments of a system and method for managing metrics in a clustered file system provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Some embodiments allow the creation of custom metrics that are generated in the context of a directory or file in the clustered file system namespace. The metrics so created may have their own rules for synchronization across the clustered file system as well for aggregating related metric values to each parent node all the way to the root directory of the clustered file system namespace. Supporting custom metrics may not require disk layout changes or transaction changes and may be accommodated with little coding effort.

As discussed in further detail below, the clustered file system may include a plurality of nodes that allow file and directory operations concurrently to various directories and files in the clustered file system namespace and each node can potentially update metric values for the same directory or update metrics values to different directories, which then may be accumulated and represented continuously up the file system namespace hierarchy.

Some embodiments provide a mechanism to represent an aggregate value of metrics updates that may occur to the same directory from across the cluster without having to create transactions for such updates and be able to synchronize the cumulative value of such updates with minimal messaging overhead. Some embodiments further allow related metrics at various directories in the file system hierarchy to be continuously aggregated up the namespace hierarchy such that parents can reflect cluster-wide synchronized values of all related metrics of their children. Further, some embodiments keep the cumulative, cluster-synchronized values or all related metrics of the direct children of a directory separate from that of the grandchildren to allow easy graft operation of metric values when a directory in the filesystem namespace is moved from one parent to another.

Referring to FIG. 20, a clustered file system may include a plurality of nodes (or "data manager nodes" (DMNs)) 105, each configured to access (e.g., to perform read and write operations on) shared storage 110. The shared storage may include one or more persistent storage devices such as solid-state drives, and one or more host processors or other processing circuits, for interfacing between the nodes 105 and the one or more persistent storage devices. The data stored in the clustered file system may be organized as a plurality of directories, each containing zero or more files and zero or more directories. Each directory except a root directory may have a parent directory and zero or more child directories. A first directory that is immediately within a second directory may be referred to as a "direct child" or simply as a "child" of the second directory; in this situation the second directory may be referred to as the "direct parent" or simply as the "parent" of the first directory. If the first directory contains another directory, e.g., a third directory, the third directory may be referred to as an "indirect child" of the second directory, and the second directory may be referred to as an "indirect parent" of the third directory. Similarly, files stored immediately within a directory (i.e., outside of any child directories of the directory) may be referred to as being stored "directly" in the directory, and other files stored in the directory (e.g., within a child directory of the directory, or within a child directory of a child directory of the directory) may be referred to as being stored "indirectly" in the directory.

Various metrics may be of interest for the clustered file system. For example, for each directory (or "collection"), it may be useful to determine the amount of storage space used to store the files in the directory (this metric may be referred to a "stored bytes"), the amount of user data stored in the files in the directory (which may be referred to as "user bytes"). The user bytes metric may be less than the stored bytes metric if, for example, some of the storage space is used to store parity data from which user data may be reconstructed in the event of a failure of a storage device in the shared storage 110). Other metrics that may be managed include the number of files in each directory, and the number of child directories in each directory.

In operation, a first metric, e.g., the user bytes metric, for example, may be updated throughout the clustered file system as follows (other metrics may be updated in an analogous manner). FIG. 21 shows an example of a simplified directory hierarchy, including a plurality of directories 205 and a plurality of files 210 (of which only one file 210 is shown, for ease of illustration). In the example of FIG. 21, the root directory is named "GNS"; it has a child named "VStore", which has a child named "Volume", which contains the file 210 that is illustrated. The directory names in the example of FIG. 21 are selected only to identify the directories and are not intended to have further significance.

A first node, which owns the directory Volume, may receive information from other nodes when changes, that affect the metrics, are made in (e.g., when new files are written into) the directory Volume. Decisions regarding when information is to be reported may be made based on one or more reporting criteria. For example, the first node may, when a first reporting criterion is met based on such received information from other nodes (and based on any changes it may itself make in the directory Volume), report (or "bubble up") an update of metric information to the parent directory, i.e., in the example of FIG. 21, to the directory "VStore". This reporting may be accomplished by sending, by the first node, a message to a second node, the second node being the primary owner of the directory VStore. If the directory VStore has multiple children, (including the directory Volume and other children not shown in FIG. 21), then the second node may aggregate the metrics it receives from its children, so that it may store, for example, the total user bytes of all of the files stored in all of its (direct and indirect) children. The update may be a new value of the metric (e.g., a new value of the aggregate user bytes of the directory Volume) or it may be a change in the metric (i.e., in the value of the metric) since the last time the directory Volume reported to the directory VStore. As used herein, "reporting to a directory" means causing reported information or a reported update to be associated with the directory (e.g., by sending the information or update to the primary owner node of the directory).

The first reporting criterion may be met when a certain interval of time has elapsed since the last time the directory Volume reported to the directory VStore, or when the metric has changed, by a value exceeding a threshold, since the last time the directory Volume reported to the directory VStore. To identify the parent directory of the directory Volume, the primary owner node of the directory Volume may query the file system, which may store the names of all of the directories and their parent-child relationships in a suitable database, for the full name of its parent. In some embodiments, the primary owner node of the directory Volume (i.e., the first node) may, after performing such a query, store the result in a local parent cache, and subsequently retrieve this information from the parent cache as needed, making it unnecessary to burden the file system with such a query each time a message is to be sent to the primary owner node of the direct parent of the directory Volume.

The first node may report to the second node using a message addressed to a node identifier of the second node.

The node identifier may be calculated, by the first node, by evaluating a hash function using as the argument an identifier, or "internal name", of the directory VStore. This internal name may be an integer unique to the directory VStore within the clustered file system. In other embodiments, the argument of the hash function may include a portion of the full user-readable name of the directory VStore, in addition to, or instead of, the internal name of the directory VStore. As used herein, the "full user-readable name" of a directory is a name formed by combining the user-readable name of the directory with the user-readable names of all of its (direct and indirect) parents, e.g., by concatenating the names, or concatenating them with separators such as "/". The hash function may implement a consistent hash, so that if a node 105 becomes unavailable (e.g., fails or is taken off line), the assignments of directories to owner nodes change as little as possible.

The first node may be informed as follows, when changes are made in (e.g., when new files are written into) the directory Volume. If a third node 105 performs a write operation adding a new file to the directory Volume, the third node 105 may store in a local log file a log entry corresponding to the addition of the file. Over time, the third node 105 may continue to perform operations, including, e.g., additional write operations adding further new files to the directory Volume. When a second reporting criterion is met, in the third node, for the first metric (in this example, for the user bytes metric) for the directory Volume, the third node may report an update, to the first node, the update corresponding to all of the log entries affecting the directory Volume. For example, if since the last time the third node reported to the first node, five new files have been added, to the directory Volume, by the third node, then the third node may report the sizes (in user bytes) of the five files, the sizes (in stored bytes) of the five files, and a user identifier (identifying the user account on behalf of which the files were created) for each of the five files.

The second reporting criterion may be met when a certain interval of time has elapsed since the last time the third node reported to the first node, or when a certain threshold number of new files has been added since the last time the third node reported to the first node, or when writes or deletions causing the user bytes (or the stored bytes) to change by a threshold amount have been performed since the last time the third node reported to the first node. Such criteria may have the effect of limiting the extent to which the data in the first node may be out of date, or the extent to which the user bytes data or stored bytes data kept in the first node is not perfectly accurate.

Both the first reporting criterion and the second reporting criterion may be selected to balance (i) the accuracy and up-to-date-ness of the metric data (which improve for reporting criteria that are more easily met) against (ii) the reporting burden (which increases for reporting criteria that are more easily met).

Each parent directory may maintain two sets of metric data or ("cluster groups"): (i) a set of local metric data 220, i.e., data corresponding to files stored directly in the parent directory, and (ii) a set of aggregate child data 225, i.e., aggregate data corresponding to metric data reported to the parent directory by its one or more child directories. As such, for example, the directory VStore stores a set of local metric data 220 corresponding to the local files in the directory VStore (local files that are not shown in FIG. 21, for ease of illustration), and a set of aggregate child data 225 corresponding to files stored, directly and indirectly, in children of the directory VStore. A metric (e.g., local user bytes) may have a different value for each directory. As used herein, a metric "for a directory" means the value the metric takes for that directory. For example, local user bytes for the directory Volume is the number of user bytes allocated directly within Volume, and user bytes for the directory VStore is the number of user bytes allocated directly within VStore.

As mentioned above, metrics other than the user bytes metric may be handled in an analogous manner. For example, an access rate metric for a directory may be defined as the number of data accesses made within a directory during a defined time interval (e.g., during the 24-hour period ending at the most recent midnight). One or more "hot spot" directories (e.g., directories having an access rate exceeding a threshold, or the top 5% of directories ranked by access rate, or the directory with the highest access rate) may then be identified, and optionally displayed as a graphical representation to an operator managing the clustered file system. An access rate metric may also be kept per user. In such a case, the aggregate per-user access rate metric at the root directory may be used to rank users in order of access usage. Similarly, other metrics (e.g., local or aggregate stored bytes per user, which may be a quantity of data allocated to a user, locally or in the aggregate) may be kept per user. Aggregate values of these per-user metrics for the root directory may be used to assess the extent to which any user is using the resources (e.g., storage space, and bandwidth) of the clustered file system. In some embodiments, aggregate user bytes per user at the root directory level represent the total storage (in user bytes) allocated to a user in the clustered file system. An amount by which an aggregate value of user bytes, per user, for the root directory is less than a storage quota for the user may be calculated. When new data are being stored, this information may be used to determine whether the storage of the new data will cause a user to exceed the user's quota.

In some embodiments, the set of metrics may be updated adaptively, and new metrics may be added seamlessly, with the nodes 105 being configured to automatically report up any new metrics that are received from other nodes. Each metric may have its own reporting criteria. The reporting, in some embodiments, is entirely asynchronous and the collection of and reporting of metrics may be performed with at most a small effect on the performance of the clustered file system. The load of collecting and reporting of metrics is distributed, cluster-wide locks are not needed, and queries about metrics at a directory may be responded to essentially immediately, without having to first perform queries of child directories. In addition to a primary owner node, each directory may have one or more secondary owner nodes. The secondary owner nodes may obtain updates of metric data whenever such updates are obtained by the primary owner node, so that they may be able to take over the responsibilities of the primary owner node if the primary owner node fails or is taken out of service. If several, e.g., three, secondary owner nodes are present for each directory, the clustered file system may be resilient to the concurrent failure of (or taking off line of) several (e.g., as many as three) nodes. Although the examples provided herein relate to the use of hierarchical distributed reporting in a hierarchical file system, in some embodiments analogous methods are employed in a different hierarchical system.

A clustered file system employing a system and method for managing metrics, according to some embodiments, may provide various advantages, including the following. The system may be capable of receiving updates about any measurable metric of interest on any node without introducing any locking overheads, and it may allow association of a notion for change of metric to have occurred at some point in the file system namespace. The system may accumulate such updates as they occur across the cluster by transmitting them across the cluster and synchronizing the cumulative effect of such values in a lazy fashion by disconnecting them from the thread context that caused or reported the updates. The system may aggregate the updates to any and every node in the file system namespace, such that the cumulative effect of all values of related metrics from all children down the hierarchy of that node is propagated to the said node. The system may segregate the cumulated metric updates at any node due to (i) direct children of that node and due to (ii) indirect children (e.g., grandchildren) of that node. The system may allow easy grafting of metrics from one node to another when a node in the file system namespace is moved from under one parent to another without having to recalculate metrics of any of the old or new parent nodes. The system may allow storage consumption to be one of the metrics such that all storage consumed below at any level in the file system namespace is represented as that due to the immediate children of that level and that due to the grandchildren of that level. The system may further allow the said storage consumption to be treated like a quota that can be tracked by creating a per-user or per-group storage consumption metric. The system may give a non-transactional estimate of storage consumption at any level in the file system namespace that can be used to enforce filesystem quota on a per-user or per-group basis without requiring any cluster wide locks for decision-making.

One or more embodiments according the present disclosure may include one or more characteristics of one or more of the following clauses (although embodiments are not limited thereto):

Clause 1. A method for tracking metrics in a clustered file system, the clustered file system comprising a plurality of directories, the method comprising:

determining that a first reporting criterion is met for a first metric for a first directory of the plurality of directories; and reporting, to a second directory of the plurality of directories, an update for the first metric for the first directory, the first directory being a child directory of the second directory.

Clause 2. The method of clause 1, wherein:

the clustered file system further comprises a plurality of nodes, and each of the directories has a primary owner node from among the plurality of nodes.

Clause 3. The method of clause 2, wherein the reporting comprises sending the update for the first metric, by a first node, to a second node, the first node being the primary owner node of the first directory, and the second node being the primary owner node of the second directory.

Clause 4. The method of clause 3, wherein the reporting further comprises computing, by the first node, a node identifier for the second node, the computing comprising computing a hash of a name of the second directory.

Clause 5. The method of clause 4, further comprising retrieving, from a parent cache of the first node, the name of the second directory.

Clause 6. The method of clause 4, wherein the hash is a consistent hash.

Clause 7. The method of clause 3, wherein:

each of the directories further has a secondary owner node from among the plurality of nodes, and the method further comprises:

determining that the primary owner node of the first directory has failed, and reporting, to the second directory, an update for a second metric, the reporting of the update for the second metric comprising sending the update for the second metric, by the first node, to a third node, the third node being the secondary owner node of the second directory.

Clause 8. The method of clause 1, wherein the reporting of the update comprises reporting a change in the first metric for the first directory.

Clause 9. The method of clause 1, further comprising:

reporting, to the first directory, a first update, the first update being an update of a second metric for a third directory, the third directory being a child directory of the first directory;

reporting, to the first directory, a second update, the second update being an update of the second metric for a fourth directory, the fourth directory being a child directory of the first directory; and updating an aggregate value of the second metric based on the first update and on the second update.

Clause 10. The method of clause 9, further comprising reporting an update for the aggregate value to the second directory.

Clause 11. The method of clause 1, wherein the first metric for the first directory is a quantity of storage allocated, in the first directory, to a first user.

Clause 12. The method of clause 11, further comprising calculating an amount by which an aggregate value of the first metric for the second directory is less than a storage quota for the first user.

Clause 13. The method of clause 1, wherein the first metric for the first directory is a measure of an access rate in the first directory.

Clause 14. The method of clause 13, further comprising identifying a directory, of the plurality of directories, having the greatest value of the first metric.

Clause 15. The method of clause 1, wherein the first metric for the first directory is a measure of an aggregate access rate, for a first user, in the first directory.

Clause 16. The method of clause 15, further comprising:

calculating an aggregate access rate, for the second directory, for each of a plurality of users including the first user, and identifying a user having a greatest value of the aggregate access rate for the second directory.

Clause 17. A system comprising:

shared storage; and a plurality of nodes, the shared storage being configured to store a plurality of directories, each of the directories having a primary owner node, a first node, comprising a first processing circuit, being the primary owner node of a first directory of the plurality of directories, a second node, comprising a second processing circuit, being the primary owner node of a second directory of the plurality of directories, the first directory being a child directory of the second directory, the first processing circuit being configured to:

determine that a first reporting criterion is met for a first metric for the first directory; and send, to the second processing circuit, an update for the first metric for the first directory.

Clause 18. The system of clause 17, wherein the first metric is a quantity of storage allocated, in the first directory, to a first user.

Clause 19. The system of clause 17, wherein the first metric for the first directory is a measure of an access rate in the first directory.

Clause 20. A system comprising:

shared storage; and a plurality of nodes, the shared storage being configured to store a plurality of directories, each of the directories having a primary owner node, a first node, comprising first means for processing, being the primary owner node of a first directory of the plurality of directories, a second node, comprising second means for processing, being the primary owner node of a second directory of the plurality of directories, the first directory being a child directory of the second directory, the first means for processing being configured to:

determine that a first reporting criterion is met for a first metric for the first directory; and send, to the second processing circuit, an update for the first metric for the first directory.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the term "array" refers to an ordered set of numbers regardless of how stored (e.g., whether stored in consecutive memory locations, or in a linked list). As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Although aspects of some example embodiments of a system and method for managing metrics in a clustered file system have been specifically described and illustrated herein, many modifications and variations will be apparent to those skilled in the art. Accordingly, it is to be understood that a system and method for managing metrics in a clustered file system constructed according to principles of this disclosure may be embodied other than as specifically described herein. The invention is also defined in the following claims, and equivalents thereof.

What is claimed is:

1. A method comprising:
   storing a first data object and a second data object at a first side of a row of a data chunk; and
   storing a first object header for the first data object and a second object header for the second data object at a second side of the row of the data chunk.

2. The method of claim 1, wherein the first side and the second side are at opposite ends of the row of the data chunk.

3. The method of claim 2, wherein, among elements comprising the first data object, the second data object, the first object header, and the second object header, the first data object is a closest element to the first side and the first object header is a closest element to the second side.

4. The method of claim 1, further comprising:
   reading the first object header to determine the first data object is an invalid data object; and
   refraining from reading the invalid data object.

5. The method of claim 1, wherein:
   the first data object and the second data object are two data objects of object data comprising two or more data objects; and
   the first object header and the second object header are two object headers of object headers comprising two or more object headers,
   the method further comprising:
      deleting or aggregating the object data such that invalid data causes the data chunk to be fragmented;
      reading one of the object headers to determine a corresponding one of the object data is a valid data object; and
      moving the valid data object to a new allocated data chunk.

6. The method of claim 5, further comprising:
   reading the object headers to determine that the object data are valid object data;
   determining that the valid object data correspond to a single object;
   concatenating the valid object data; and
   writing the valid object data as the single object to a drive.

7. The method of claim 5, further comprising:
   staging the object data into a contiguous buffer in a persistent memory;
   determining the contiguous buffer has reached a threshold; and
   sequentially writing data corresponding to the object data to a drive.

8. The method of claim 5, further comprising:
   determining one of the object headers has an attribute set to long; and
   staging the one of the object headers in an active block in a persistent memory and writing the active block to a drive; or
   directly writing the active block to the drive.

9. The method of claim 5, further comprising:
   determining one of the object headers has an attribute set to short; and
   caching the one of the object headers in a persistent memory.

10. A system comprising:
   a storage node comprising a key-value store for storing data; and
   a data management node for sending or retrieving the data from the storage node, wherein the data management node is configured to perform:
      storing a first data object and a second data object at a first side of a row of a data chunk; and
      storing a first object header for the first data object and a second object header for the second data object at a second side of the row of the data chunk.

11. The system of claim 10, wherein the first side and the second side are at opposite ends of the row of the data chunk.

12. The system of claim 11, wherein, among elements comprising the first data object, the second data object, the first object header, and the second object header, the first data object is a closest element to the first side and the first object header is a closest element to the second side.

13. The system of claim 10, wherein the data management node is configured to perform:

reading the first object header to determine the first data object is an invalid data object; and refraining from reading the invalid data object.

14. The system of claim 10, wherein:

the first data object and the second data object are two data objects of object data comprising two or more data objects; and the first object header and the second object header are two object headers of object headers comprising two or more object headers, the data management node is configured to perform:

deleting or aggregating the object data such that invalid data causes the data chunk to be fragmented;

reading one of the object headers to determine a corresponding one of the object data is a valid data object; and moving the valid data object to a new allocated data chunk.

15. The system of claim 14, wherein the data management node is configured to perform:

reading the object headers to determine that the object data are valid object data;

determining that the valid object data correspond to a single object;

concatenating the valid object data; and writing the valid object data as the single object to a drive.

16. The system of claim 14, wherein the data management node is configured to perform:

staging the object data into a contiguous buffer in a persistent memory;

determining the contiguous buffer has reached a threshold; and sequentially writing data corresponding to the object data to a drive.

17. The system of claim 14, wherein the data management node is configured to perform:

determining one of the object headers has an attribute set to long; and staging the one of the object headers in an active block in a persistent memory and writing the active block to a drive; or directly writing the active block to the drive.

18. The system of claim 14, wherein the data management node is configured to perform:

determining one of the object headers has an attribute set to short; and caching the one of the object headers in a persistent memory.

19. A non-transitory computer readable medium implemented on a distributed object store system, the non-transitory computer readable medium having computer code that, when executed on a processor, implements a method of data storage by a data management node, the method comprising:

storing a first data object and a second data object at a first side of a row of a data chunk; and storing a first object header for the first data object and a second object header for the second data object at a second side of the row of the data chunk.

20. The non-transitory computer readable medium of claim 19, wherein the first side and the second side are at opposite ends of the row of the data chunk.

* * * * *